US008265388B2

(12) United States Patent
Nanu et al.

(10) Patent No.: US 8,265,388 B2
(45) Date of Patent: Sep. 11, 2012

(54) ANALYZING PARTIAL FACE REGIONS FOR RED-EYE DETECTION IN ACQUIRED DIGITAL IMAGES

(75) Inventors: Florin Nanu, Bucharest (RO); Eran Steinberg, San Francisco, CA (US); Peter Corcoran, Claregalway (IE); Alexei Pososin, Galway (IE); Petronel Bigioi, Galway (IE); Alexandru Drimbarean, Galway (IE); Stefan Petrescu, Bucharest (RO); Mihnea Gangea, Bucharest (RO); Adrian Capata, Bucharest (RO); Mihai Ciuc, Bucharest (RO); Adrian Zamfir, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

(21) Appl. No.: 13/244,658

(22) Filed: Sep. 25, 2011

(65) Prior Publication Data

US 2012/0014600 A1 Jan. 19, 2012

Related U.S. Application Data

(63) Continuation of application No. 12/834,901, filed on Jul. 13, 2010, now Pat. No. 8,036,460, which is a continuation of application No. 12/551,258, filed on Aug. 31, 2009, which is a continuation-in-part of application No. 11/233,513, filed on Sep. 21, 2005, now Pat. No. 7,587,085, which is a continuation-in-part of application No. 11/123,971, filed on May 6, 2005, now Pat. No. 7,436,998, which is a continuation-in-part of application No. 10/976,336, filed on Oct. 28, 2004, now Pat. No. 7,536,036.

(60) Provisional application No. 61/182,625, filed on May 29, 2009, provisional application No. 61/094,034, filed on Sep. 3, 2008, provisional application No. 61/094,036, filed on Sep. 3, 2008, provisional application No. 61/221,455, filed on Jun. 29, 2009.

(51) Int. Cl.
*G06K 9/00* (2006.01)
(52) U.S. Cl. ........ 382/167; 382/164; 382/165; 382/117; 382/275
(58) Field of Classification Search .................. 382/103, 382/117, 164, 165, 167, 275; 345/589, 593; 358/522, 515; 715/243; 348/453; 707/796, 707/915
See application file for complete search history.

(56) References Cited

U.S. PATENT DOCUMENTS 4,285,588 A 8/1981 Mir
(Continued)

FOREIGN PATENT DOCUMENTS

EP 884694 A1 12/1998
(Continued)

OTHER PUBLICATIONS

Combier, Nathalie et al., Removal of Defects on Flash Radiographic Images by Fuzzy Combination, Conference: Machine Vision Applications in Industrial Inspection III, Proceedings of SPIE—The International Society for Optical Engineering, Society of Photo-Optical Instrumentation, 1995, pp. 301-312. http://rlinks2.dialog.com/NASApp/ChannelWEB/DialogProServlet?ChName=engineering.

(Continued)

*Primary Examiner* — Anh Hong Do
(74) *Attorney, Agent, or Firm* — Andrew V. Smith

(57) ABSTRACT

A method for red-eye detection in an acquired digital image includes acquiring a first image, and analyzing one or more partial face regions within the first image. One or more characteristics of the first image are determined. One or more corrective processes are identified including red eye correction that can be beneficially applied to the first image according to the one or more characteristics. The one or more corrective processes are applied to the first image.

16 Claims, 27 Drawing Sheets

U.S. PATENT DOCUMENTS

| | | | |
|---|---|---|---|
| 4,577,219 A | 3/1986 | Klie et al. |
| 4,646,134 A | 2/1987 | Komatsu et al. |
| 4,777,620 A | 10/1988 | Shimoni et al. |
| 4,881,067 A | 11/1989 | Watanabe et al. |
| 4,978,989 A | 12/1990 | Nakano et al. |
| 5,016,107 A | 5/1991 | Sasson et al. |
| 5,070,355 A | 12/1991 | Inoue et al. |
| 5,130,789 A | 7/1992 | Dobbs et al. |
| 5,164,831 A | 11/1992 | Kuchta et al. |
| 5,202,720 A | 4/1993 | Fujino et al. |
| 5,227,837 A | 7/1993 | Terashita |
| 5,231,674 A | 7/1993 | Cleveland et al. |
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,424,794 A | 6/1995 | McKay |
| 5,426,478 A | 6/1995 | Katagiri et al. |
| 5,432,863 A | 7/1995 | Benati et al. |
| 5,432,866 A | 7/1995 | Sakamoto |
| 5,452,048 A | 9/1995 | Edgar |
| 5,455,606 A | 10/1995 | Keeling et al. |
| 5,537,516 A | 7/1996 | Sherman et al. |
| 5,568,187 A | 10/1996 | Okino |
| 5,568,194 A | 10/1996 | Abe |
| 5,649,238 A | 7/1997 | Wakabayashi et al. |
| 5,671,013 A | 9/1997 | Nakao |
| 5,694,926 A | 12/1997 | DeVries et al. |
| 5,719,639 A | 2/1998 | Imamura |
| 5,719,951 A | 2/1998 | Shackleton et al. |
| 5,721,983 A | 2/1998 | Furutsu |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,204,868 B1 | 3/2001 | Yamauchi et al. |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Malloy Desormeaux |
| 6,501,911 B1 | 12/2002 | Malloy Desormeaux |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,700,614 B1 | 3/2004 | Hata |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,734,911 B1 | 5/2004 | Lyons |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,859,565 B2 | 2/2005 | Baron |
| 6,873,743 B2 | 3/2005 | Steinberg |
| 6,885,766 B2 | 4/2005 | Held et al. |
| 6,895,112 B2 | 5/2005 | Chen et al. |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 7,024,051 B2 | 4/2006 | Miller et al. |
| 7,027,662 B2 | 4/2006 | Baron |
| 7,035,461 B2 | 4/2006 | Luo et al. |
| 7,035,462 B2 | 4/2006 | White et al. |
| 7,042,501 B2 | 5/2006 | Matama |
| 7,042,505 B1 | 5/2006 | DeLuca |
| 7,062,086 B2 | 6/2006 | Chen et al. |
| 7,116,820 B2 | 10/2006 | Luo et al. |
| 7,133,070 B2 | 11/2006 | Wheeler et al. |
| 7,155,058 B2 | 12/2006 | Gaubatz et al. |
| 7,171,044 B2 | 1/2007 | Chen et al. |
| 7,216,289 B2 | 5/2007 | Kagle et al. |
| 7,224,850 B2 | 5/2007 | Zhang et al. |
| 7,289,664 B2 | 10/2007 | Enomoto |
| 7,295,233 B2 | 11/2007 | Steinberg et al. |
| 7,310,443 B1 | 12/2007 | Kris et al. |
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,436,998 B2 | 10/2008 | Steinberg et al. |
| 7,454,040 B2 | 11/2008 | Luo et al. |
| 7,515,740 B2 | 4/2009 | Corcoran et al. |
| 7,567,707 B2 | 7/2009 | Willamowski et al. |

| | | | | | |
|---|---|---|---|---|---|
| 7,606,417 B2 | 10/2009 | Steinberg et al. | 2004/0160517 A1 | 8/2004 | Iida |
| 7,630,006 B2 | 12/2009 | DeLuca et al. | 2004/0165215 A1 | 8/2004 | Raguet et al. |
| 7,652,695 B2 | 1/2010 | Halpern | 2004/0170304 A1 | 9/2004 | Haven et al. |
| 7,689,009 B2 | 3/2010 | Corcoran et al. | 2004/0184044 A1 | 9/2004 | Kolb et al. |
| 7,705,891 B2 | 4/2010 | Silverbrook | 2004/0184670 A1 | 9/2004 | Jarman et al. |
| 7,738,015 B2 | 6/2010 | Steinberg et al. | 2004/0196292 A1 | 10/2004 | Okamura |
| 7,747,160 B2 | 6/2010 | Thorn | 2004/0196433 A1 | 10/2004 | Durnell |
| 7,819,525 B2 | 10/2010 | Connell, II | 2004/0196503 A1 | 10/2004 | Kurtenbach et al. |
| 7,907,786 B2 | 3/2011 | Fan et al. | 2004/0213476 A1 | 10/2004 | Luo et al. |
| 7,920,723 B2 | 4/2011 | Nanu et al. | 2004/0223063 A1 | 11/2004 | DeLuca et al. |
| 7,995,804 B2 | 8/2011 | Steinberg et al. | 2004/0227978 A1 | 11/2004 | Enomoto |
| 2001/0015760 A1 | 8/2001 | Fellegara et al. | 2004/0228542 A1 | 11/2004 | Zhang et al. |
| 2001/0031142 A1 | 10/2001 | Whiteside | 2004/0233299 A1 | 11/2004 | Ioffe et al. |
| 2001/0052937 A1 | 12/2001 | Suzuki | 2004/0233301 A1 | 11/2004 | Nakata et al. |
| 2002/0019859 A1 | 2/2002 | Watanabe | 2004/0234156 A1 | 11/2004 | Watanabe et al. |
| 2002/0041329 A1 | 4/2002 | Steinberg | 2004/0239779 A1 | 12/2004 | Washisu |
| 2002/0051571 A1 | 5/2002 | Jackway et al. | 2004/0240747 A1 | 12/2004 | Jarman et al. |
| 2002/0054224 A1 | 5/2002 | Wasula et al. | 2004/0258308 A1 | 12/2004 | Sadovsky et al. |
| 2002/0085088 A1 | 7/2002 | Eubanks | 2005/0001024 A1 | 1/2005 | Kusaka et al. |
| 2002/0090133 A1 | 7/2002 | Kim et al. | 2005/0013602 A1 | 1/2005 | Ogawa |
| 2002/0093577 A1 | 7/2002 | Kitawaki et al. | 2005/0013603 A1 | 1/2005 | Ichimasa |
| 2002/0093633 A1 | 7/2002 | Milch | 2005/0024498 A1 | 2/2005 | Iida et al. |
| 2002/0105662 A1 | 8/2002 | Patton et al. | 2005/0031224 A1 | 2/2005 | Prilutsky et al. |
| 2002/0114513 A1 | 8/2002 | Hirao | 2005/0041121 A1 | 2/2005 | Steinberg et al. |
| 2002/0126893 A1 | 9/2002 | Held et al. | 2005/0047655 A1 | 3/2005 | Luo et al. |
| 2002/0131770 A1 | 9/2002 | Meier et al. | 2005/0047656 A1 | 3/2005 | Luo et al. |
| 2002/0136450 A1 | 9/2002 | Chen et al. | 2005/0053279 A1 | 3/2005 | Chen et al. |
| 2002/0141661 A1 | 10/2002 | Steinberg | 2005/0058340 A1 | 3/2005 | Chen et al. |
| 2002/0150306 A1 | 10/2002 | Baron | 2005/0058342 A1 | 3/2005 | Chen et al. |
| 2002/0159630 A1 | 10/2002 | Buzuloiu et al. | 2005/0062856 A1 | 3/2005 | Matsushita |
| 2002/0172419 A1 | 11/2002 | Lin et al. | 2005/0063083 A1 | 3/2005 | Dart et al. |
| 2002/0176623 A1 | 11/2002 | Steinberg | 2005/0068452 A1 | 3/2005 | Steinberg et al. |
| 2003/0007687 A1 | 1/2003 | Nesterov et al. | 2005/0074164 A1 | 4/2005 | Yonaha |
| 2003/0021478 A1 | 1/2003 | Yoshida | 2005/0074179 A1 | 4/2005 | Wilensky |
| 2003/0025811 A1 | 2/2003 | Keelan et al. | 2005/0078191 A1 | 4/2005 | Battles |
| 2003/0044063 A1 | 3/2003 | Meckes et al. | 2005/0117132 A1 | 6/2005 | Agostinelli |
| 2003/0044070 A1 | 3/2003 | Fuersich et al. | 2005/0129331 A1 | 6/2005 | Kakiuchi et al. |
| 2003/0044176 A1 | 3/2003 | Saitoh | 2005/0140801 A1 | 6/2005 | Prilutsky et al. |
| 2003/0044177 A1 | 3/2003 | Oberhardt et al. | 2005/0147278 A1 | 7/2005 | Rui et al. |
| 2003/0044178 A1 | 3/2003 | Oberhardt et al. | 2005/0151943 A1 | 7/2005 | Iida |
| 2003/0052991 A1 | 3/2003 | Stavely et al. | 2005/0163498 A1 | 7/2005 | Battles et al. |
| 2003/0058343 A1 | 3/2003 | Katayama | 2005/0168965 A1 | 8/2005 | Yoshida |
| 2003/0058349 A1 | 3/2003 | Takemoto | 2005/0196067 A1 | 9/2005 | Gallagher et al. |
| 2003/0095197 A1 | 5/2003 | Wheeler et al. | 2005/0199783 A1 | 9/2005 | Wenstrand et al. |
| 2003/0107649 A1 | 6/2003 | Flickner et al. | 2005/0200736 A1 | 9/2005 | Ito |
| 2003/0118216 A1 | 6/2003 | Goldberg | 2005/0207649 A1 | 9/2005 | Enomoto et al. |
| 2003/0118217 A1 | 6/2003 | Kondo et al. | 2005/0212955 A1 | 9/2005 | Craig et al. |
| 2003/0137597 A1 | 7/2003 | Sakamoto et al. | 2005/0219385 A1 | 10/2005 | Terakawa |
| 2003/0142285 A1 | 7/2003 | Enomoto | 2005/0219608 A1 | 10/2005 | Wada |
| 2003/0161506 A1 | 8/2003 | Velazquez et al. | 2005/0220346 A1 | 10/2005 | Akahori |
| 2003/0190072 A1 | 10/2003 | Adkins et al. | 2005/0220347 A1 | 10/2005 | Enomoto et al. |
| 2003/0194143 A1 | 10/2003 | Iida | 2005/0226499 A1 | 10/2005 | Terakawa |
| 2003/0202715 A1 | 10/2003 | Kinjo | 2005/0232490 A1 | 10/2005 | Itagaki et al. |
| 2003/0231241 A1 | 12/2003 | Iida | 2005/0238230 A1 | 10/2005 | Yoshida |
| 2004/0017481 A1 | 1/2004 | Takasumi et al. | 2005/0243348 A1 | 11/2005 | Yonaha |
| 2004/0027593 A1 | 2/2004 | Wilkins | 2005/0275734 A1 | 12/2005 | Ikeda |
| 2004/0032512 A1 | 2/2004 | Silverbrook | 2005/0276481 A1 | 12/2005 | Enomoto |
| 2004/0032526 A1 | 2/2004 | Silverbrook | 2005/0280717 A1 | 12/2005 | Sugimoto |
| 2004/0033071 A1 | 2/2004 | Kubo | 2005/0286766 A1 | 12/2005 | Ferman |
| 2004/0037460 A1 | 2/2004 | Luo et al. | 2006/0008171 A1 | 1/2006 | Petschnigg et al. |
| 2004/0046878 A1 | 3/2004 | Jarman | 2006/0017825 A1 | 1/2006 | Thakur |
| 2004/0047491 A1 | 3/2004 | Rydbeck | 2006/0038916 A1 | 2/2006 | Knoedgen et al. |
| 2004/0056975 A1 | 3/2004 | Hata | 2006/0039690 A1 | 2/2006 | Steinberg et al. |
| 2004/0057622 A1 | 3/2004 | Bradski | 2006/0045352 A1 | 3/2006 | Gallagher |
| 2004/0057623 A1 | 3/2004 | Schuhrke et al. | 2006/0050300 A1 | 3/2006 | Mitani et al. |
| 2004/0057705 A1 | 3/2004 | Kohno | 2006/0066628 A1 | 3/2006 | Brodie et al. |
| 2004/0057715 A1 | 3/2004 | Tsuchida et al. | 2006/0082847 A1 | 4/2006 | Sugimoto |
| 2004/0090461 A1 | 5/2004 | Adams | 2006/0093212 A1 | 5/2006 | Steinberg et al. |
| 2004/0093432 A1 | 5/2004 | Luo et al. | 2006/0093213 A1 | 5/2006 | Steinberg et al. |
| 2004/0114796 A1 | 6/2004 | Kaku | 2006/0093238 A1 | 5/2006 | Steinberg et al. |
| 2004/0114797 A1 | 6/2004 | Meckes | 2006/0098867 A1 | 5/2006 | Gallagher |
| 2004/0114829 A1 | 6/2004 | LeFeuvre et al. | 2006/0098875 A1 | 5/2006 | Sugimoto |
| 2004/0114904 A1 | 6/2004 | Sun et al. | 2006/0119832 A1 | 6/2006 | Iida |
| 2004/0119851 A1 | 6/2004 | Kaku | 2006/0120599 A1 | 6/2006 | Steinberg et al. |
| 2004/0120598 A1 | 6/2004 | Feng | 2006/0140455 A1 | 6/2006 | Costache et al. |
| 2004/0125387 A1 | 7/2004 | Nagao et al. | 2006/0150089 A1 | 7/2006 | Jensen et al. |
| 2004/0126086 A1 | 7/2004 | Nakamura et al. | 2006/0203108 A1 | 9/2006 | Steinberg et al. |
| 2004/0141657 A1 | 7/2004 | Jarman | 2006/0204052 A1 | 9/2006 | Yokouchi |
| 2004/0150743 A1 | 8/2004 | Schinner | 2006/0204110 A1 | 9/2006 | Steinberg et al. |

| | | | |
|---|---|---|---|
| 2006/0221408 | A1 | 10/2006 | Fukuda |
| 2006/0257132 | A1 | 11/2006 | Shiffer et al. |
| 2006/0285754 | A1 | 12/2006 | Steinberg et al. |
| 2007/0110305 | A1 | 5/2007 | Corcoran et al. |
| 2007/0116379 | A1 | 5/2007 | Corcoran et al. |
| 2007/0116380 | A1 | 5/2007 | Ciuc et al. |
| 2007/0133863 | A1 | 6/2007 | Sakai et al. |
| 2007/0201724 | A1 | 8/2007 | Steinberg et al. |
| 2007/0263104 | A1 | 11/2007 | DeLuca et al. |
| 2008/0002060 | A1 | 1/2008 | DeLuca et al. |
| 2008/0013798 | A1 | 1/2008 | Ionita et al. |
| 2008/0043121 | A1 | 2/2008 | Prilutsky et al. |
| 2008/0112599 | A1 | 5/2008 | Nanu et al. |
| 2008/0144965 | A1 | 6/2008 | Steinberg et al. |
| 2008/0186389 | A1 | 8/2008 | DeLuca et al. |
| 2008/0211937 | A1 | 9/2008 | Steinberg et al. |
| 2008/0232711 | A1 | 9/2008 | Prilutsky et al. |
| 2008/0240555 | A1 | 10/2008 | Nanu et al. |
| 2011/0254981 | A1 | 10/2011 | Ito |
| 2012/0063677 | A1 | 3/2012 | Ciuc |

FOREIGN PATENT DOCUMENTS

| | | |
|---|---|---|
| EP | 911759 A2 | 4/1999 |
| EP | 911759 A3 | 6/2000 |
| EP | 1199672 A2 | 4/2002 |
| EP | 1229486 A1 | 8/2002 |
| EP | 1 296 510 A2 | 3/2003 |
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1429290 A2 | 6/2004 |
| EP | 1478169 A2 | 11/2004 |
| EP | 1528509 A2 | 5/2005 |
| EP | 979487 B1 | 3/2006 |
| EP | 1429290 B1 | 7/2008 |
| EP | 2 165 523 B1 | 4/2011 |
| GB | 841609 A | 7/1960 |
| GB | 2379819 A | 3/2003 |
| JP | 4192681 A2 | 7/1992 |
| JP | 5-224271 A | 9/1993 |
| JP | 5224271 A2 | 9/1993 |
| JP | 9214839 A2 | 8/1997 |
| JP | 11-284874 A | 10/1999 |
| JP | 2000-125320 A | 4/2000 |
| JP | 2000-134486 A2 | 5/2000 |
| JP | 2002-247596 A2 | 8/2002 |
| JP | 2002-271808 A2 | 9/2002 |
| JP | 2003-030647 A2 | 1/2003 |
| WO | WO-98/02844 A1 | 1/1998 |
| WO | WO-99/17254 A1 | 4/1999 |
| WO | WO-99/33684 A2 | 7/1999 |
| WO | WO-01/71421 A1 | 9/2001 |
| WO | WO-01/92614 A1 | 12/2001 |
| WO | WO-02/45003 A1 | 6/2002 |
| WO | WO-03/026278 A1 | 3/2003 |
| WO | WO-03/071484 A1 | 8/2003 |
| WO | WO-2004/034696 A1 | 4/2004 |
| WO | 2005/015896 A1 | 2/2005 |
| WO | WO-2005/015896 A1 | 2/2005 |
| WO | WO-2005/041558 A1 | 5/2005 |
| WO | WO-2005/076217 A2 | 8/2005 |
| WO | WO-2005/076217 A3 | 8/2005 |
| WO | WO-2005/087994 A1 | 9/2005 |
| WO | WO-2005/109853 A1 | 11/2005 |
| WO | WO-2006/011635 A1 | 2/2006 |
| WO | WO-2006/018056 A1 | 2/2006 |
| WO | WO-2006/045441 A1 | 5/2006 |
| WO | WO-2007/057063 A1 | 5/2007 |
| WO | WO-2007/057064 A1 | 5/2007 |
| WO | WO-2007/093199 A2 | 8/2007 |
| WO | WO-2007/093199 A3 | 8/2007 |
| WO | WO-2007/095553 A2 | 8/2007 |
| WO | WO-2007/095553 A3 | 8/2007 |
| WO | WO-2007/142621 A1 | 12/2007 |
| WO | WO-2008/023280 A2 | 2/2008 |
| WO | WO-2008/109644 A2 | 9/2008 |
| WO | WO-2008/109644 A3 | 9/2008 |
| WO | 2009/095481 A2 | 8/2009 |
| WO | 2009/095481 A3 | 10/2009 |

OTHER PUBLICATIONS

Corcoran, P. et al., "Automated In-Camera Detection of Flash-Eye Defects", IEEE Transactions on Consumer Electronics, 2005, pp. 11-17, vol. 51—Issue 1.

Cucchiara, R. et al., "Detection of Luminosity Profiles of Elongated Shapes", International Conference on Image Processing, 1996, pp. 635-638, vol. 3.

EPO Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Final Office Action mailed Sep. 1, 2009, for U.S. Appl. No. 11/841,855, filed Aug. 20, 2007.

Gaubatz, Matthew et al., "Automatic Red-Eye Detection and Correction", IEEE ICIP, Proceedings 2002 International Conference on Image Processing, 2002, pp. 1-804-1-807, vol. 2—Issue 3.

Han, T. et al., "Detection and Correction of abnormal Pixels in Hyperion Images", IEEE International Symposium on Geoscience and Remote Sensing, 2002, pp. 1327-1330, vol. 3.

Iivarinen, J. et al., Content-Based Retrieval of Defect Images, Proceedings of Advanced Concepts for Intelligent Vision, Laboratory of Computer Information Science, 2002. http://www.cs.tut.fi/.about.avisa/digger/Publications/acivs02.pdf.

Ioffe, S., "Red eye detection with machine learning", Proceedings 2003 International Conference on Image Processing, 2003, pp. 871-874, vol. 2—Issue 3.

Ito, M., "An Automated System for LSI Fine Pattern Inspection Based on Comparison of Sem Images and Cad Data", IEEE International Conference on Robotics and Automation, 1995, pp. 544-549, vol. 1.

Jin, B. et al., "Modeling and Analysis of Soft-Test/Repair for CCD-Based Digital X-Ray Systems", Instrumentation and Measurement, IEEE Transactions, 2003, pp. 1713-1721, vol. 52—Issue 6.

Nguyen, Karlene et al., "Differences in the Infrared Bright Pupil Response of Human Eyes", Proceedings of the 2002 symposium on Eye tracking research & applications, 2002, pp. 133-138.

Non-Final Office Action mailed Oct. 5, 2009, for U.S. Appl. No. 10/919,226, filed Aug 16, 2004.

Notice of Allowance mailed Feb. 1, 2010, for U.S. Appl. No. 10/919,226, filed Aug. 16, 2004.

Patent Abstracts of Japan, publication No. 2000050062, Image Input Device, application No. 10-217124, published Feb. 18, 2000, 1 page.

PCT International Preliminary Report on Patentability (IPRP) for PCT Application PCT/EP2005/011010, dated Jan. 23, 2007, 18 pages.

PCT International Preliminary Report on Patentability for PCT Application No. PCT/EP2005/005907, dated Nov. 15, 2006, 8 pages.

PCT International Preliminary Report on Patentability for PCT Application PCT/EP2004/008706, dated Feb. 6, 2006, 7 pages.

PCT International Preliminary Report on Patentability for PCT Application PCT/EP2004/010199, dated Apr. 3, 2006, 7 pages.

PCT International Search Report and Written Opinion of the International Searching Authority for PCT Application No. PCT/EP2004/008706, dated Nov. 19, 2004, 13 pages.

PCT International Search Report and Written Opinion of the International Searching Authority for PCT Application No. PCT/EP2005/005033, dated Aug. 4, 2005, 13 pages.

PCT Notification Concerning Transmittal of International Preliminary Report on Patentability, for PCT Application No. PCT/US2007/062090, dated Aug. 28, 2008, 6 pages.

PCT Notification of Transmittal of the International Search Report and the Written Opinion of the International Searching Authority, or the Declaration, for PCT Application No. PCT/EP2006/008342, dated Dec. 28, 2006.

PCT Notification of Transmittal of the International Search Report and the Written Opinion of the International Searching Authority, or the Declaration for PCT Application No. PCT/US07/62090 issued Mar. 10, 2008, 10 pages.

PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration for PCT/EP/2005/05907, dated Aug. 1, 2005, 12 pages.

PCT Notification of Transmittal of the International Search Report and the Written Opinion of the International Searching Authority, or the Declaration, for PCT Application No. PCT/EP2006/008358, Dec. 5, 2006, 14 pages.

PCT Notification of Transmittal of the International Search Report and the Written Opinion of the International Searching Authority, or the Declaration, for PCT Application No. PCT/US2008/055964, paper dated Jul. 30, 2008, 8 Pages.

PCT Notification of Transmittal of the International Search Report and the Written Opinion of the International Searching Authority, or the Declaration, for PCT/EP2004/010199, paper dated Dec. 13, 2004, 13 pages.

PCT Notification of Transmittal of the International Search Report and Written Opinion of the International Searching Authority for PCT Application No. PCT/EP2005/001171, dated Jan. 27, 2006, 11 pages.

Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.

Plotnikov, Yuri et al., Winfree, "Visualization of Subsurface Defects in Composites Using a Focal Plane Array Infrared Camera , http://citeseer.ist.psu.edu/357066.html", NASA Langley Research Center, 1999.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shen, Jianhong, "Inpainting and the Fundamental Problem of Image Processing", 2002, 6 pages.

Smolka, B. et al., "Towards Automatic Redeye Effect Removal, XP004416063", Pattern Recognition Letters, 2003, pp. 1767-1785, vol. 24—Issue 11, North-Holland Publ.

Soriano, M. et al., "Making Saturated Facial Images Useful Again, XP002325961, ISSN: 0277-786X", Proceedings of the SPIE, 1999, pp. 113-121, vol. 3826.

Tan, Yap-Peng et al., Robust Sequential Approach for the Detection of Defective Pixels in an Image Sensor, IEEE International Conference on Acoustics, Speech, and Signal Processing, 1999, pp. 2239-2242, vol. 4. http:// ieeexplorejeee.org/search/freesrchabstract.jsp?arnumber=758382&isnumber=16342&punumber=6110&k2dock ey=758382©ieeecnfs&query=%28%28%28%28images+and+defects+and+correction%29%29%29%29+%3Cin%3E.

Tatsutoshi Kitajima (JP04-192681 English Translation; Electronic Camera, Jul. 10, 1992).

Toet, A., Multiscale Color Image Enhancement, International Conference on Image Processing and its Applications, 1992, pp. 583-585. Posted online: Aug. 6, 2002 18:09:24.0. http://ieeexplore.ieee.org/search/freesrchabstract.jsp?arnumber=146865&isnumber=3917&punumber=1197&k2dockey=146865©ieecnfs&query=%28%28images+and+defects+and+luminance e%29%29+%3Cin%3E+metadata&pos=1.

United Kingdom Search Report dated May 22, 2007, issued in Application No. GB 0701957.3.

Willamowski, J. et al., "Probabilistic Automatic Red Eye Detection and Correction", The 18th International Conference on Pattern Recognition (ICPR'06), 2006, pp. 762-765, vol. 3, IEEE Computer Society.

Non-Final Rejection, dated Dec. 14, 2011, for U.S. Appl. No. 12/362,399, filed Jan. 29, 2009.

PCT International Preliminary Report on Patentability, Chapter I (IB/373), for PCT Application No. PCT/EP2004/008706, report dated Feb. 6, 2006, 7 pages.

PCT Written Opinion of the International Search Authority, for PCT Application No. PCT/EP2004/008706, report dated Feb. 6, 2006, 6 Pages.

Patent Abstract of Japan, for Japanese Patent Application Laid-Open No. Hei 05-224271. Date of Publication: Sep. 3, 1993, for Image Processor.

Patent Abstract of Japan, for Japanese Patent Application Laid-Open No. 2006-285956. Date of Publication: Oct. 19, 2006, for Red Eye Detecting Method and Device, and Program.

Patent Abstracts of Japan, for Japanese Patent Application Laid-Open No. 2002-247596. Date of Publication: Aug. 30, 2002, for Program for Specifying Red Eye Area in Image, Image Processor and Recording Medium.

Patent Abstract of Japan, for Japanese Patent Application Laid-Open No. 2000-125320. Date of Publication: Apr. 28, 2000, for Computer Program Product for Detecting Pink Eyes.

Patent Abstracts of Japan, for Japanese Patent Application Laid-Open No. 2004-242141. Date of Publication: Aug. 24, 2004, for Color Defective Area Correction Method, Color Defective Area Correction Processing Program, and Image Processing Apparatus.

Patent Abstracts of Japan, for Japanese Patent Application Laid-Open No. 2005-196385. Date of Publication: Jul. 21, 2005, for Image Processing Apparatus, Image Processing Method and Digital Camera.

English language translation is JP 11-284874 A. Date of Publication: Oct. 15, 1999, for Automatic Red-Eye Detection and Reduction.

PCT International Preliminary Report on Patentability, for PCT application No. PCT/US2008/055964, report dated Aug. 9, 2009, 6 pages.

PCT Written Opinion of the International Searching Authority, for PCT application No. PCT/US2008/055964, report dated Jul. 30, 2008, 5 pages.

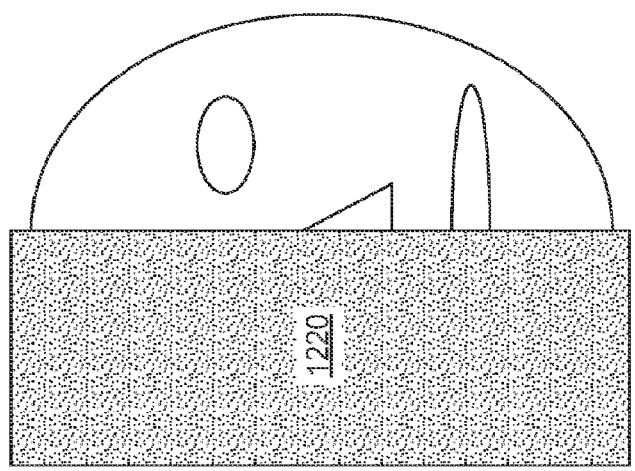
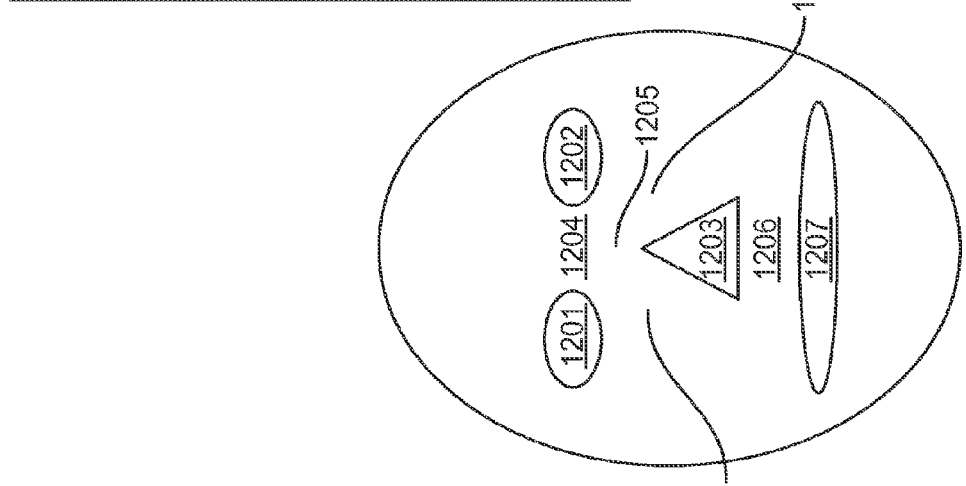
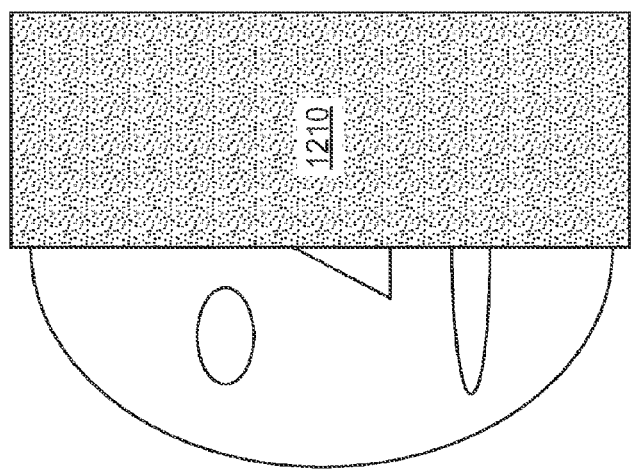
FIG. 8C Right Face
FIG. 8A Full Face
FIG. 8B Left Face

ANALYZING PARTIAL FACE REGIONS FOR RED-EYE DETECTION IN ACQUIRED DIGITAL IMAGES

RELATED APPLICATIONS

This application is a Continuation of U.S. patent application Ser. No. 12/834,901, filed Jul. 13, 2010, now U.S. Pat. No. 8,036,460; which is a Continuation of U.S. patent application Ser. No. 12/551,258, filed Aug. 31, 2009; which claims the benefit of priority to U.S. provisional patent applications Nos. 61/094,034 and 61/094,036, each filed Sep. 3, 2008 and Ser. No. 61/182,625, filed May 29, 2009 and Ser. No. 61/221, 455, filed Jun. 29, 2009. This application is also a continuation-in-part (CIP) of U.S. patent application Ser. No. 11/233, 513, filed Sep. 21, 2005, now U.S. Pat. No. 7,587,085; which is a CIP of U.S. Ser. No. 11/123,971, filed May 6, 2005, now U.S. Pat. No. 7,436,998; which is a CIP of U.S. Ser. No. 10/976,336, filed Oct. 28, 2004, now U.S. Pat. No. 7,536,036. This application is also related to U.S. patent application Ser. Nos. 11/123,971, 11/233,513, 10/976,336, as well as Ser. Nos. 10/635,862, 10/635,918, 10/170,511, 11/690,834, 10/635,862, 12/035,416, 11/769,206, 10/772,767, 12/119, 614, 10/919,226, 11/379,346, 61/221,455 and 61/182,065, and U.S. Pat. Nos. 6,407,777, 7,352,394, 7,042,505 and 7,474,341, and a contemporaneously filed application entitled Optimized Performance and Performance for Red-Eye Filter method and Apparatus by the same inventors listed above. All of these patents and patent applications are each hereby incorporated by reference.

FIELD OF THE INVENTION

The present invention relates to digital image processing, and more particularly to a method and apparatus for red-eye detection in an acquired digital image.

BACKGROUND OF THE INVENTION

Red-eye is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

Digital cameras are becoming more popular and smaller in size. U.S. Pat. No. 6,407,777 to DeLuca describes a method and apparatus where a red eye filter is digitally implemented in the capture device. The success or failure of such filter relies on the quality of the detection and correction process.

Most algorithms that involve image analysis and classification are statistical in nature. There is therefore a need to develop tools which will improve the probability of successful detection, while reducing the probability of false detection, while maintaining optimal execution, especially in limited computational devices such as in digital cameras. In many cases knowledge of the image characteristics such as image quality may affect the design parameters and decisions the detection and correction software needs to implement. For example an image with suboptimal exposure may deteriorate the overall detection of red-eye defects.

Thus, what is needed is a method of improving the success rate of algorithms for detecting and reducing red-eye phenomenon.

BRIEF DESCRIPTION OF THE DRAWINGS

FIGS. 8a-c show illustrations of a full human face, a face with the right side obstructed, and a face with the left side obstructed.

DETAILED DESCRIPTION OF THE EMBODIMENTS

Figure 1A:
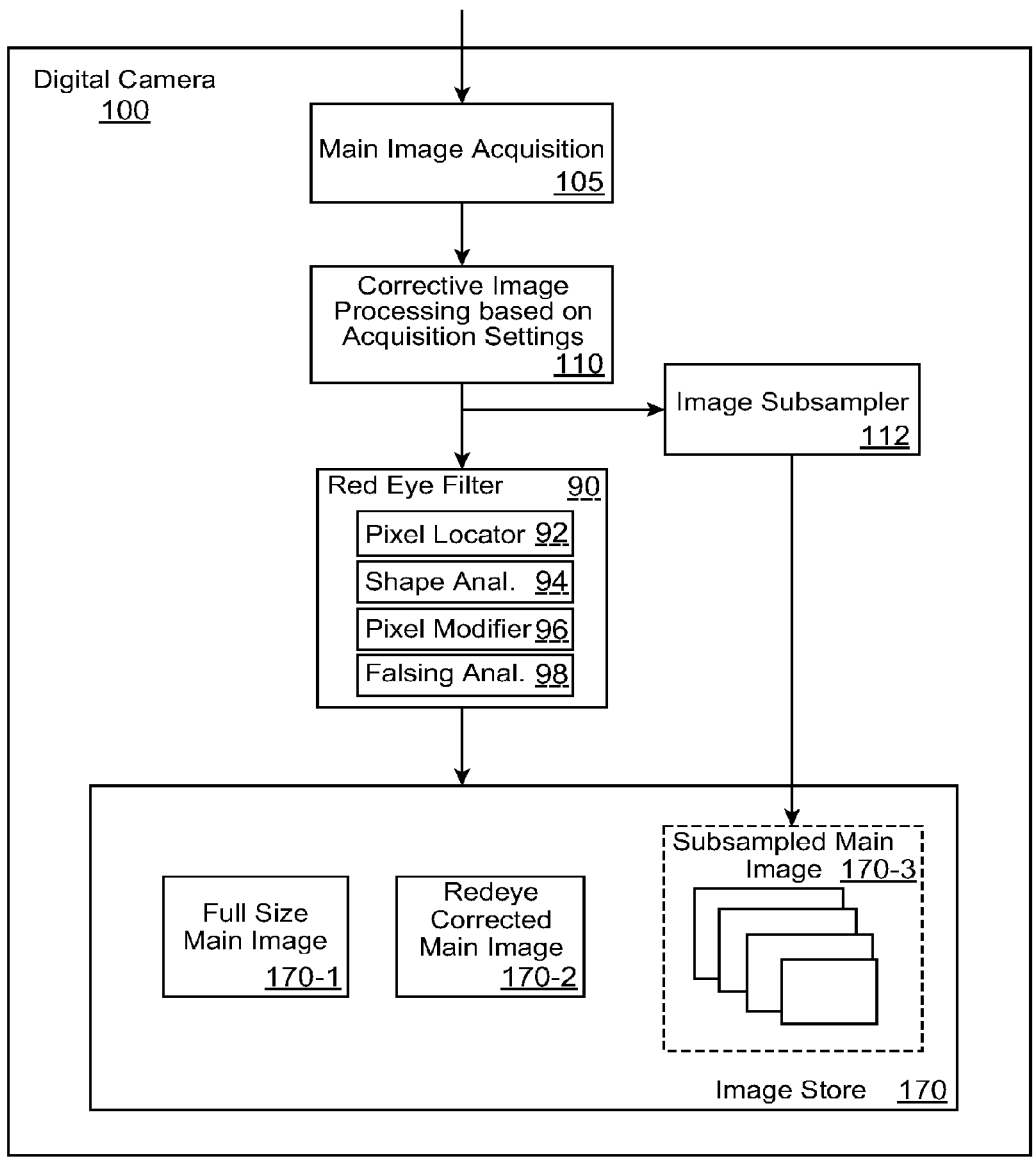
FIG. 1(a) shows a prior art in-camera redeye detection system.

According to certain embodiments, there is provided a method and apparatus for red-eye detection in an acquired digital image as claimed in the appended claims.

Certain embodiments compensate for sub-optimally acquired images where degradations in the acquired image may affect the correct operation of redeye detection, prior to or in conjunction with applying the detection and correction stage.

Certain embodiments improve the overall success rate and reduces the false positive rate of red eye detection and reduction by compensating for non-optimally acquired images by performing image analysis on the acquired image and determining and applying corrective image processing based on said image analysis prior to or in conjunction with applying one or many redeye detection filters to the acquired image. Such corrections or enhancements may include applying global or local color space conversion, exposure compensation, noise reduction, sharpening, blurring or tone reproduction transformations.

In certain embodiments, image analysis is performed on a sub-sampled copy of the main acquired image where possible, enhancing the performance of this invention inside devices with limited computational capability such as hand held devices and in particular digital cameras or printers.

In certain embodiments, the pre-filtering process is optimized by applying when possible, as determined from the image analysis, the image transformations at the pixel level during the redeye detection process thus compensating for non-optimally acquired images without requiring that corrective image processing be applied to the full resolution image.

In certain embodiments, the redeye filter chain is configured for optimal performance based on image analysis of an acquired image to enhance the execution red eye detection and reduction process. Such configuration takes place in the form of variable parameters for the algorithm and variable ordering and selection of sub-filters in the process.

Certain embodiments operate uniformly on both pixels which are members of a defect and its bounding region thus avoiding the need to determine individually if pixels in the neighborhood of said defect are members of the defect and to subsequently apply correcting algorithms to such pixels on an individual basis.

Using certain embodiments, variables that could significantly effect the success of the red-eye detection algorithm such as noise, color shifts, incorrect exposure, blur, over sharpening etc, may be pre-eliminated before performing the detection process, thus improving the success rate.

Alternatively or in addition these variables may be pre-accounted for by changing the parameters for the detection process, thus improving the performance and the success rate.

An advantage of certain embodiments is that by bringing images into a known and better defined image quality, the criteria for detection can be tightened and narrowed down, thus providing higher accuracy both in the positive detection and reduction in the false detection.

A further advantage of certain embodiments is that by accounting for the reasons for suboptimal image quality the parameters for the detection and correction algorithm may be modified, thus providing higher accuracy both in the positive detection and reduction in the false detection without the need to modify the image.

An additional advantage of certain embodiments is that misclassification of pixels and regions belonging to defect areas is reduced if not altogether avoided, which means a reduction of undetected correct positives.

An additional advantage of certain embodiments is that color misclassifications of pixels and regions belonging to non-defect areas are reduced if not avoided, which means a reduction of false positives.

A further advantage of certain embodiments is that they can be implemented to run sufficiently fast and accurately to allow individual images in a batch to be analyzed and corrected in real-time prior to printing.

Yet a further advantage of certain embodiments is that they have a sufficiently low requirement for computing power and memory resources to allow it to be implemented inside digital cameras as part of the post-acquisition processing step.

Yet a further advantage of certain embodiments is that they have a sufficiently low requirement for computing power and memory resources to allow them to be implemented as a computer program on a hand-held personal digital assistant (PDA), mobile phone or other digital appliance suitable for picture display A further advantage of certain embodiments is that they are not limited in their detection of red-eye defects by requirements for clearly defined skin regions matching a human face.

A further advantage is the ability to concatenate image quality transformations and red eye detection to improve overall performance.

FIG. 1 illustrates a prior art in-camera redeye system. Within the camera 100 a main image is acquired 105 from a sensor subsystem. This image is further processed 110 based on image acquisition parameters such as ambient lighting, length of exposure, usage of pre-flash and flash, lens focal length & aperture settings, etc. This image processing is pre-calibrated during the design of the camera and, due to the non-linear relationships between the various acquisition parameters, it typically involves a significant amount of empirical testing using as broad a range of image capture conditions as is practical. Thus, even though modern digital cameras have much improved auto-focus and auto-exposure algorithms it is still possible to capture images of non-optimal quality either through incorrect camera settings or through encountering conditions which are not fully accounted for by the empirical calibrations process for that camera.

After this image processing is completed the main acquired and processed image is normally committed to non-volatile storage in camera memory, or in an onboard storage card 170. However if the image was captured using a flash then the possibility of redeye defects implies that the image should first be passed through an in-camera redeye filter 90. A more detailed description of such a filter can be found in U.S. Pat. No. 6,407,777 to DeLuca herein incorporated by reference. Briefly it comprises of (i) a pixel locator filter 92 which detects candidate eye-defect pixels based on a color analysis and then groups said pixels into redeye candidate regions; (ii) a shape analyzer filter 94 which determines if a eye candidate region is acceptable in terms of geometry, size and compactness and further analyzes neighbouring features such as eyebrows and iris regions; and (iii) a falsing filter 98 which eliminates candidate regions based on a wide range of criteria. Any candidate regions which survive the falsing filter are then modified by a pixel modifier 96 and the corrected image 170-2 may then be stored in the main image store 170.

This prior art system typically will also feature a sub-sampler which can generate lower resolution versions 170-3 of the main acquired and processed image 170-1. This sub-sampling unit may be implemented in either software or may be hardware based and is, primarily, incorporated in modern digital cameras to facilitate the generation of thumbnail images for the main camera display.

Figure 1B:
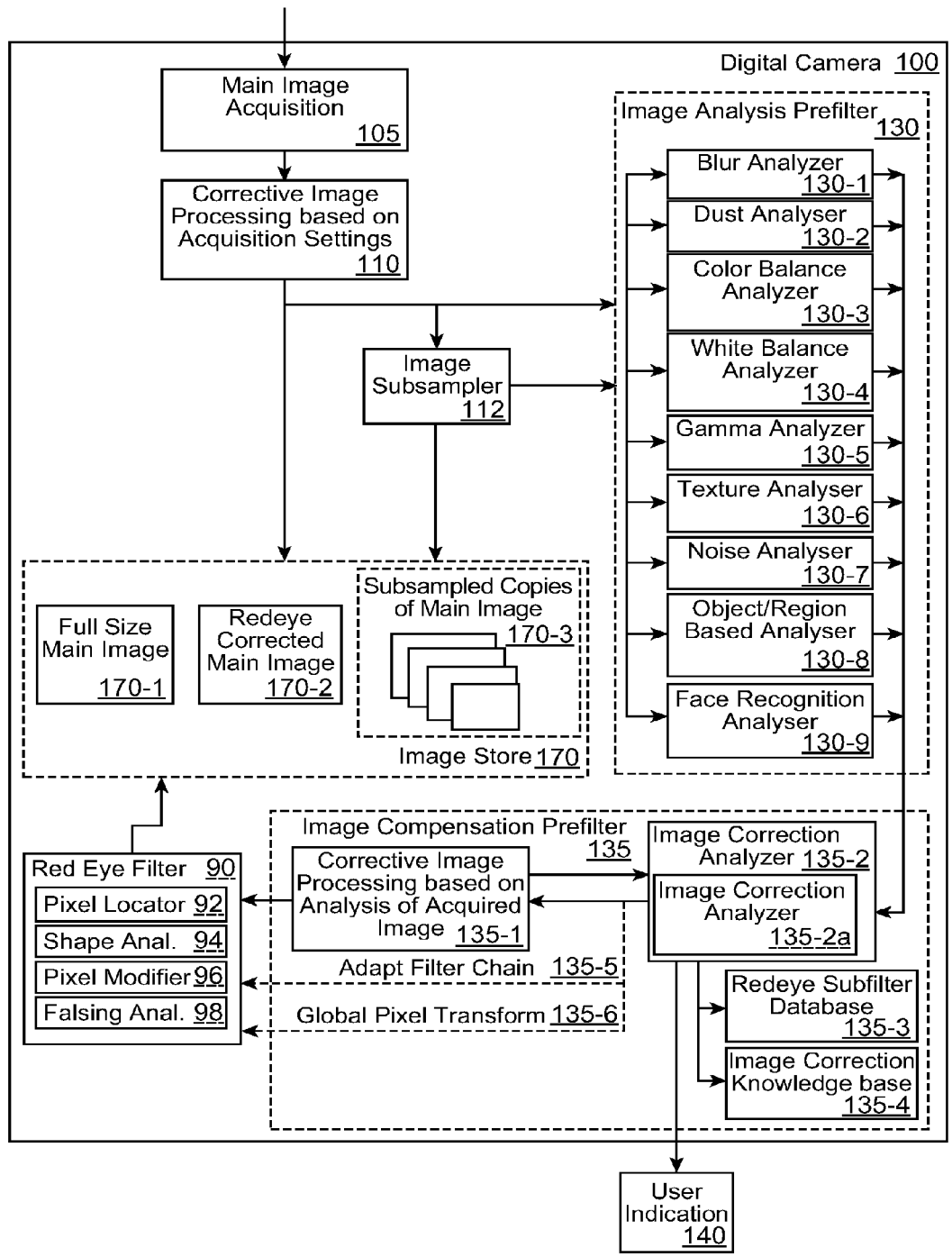
FIG. 1(b) shows an improved redeye detection system according to an embodiment of the present invention.

FIG. 1(b) illustrates a preferred embodiment of red-eye detection system according to the present invention. The system improves on the prior art by providing an additional image analysis prefilter 130 and an image compensation prefilter 135 to the prior art imaging chain to reduce the overall incidence of errors in the redeye detection process 90 for non-optimally acquired images.

The image analysis prefilter 130 combines one or more techniques for determining image quality. Such techniques are well known to one familiar in the art of image processing and in particular image editing and enhancements. Thus, the prefilter provides an in-camera analysis of a number of characteristics of an acquired, processed image with a view to determining if these characteristics lie within acceptable limits. It will be clear to those skilled in the art that the exact combination of analysis techniques will be dependent on the characteristics of the non-optimally acquired images generated by a particular digital camera. In addition, the determination of what image quality matters need to be addressed is primarily dependent on the effect of such characteristics on the red eye filter 90. Thus, as illustrative examples:

(i) a low-end digital camera may omit complex noise filtering circuitry on its sensor as it is targeted at cost-sensitive markets and may employ low quality optics for similar reasons. Thus it may be susceptible to a greater degree of image noise and exhibit a poor dynamic range for white and color balance;

(ii) a high-end professional camera will have a much greater dynamic range for color and white balance but may require more sophisticated image analysis to compensate for motion blur, sensor dust and other image distortions that are of concern to professional photographers.

Accordingly, examples of image analysis techniques are provided herein for exemplary purposes only. These are not intended to limit the techniques which may be utilized in implementing the present invention.

One subsystem of the image analysis prefilter is a blur analyzer 130-1, which performs an image analysis to determine blurred regions within a digital image—this operate on either the full size main image 170-1 or one or more subsampled copies of the image 170-3. One technique for in-camera blur detection is outlined in US patent application 2004/0120598 to Feng which describes a computationally efficient means to determine blur by analysis of DCT coefficients in a JPEG image. In common with the other subsystems of the prefilter 130, the analyser provides a measure of the blur in the supplied image(s) to be used later in the prefilter 135. This measure could be as simple as an index between 0 and 1 indicating the degree of blur. However, it could also indicate which regions of the image are blurred and the extent to which these are blurred.

A further subsystem of the image analysis prefilter is a dust analyzer 130-2. The problems caused by dust on imaging devices are well known in the prior art. In the context of the present invention it is important to track the location and severity of dust particles as these may interfere with the correct detection of eye-defects when the two forms of defect overlap. Of particular relevance are techniques where the detection of defects in a digital image is based solely on analysis of the digital image and that do not directly relate to the image acquisition process. For example U.S. Pat. No. 6,233,364 to Krainiouk et al. discloses determining anomalous image regions based on the difference between the gradient of an image at a set of grid points and the local mean of the image gradient. This technique generates few false positives in "noisy" regions of an image such as those representing leaves in a tree, or pebbles on a beach. U.S. Pat. No. 6,125,213 to Morimoto discloses detecting potential defect or "trash" regions within an image based on a comparison of the quadratic differential value of a pixel with a pre-determined threshold value. In addition, Morimoto discloses correcting "trash" regions within an image by successively interpolating from the outside of the "trash" region to the inside of this region—although this does not need to be performed by the subsystem 130-2. U.S. Pat. No. 6,266,054 to Lawton et al. discloses automating the removal of narrow elongated distortions from a digital image utilizing the characteristics of image regions bordering the distortion. US patent application 2003/0039402 and WIPO patent application WO-03/019473 both to Robins et al. disclose detecting defective pixels by applying a median filter to an image and subtracting the result from the original image to obtain a difference image. This is used to construct at least one defect map and as such provide a measure of the effect of dust on an image supplied to the subsystem 130-2.

U.S. Pat. No. 6,035,072 to Read discloses mapping defects or dirt, which affect an image acquisition device. Multiple images are processed and stationary components which are common between images are detected and assigned a high probability of being a defect. Additional techniques which are employed to modify defect probability include median filtering, sample area detection and dynamic adjustment of scores. This dynamic defect detection process allows defect compensation, defect correction and alerting an operator of the likelihood of defects, but from the point of view of the preferred embodiment, it is the map which is produced which indicates to the prefilter 135 the degree to which the supplied images are affected by dust and/or defects.

Additional subsystems of the image analysis prefilter are a white balance analyzer 130-3, a color balance analyzer 130-4, and a gamma/luminance analyzer 130-5. In the embodiment, each of these provides, for example, an indicator of the degree to which each of these characteristics deviates from optimal and by which the supplied image might be corrected. Those skilled in the art will realize that such techniques are practiced in a digital camera as part of corrective image processing based on acquisition settings 110. Prior art techniques which can be employed in certain embodiments also exist for post-processing of an acquired image to enhance its appearance. Some representative examples are now described:

U.S. Pat. No. 6,249,315 to Holm teaches how a spatially blurred and sub-sampled version of an original image can be used to obtain statistical characteristics of a scene or original image. In Holm, this information is combined with the tone reproduction curves and other characteristics of an output device or media to provide an enhancement strategy for digital images, whereas in the preferred embodiment, an analysis prefilter employing the technique of Holm preferably provides the color characteristics of the supplied image to the prefilter 135.

U.S. Pat. No. 6,268,939 to Klassen et al. teaches correcting luminance and chrominance data in digital color images. Specifically, Klassen is concerned with optimizing the transformations between device dependent and device independent color spaces by applying subsampling of the luminance and chrominance data.

U.S. Pat. No. 6,192,149 to Eschback et al. discloses improving the quality of a printed image by automatically determining the image gamma and then adjusting the gamma of a printer to correspond to that of the image. Although Eschback is concerned with enhancing the printed quality of a digital image and not the digital image itself, if does teach a means for automatically determining the gamma of a digital image and as such can be used in an analysis pre-filter in embodiments of the present invention. U.S. Pat. No. 6,101,271 to Yamashita et al. discloses implementing a gradation correction to an RGB image signal which allows image brightness to be adjusted without affecting the image hue and saturation.

A further subsystem of the image analysis prefilter is an image texture analyzer 130-6 which allows texture information to be gathered from the acquired and processed main image. This information can be useful both in determining different regions within an image and, when combined with information derived from other image analysis filters such as the blur analyzer 130-1 or a noise analyzer 130-7 it can enable automatically enhancement of an image by applying deblurring or denoising techniques. US patent application 2002/0051571 to Jackway et al discloses texture analysis for digital images. US patent application 2002/0090133 to Kim et al discloses measuring color-texture distances within a digital images and thus offering improved segmentation for regions within digital images.

A further subsystem of the image analysis prefilter is the noise analyzer 130-7 which produces a measure of the effect of noise on the image supplied to the subsystem 130-7. A further illustrative subsystem of the image analysis prefilter 130 is an object/region analyzer 130-8 which allows localized analysis of image regions. One particular region which will invariably be found in an image with eye-defects is a human face region. The detection of a face region in an image with eye-defects is simplified as described in US patent application 2004/0119851 to Kaku. Again, an analysis pre-filter employing Kaku would therefore provide indicators of where faces regions are to be found in a supplied image to the pre-filter 135.

The last illustrative subsystem of the image analysis pre-filter 130 is a face recognition analyzer 130-9 which includes a database of pre-determined data obtained from training performed on a personal image collection (not shown) loaded onto the digital camera in order to recognize a person associated with a determined region possibly acquired by the analyzer 130-8 and to provide an indicator of the person or person(s) whose faces have been recognized in an image. Alternatively, the face recognition analyzer 130-9 may provide an indicator of the types of any faces recognized in the image provided to the pre-filter 130-9, for example, a child or adult face, or African, Asian or Caucasian face.

In one embodiment, the analyzer 130-9 comprises a set of classifiers which enable multiple sets of face (and non-face) data to be combined to provide improved recognition of persons found in an image. The types of classifiers used can be based on skin colour, age characteristics, eye-shape and eye-brow thickness, the person's hair and clothing, and poses associated with a person and whether or not a person may be wearing makeup, such as eye-shadow or lipstick, or glasses obtained from the training performed on the personal image collection.

One particular advantage of employing a face recognition analyzer 130-9 as an element of the image analysis prefilter is that it enables additional image processing modules to perform face and peripheral region analysis which will enable a determination of known persons within an image. A more detailed description of the recognizer 135-2a is provided in co-pending application Ser. No. 11/027,001 which is incorporated by reference. For the person recognizer to function more effectively an additional database component containing classifier signatures associated with known persons is required. This database will typically be derived from a personal collection of images maintained by the owner of a digital camera and, in most typical embodiments these will be stored off-camera. Further details on the creation and management of exemplary embodiments of such image collections and associated off-camera and in-camera databases is given in U.S. application Ser. Nos. 10/764,339, 10/764,336, 10/764,335, 10/764,274, 10/763,801 and 11/027,001, which are hereby incorporated by reference.

The image analysis prefilter may also incorporate a module to separate background and foreground regions of an image (not shown). Such a module is described in U.S. application Ser. No. 11/217,788, which is incorporated by reference, and may be advantageously employed to reduce the area of an image to which a redeye filter is applied, thus speeding up the execution time. In such a case the image is not necessarily corrected, or the filter chain is not necessarily adapted but the method of application of the filter chain to the image is altered.

Turning now to the image compensation prefilter 135. In the present embodiment, a combination of image correction analyzer 135-2 and a redeye subfilter database 135-3
  (i) interpret the results of the image analysis performed by the image analysis prefilter 130;
  (ii) if corrective image processing is active, determine an optimal correction strategy for application to the acquired, processed image, or a subsampled copy thereof;
  (iii) if adaption of the redeye filter chain is implemented, determine any parameter/filter conflicts and further determines an optimal adaption of the redeye filter chain (described later); and
  (iv) if both corrective image processing and filter adaption are active, determine an optimal combination of each.

For example, if the analyzer 130-9 has recognized one or more persons or types of person in an image, a customized redeye filter set stored as a set of rules in the database 135-3 may be applied to the image. To understand how such customization can improve the performance of a redeye filter we cite some examples of known aspects of the redeye phenomenon which are person specific.

For example, children and babies tend to be particularly susceptible to redeye. They are also more prone to certain types of redeye, e.g. "bright-eye" where the eye is almost completely white with only a reddish periphery, which are more difficult to analyze and correct.

Racial characteristics tend to cause differences in the color characteristics of the redeye phenomenon. For example, Asian people often exhibit a dull reddish or even "brownish" form of redeye; persons of Indian extraction can exhibit redeye effects with a distinctly "purplish" hue. The extent of these characteristics may vary somewhat from individual.

As such, knowledge of the type of person in an image can be used by the analyzer 135-2 to determine the filters, the order of the filters and the filter parameters to be applied to an image. For example, the filter parameters may be changed on the basis of skin color in that a distinctive set of prototype values could be available for each person; age characteristics, to enable a higher tolerance of certain color and luminance-based filters; eye-shape and eye-brow thickness which are person specific; and whether or not a person is wearing glasses, which can introduce strong glints resulting in detection errors for standard filter sets. Similarly, the filter order may be changed depending on the 'identity' of the person in the image, i.e. whether or not the person is wearing makeup and/or glasses. For example, if a person is wearing eye-shadow or lipstick, certain skin filters would not be applied.

Instead alternative filters could be used to determine a uniform colour/texture in place of the normal skin filter.

The actual corrective image processing 135-1 will typically be implemented as a library of image processing algorithms which may be applied in a variety of sequences and combinations to be determined by the image correction analyzer 135-2. In many digital cameras some of these algorithms will have partial or full hardware support thus improving the performance of the compensation prefilter 135.

The analysis prefilter 130 can operate on a subsampled copy of the main image 170-3, as discussed above. In the same way the detection phase of the redeye filter 90 can be applied to a subsampled copy of the main image 170-3, although not necessarily of the same resolution. Thus where corrective image processing is used by the image compensation prefilter it will also be applied to a subsampled copy of the main image 170-3. This has significant benefits with respect to computation speed and computing resources, making it particularly advantageous for in-camera embodiments.

The image correction analyzer 135-2 may not always be able to determine an optimal correction strategy for an acquired, processed image due to conflicts between image processing algorithms, or between the filter adaptations required for the redeye filter chain. In other instances, where a strategy can be determined but the image correction analyzer 135-2 may be aware that the strategy is marginal and may not improve image quality it may be desirable to obtain user input. Thus the image correction analyzer 135-2 may generate a user indication 140 and in certain embodiments may also employ additional user interaction to assist in the image correction and redeye filter processes.

Figure 2A:
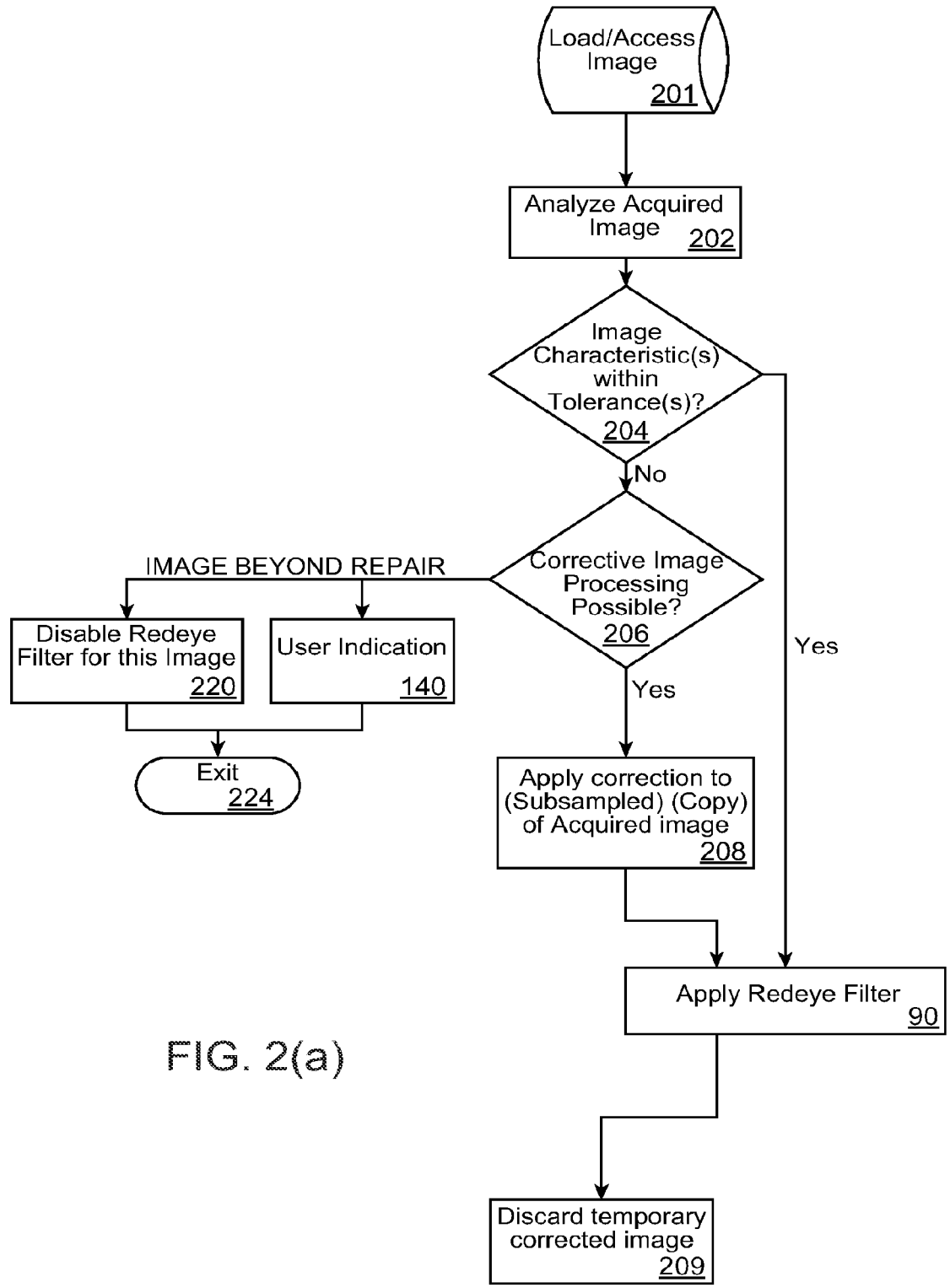
FIG. 2(a) is a flowchart illustrating the operation of the system of FIG. 1(b)

FIG. 2a to FIG. 2e illustrate several alternative embodiments of the present invention which are described as follows:

(i) In FIG. 2(a) an acquired, processed main image, or alternatively a subsampled copy thereof, is initially loaded, step 201 to respective sub-systems of the analysis prefilter 130, step 202. These produce their measurements and a determination is made if any of the image quality characteristics lie within or outside acceptable thresholds is made by the image correction analyzer 135-2, step 204. If image quality is within acceptable limits for each of the image characteristics analyzed then the redeye filter 90 can be applied normally and no corrective image processing is required. However, if certain image characteristics do lie outside acceptable tolerances then additional analysis is performed by the analyzer 135-2 to determine if corrective image processing can be applied 206. If some of the analyzed image characteristics lie too far outside acceptable thresholds, or if a disadvantageous combination of image characteristics is determined, it may not be possible to correct the image reliably prior to applying the redeye filter. Thus the filter 90 can be disabled 220, a user indication 140 can be provided and processing is completed for this particular image 224, without performing the red eye correction or performing the process with lower probability of success. However, if the image can be repaired, 206—YES, the image is corrected step 208, prior to executing the red eye algorithm 90. In the preferred embodiment, the process of correcting the image, 208 may be performed on the full resolution image, or alternatively on a subsampled image or a copy of the image. The exact nature and possibilities for such corrections, 208, whether locally or globally are described later. In any case, the corrected image needs only be stored temporarily and can be discarded after red-eye processing is complete, 209. It should be noted that performing the pre-filtering, 208 on the image, does not means that the actual red-eye detection and reduction algorithm, 90 has to be modified to account for possible variability. Nonetheless, as image quality supplied to the filter 90 is improved, the red eye algorithm can use tighter parameters and more well defined restrictions as to the nature of the red eye features that are to be identified so producing improved results.

Figure 2B:
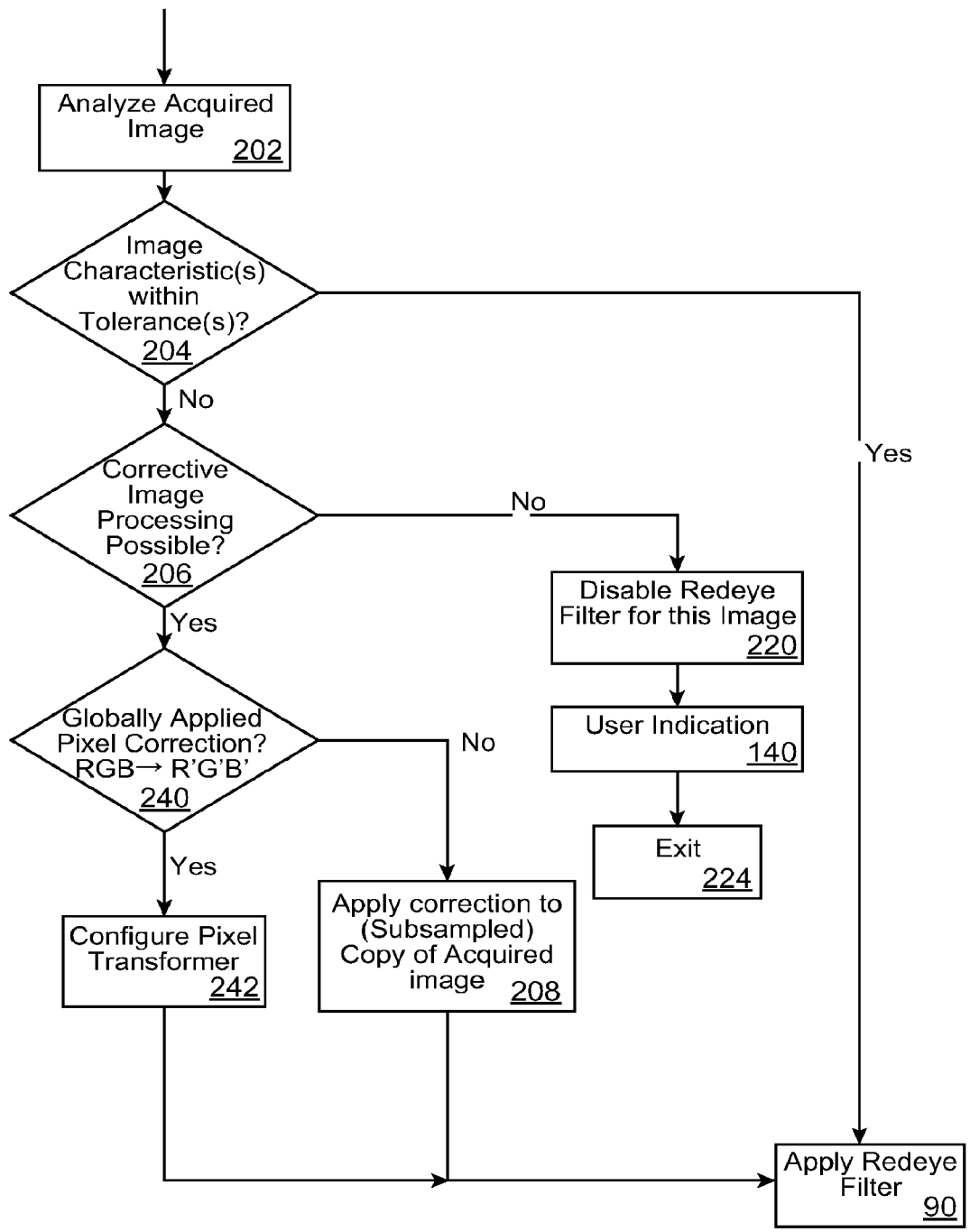
FIG. 2(b) is a flowchart illustrating an alternative mode of operation of the system of FIG. 1(b)

(ii) FIG. 2(b) corresponds with FIG. 2(a) except that it includes an additional determining step, 240 which follows the determination that corrective image processing is possible, 206. This additional step determines if the corrective image processing to be applied to the image can be provided by a globally applied transformation of the image pixels. The most popular global transformations are matrix multiplication or lookup table transformations. For example, the analysis provided by filters 130-3 . . . 130-5 may indicate to the analyzer 135-2 that the principle cause of image non-optimality is a reddish color cast. In this case, a simple transformation of the red image component, R-->R' is sufficient to compensate for the image non-optimality. Another example will be an image that is under exposed and a tone reproduction curve (TRC) needs to be corrected. Global transformations have the advantage of being relatively computationally efficient and with a potential to be highly optimized. In addition, such transformations may be performed within the redeye filter 90 itself, for example, as part of the pixel locator and region segmentation process 92 described in more detail later in relation to FIGS. 3 and 5, so reducing the overhead involved in performing this correction. For the moment, it is sufficient to say that in step 242, a pixel transformation within the pixel locator and region segmentor 92 of the red-eye filter is configured. It will also been seen that the steps 240, 242 may be performed as an alternative to other corrections step 208, in parallel with other corrections or in series with other corrections prior to execution of the red-eye filter 90.

Figure 2C:
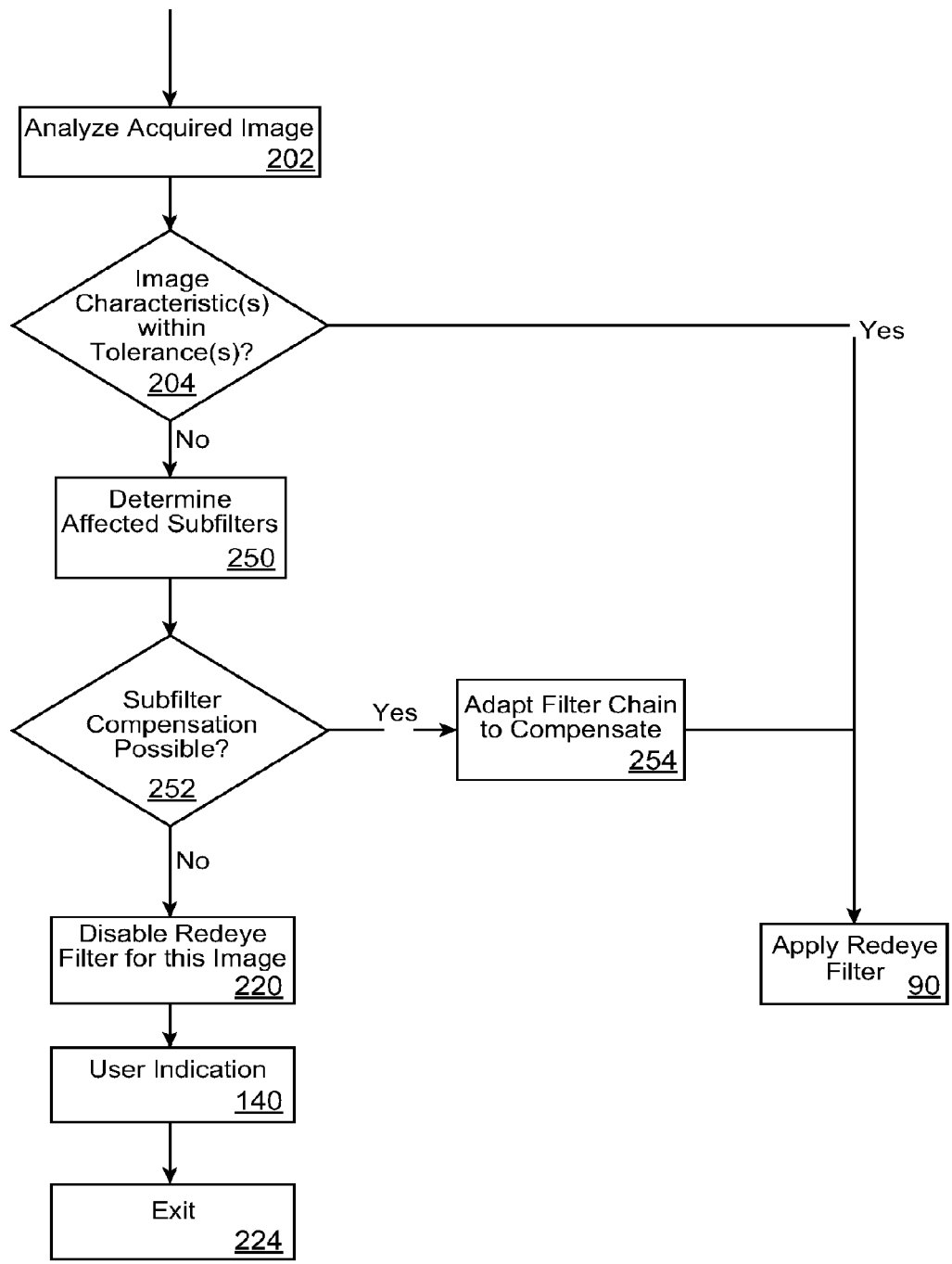
FIG. 2(c) illustrates another alternative mode of operation of the system of FIG. 1(b)

(iii) In FIG. 2(c) instead of corrective image processing to compensate for a non-optimally acquired image, the analyzer 135-2 adapts the redeye filter chain to provide image compensation for the redeye detection process. Steps 202 and 204 are identical with previous embodiments. However, when an image characteristic lies outside acceptable tolerances, the analyzer 135-2 determines the redeye subfilters affected by said out-of-tolerance image characteristic, step 250. Typically this determining step will involve the image correction analyzer 135-2 obtaining the relevant data from an in-camera data repository such as the redeye subfilter database 135-3. After the affected subfilters have been determined 250, the next step is to determine if subfilter compensation is possible 252. This will depend on the different image characteristics which are outside acceptable thresholds and the relevant sets of redeye subfilters affected by each out-of-tolerance image characteristic. If filter chain adaption is possible then the filter chain is modified 254 and the redeye filter is applied 90. If subfilter compensation is not possible due to filter, or parameter-based conflicts then steps 220, 140, and 224 are performed as in the previous embodiments. The subfilter determining process is further described in FIG. 4(b) and an overview of the redeye subfilter matrix is given in FIG. 3.

The following example illustrates the concept of applying the results of the analysis stage to modify the filter chain of the correction process and the red eye detection process as opposed to modification of the image pixels. It is assumed that a pixel $\{R_0,G_0,B_0\}$ after the needed correction, step 208, is transformed to pixel value $\{R_1,G_1,B_1\}$ by a transformation T: $T[\{R_0, G_0, B_0\}]=\{R_1, G_1, B_1\}$. For illustrative purposes, we assume that the first stage of the red eye detection algorithm, as defined in block 92 of FIG. 1(a) is comparison to a known value, to determine if the pixel is, in simplified terms, red or not. The value of the pixel in to compare with is $\{R',G',B'\}$. However, the two steps above of correcting and comparing may be combined simply by transforming the static value of {R',G',B'} based on the inverse of the correction transformation. Thus, the preliminary preparatory stage will be: {R", G', B"}=T$^{-1}$[{R', G', B'}] and the pixel by pixel comparison, as adapted, step 254 to the necessary needed transformations will comprise the following test: IF {R$_0$, G$_0$, B$_0$}≧{R",G",B"}. By doing so, the entire image is not corrected, but the comparison is similar to the state as if the image was corrected. The complexity and number of necessary steps compared to the original algorithm is exactly the same, with the extra value that the image algorithm now is taking into account the sub-optimal quality of the image.

Mathematically speaking:

$$T[\{R_0,G_0,B_0\}]\alpha\{R',G',B'\}=\{R_0,G_0,B_0\}\alpha T^{-1}[\{R',G',B'\}]=\{R_0,G_0,B_0\}\alpha\{R'',G'',B''\}$$

Where α denotes the relationship between the objects.

Of course, such adaptation may be more complex than the simplified example above, and may include change of multiple values in the algorithm or change in the order the various filters are applied, or change in the weight of the various filters. However, the improvement in performance may justify the added architectural complexity.

Figure 2D:
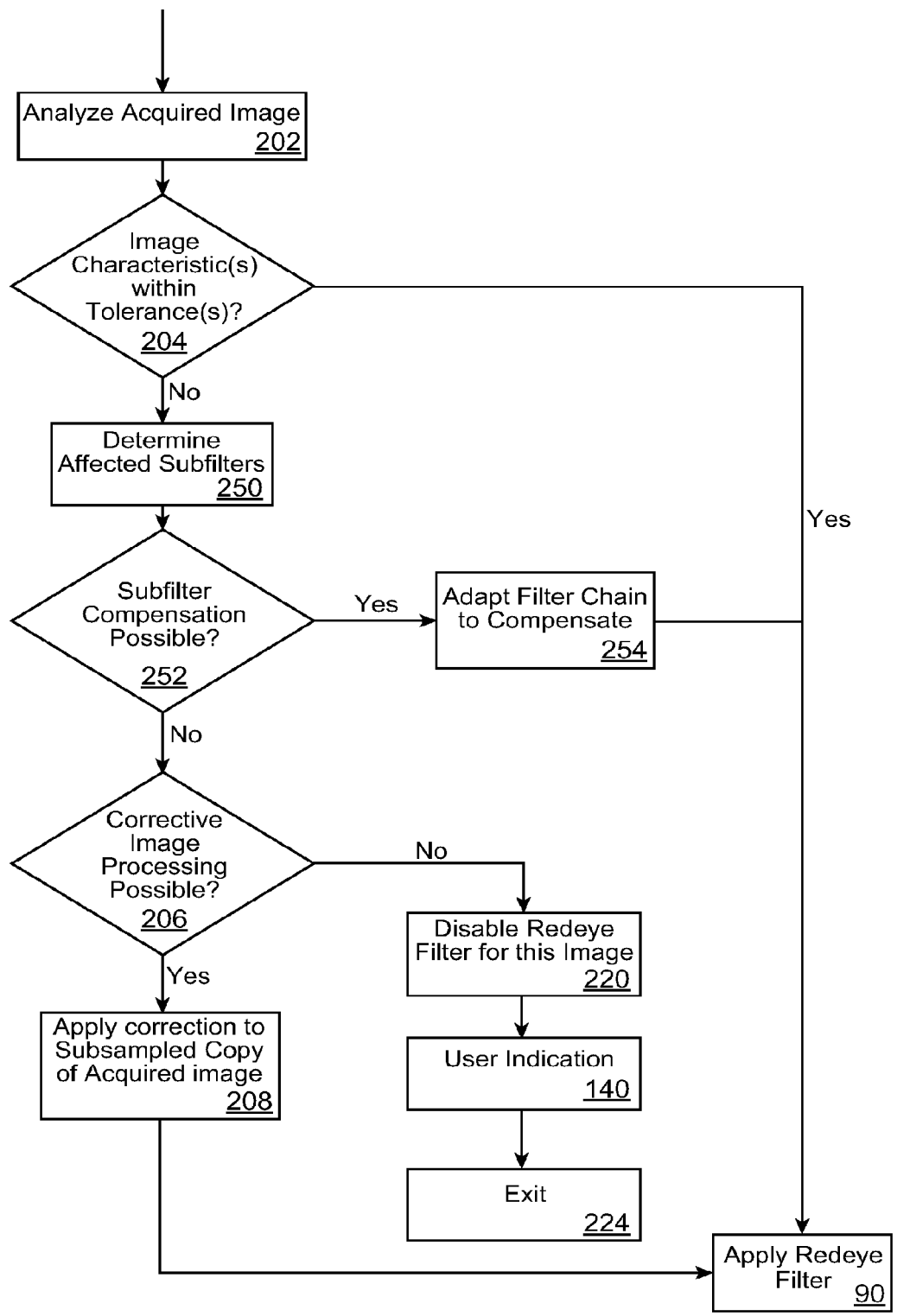
FIG. 2(d) is a flowchart illustrating a further alternative mode of operation of the system of FIG. 1(b)

(iv) FIG. 2(d) illustrates a combination of the embodiments described in 2(b) and 2(c). This embodiment is identical to the previous embodiments except that if subfilter compensation is not possible 252 it incorporates two additional steps to determining if corrective image processing can be applied 206 and if this is possible a second step 208 to apply said corrective image processing. Note that subfilter adaption is preferred to corrective image processing as it requires practically no computational resources, but only changes the input parameters of the subfilters which comprise the redeye filter chain and the composition and order-of-execution of the chain itself. However in certain circumstances correction of the original acquired image by image processing means may provide more reliable redeye detection, or be desirable as an end in itself.

Figure 2E:
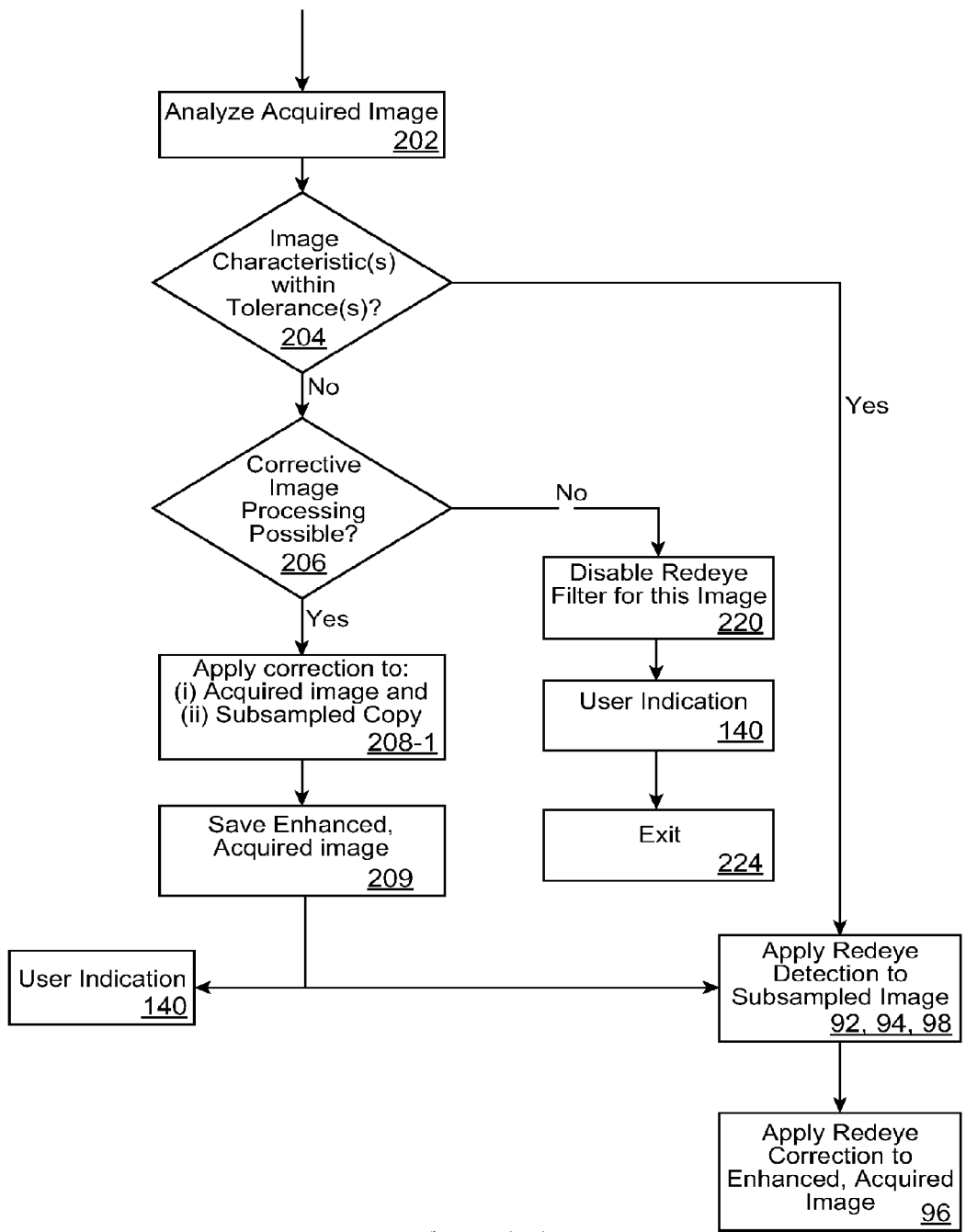
FIG. 2(e) is a flowchart illustrating a still further alternative mode of operation of the system of FIG. 1(b)

(v) FIG. 2(e) describes an alternative variation of the algorithm. This is identical to the embodiment of FIG. 2(a) except that after determining if corrective image processing is possible 206, corrective image processing is applied to both the main acquired image 170-1 and a subsampled copy 170-3 thereof, step 208-1. A second additional step then saves the corrected acquired image 170-2, in the main image store 170, step 209, and a user indication 140 is generated to inform the camera user that an improved image is available. Additional steps may be added to allow the user to select between original 170-1 and corrected images 170-2 if so desired. In this embodiment, redeye detection 92, 94, 98 is applied to the corrected subsampled copy of the main acquired image and the redeye correction 96 is applied to the corrected copy of the main acquired image. In other embodiments corrective image processing would not be applied to the full-sized main image 170-1 so that the redeye correction would be applied to the uncorrected main image.

Figure 3:
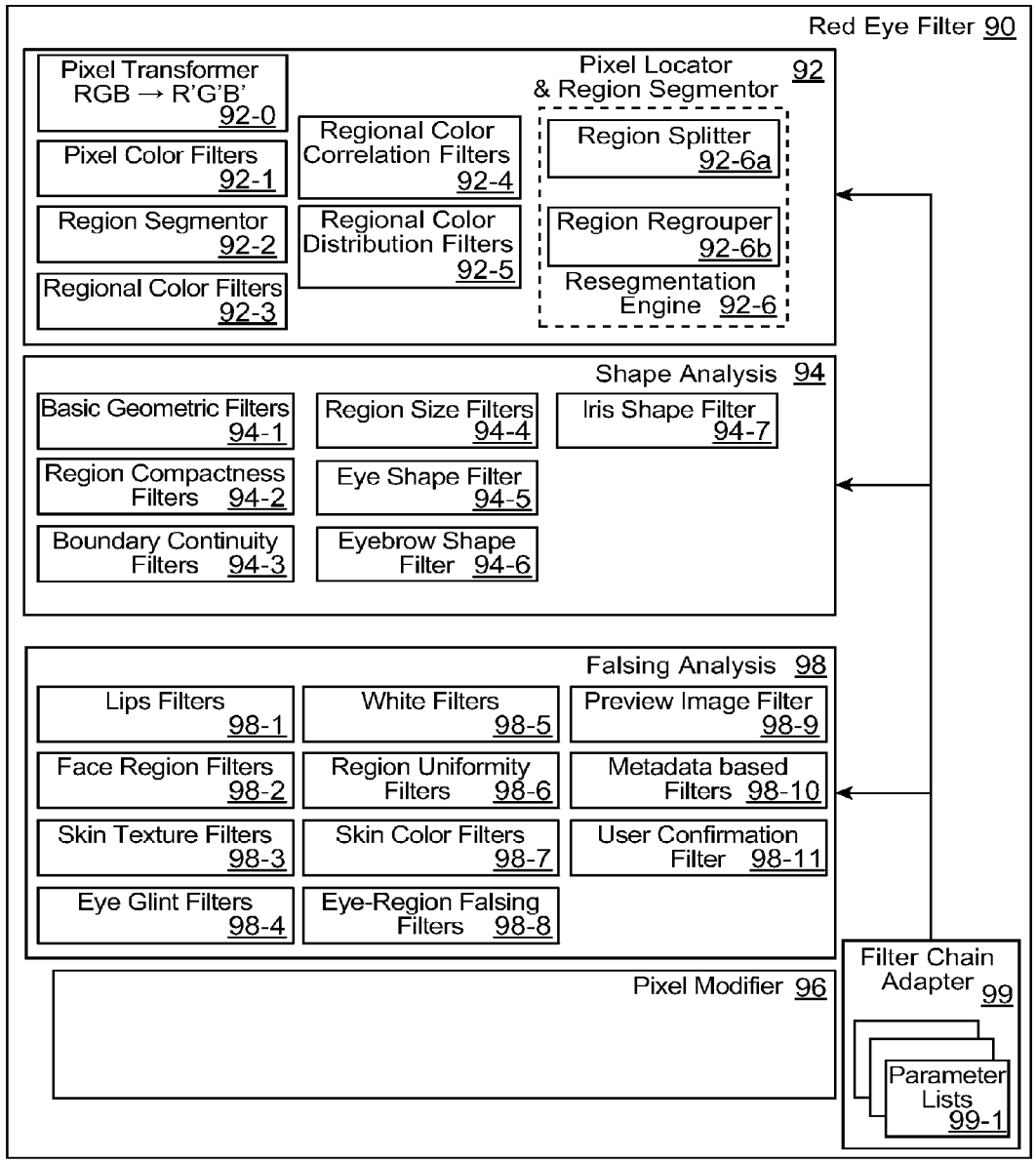
FIG. 3 shows the redeye filter chain of FIG. 1(b) in more detail.

FIG. 3 shows the principle subfilter categories which exist within the main redeye filter 90. While each of the component filters will be referred to in sequence, it will be appreciated that where appropriate more than one of these filters may be applied at a given time and the decisions above to modify the filter chain can include a decision not alone as to which filters may be executed in a sequence, but also on which filters can be applied in parallel sequences. As described above, the pixel transformer filter 92-0 allows global pixel-level transformations of images during color determining and pixel grouping operations. Also, within the pixel locator and region segmentor 92 we find pixel color filters 92-1 which perform the initial determining if a pixel has a color indicative of a flash eye defect; a region segmentor 92-2 which segments pixels into candidate redeye groupings; regional color filters 92-3, color correlation filters 92-4, and color distribution filters 92-5 which operate on candidate regions based these criteria. In addition the pixel locator and region segmentor 92 contains two additional functional blocks which do not contribute directly to the color determining and segmentation operations but are nevertheless intertwined with the operation of the pixel locator and region segmentor. The resegmentation engine 92-6 is a functional block which is particularly useful for analyzing difficult eye defects. It allows the splitting 92-6a and regrouping 92-6b of borderline candidate regions based on a variety of threshold criteria.

After candidate eye-defect groupings have been determined by the segmentor 92, a shape analyzer 94 next applies a set of subfilters to determine if a particular candidate grouping is physically compatible with known eye-defects. Thus some basic geometric filters are first applied 94-1 followed by additional filters to determine region compactness 94-2 and boundary continuity 94-3. Further determining is then performed based on region size 94-4, and a series of additional filters then determine if neighboring features exist which are indicative of eye shape 94-5, eyebrows 94-6 and iris regions 94-7. In certain embodiments of the present invention the redeye filter may additionally use anthropometric data to assist in the accurate determining of such features.

Now the remaining candidate regions are passed to a falsing analyzer 98 which contains a range of subfilter groups which eliminate candidate regions based on a range of criteria including lips filters 98-1, face region filters 98-2, skin texture filters 98-3, eye-glint filters 98-4, white region filters 98-5, region uniformity filters 98-6, skin color filters 98-7, and eye-region falsing filters 98-8. Further to these standard filters a number of specialized filters may also be included as part of the falsing analyzer 98. In particular we mention a category of filter based on the use of acquired preview images 98-9 which can determine if a region was red prior to applying a flash. This particular filter may also be incorporated as part of the initial region determining process 92, as described in co-pending U.S. application Ser. No. 10/919,226 filed Aug. 16, 2004, entitled "Red-Eye Filter Method And Apparatus" herein incorporated by reference. An additional category of falsing filter employs image metadata determined from the camera acquisition process 98-10. This category of filter can be particularly advantageous when combined with anthropometric data as described in PCT Application No. PCT/EP2004/008706, U.S. Pat. No. 7,352,394, and US publications US20040223063, US20040140801 and US20050041121, hereby incorporated by reference.

An additional category of filter is a user confirmation filter 98-11 which can be optionally used to request a final user input at the end of the detection process. This filter can be activated or disabled based on how sub-optimal the quality of an acquired image is.

The pixel modifier 96 is essentially concerned with the correction of confirmed redeye regions. Where an embodiment of the invention incorporates a face recognition module 130-9 then the pixel modifier may advantageously employ data from an in-camera known person database (not shown) to indicate aspects of the eye color of a person in the image. This can have great benefit as certain types of flash eye-defects in an image can destroy all indications of the original eye color.

In the preferred embodiment, an additional component of the redeye filter 90 is a filter chain adapter 99. This component is responsible for combining, and sequencing the subfilters of the redeye filter 90 and for activating each filter with a set of input parameters corresponding to the parameter list(s) 99-1 supplied from the image compensation prefilter 135.

Finally, it is remarked in the context of FIG. 3 that although the pixel locator & region segmentor 92, the shape analyzer 94 and the falsing analyzer 98 are illustrated as separate components it is not intended to exclude the possibility that subfilters from these components may be applied in out-of-order sequences. As an illustrative example, regions which pass all the falsing filters except for the region uniformity filter 98-6 may be returned to the resegmentation engine 92-6 to determine if the region was incorrectly segmented. Thus a subfilter from the pixel locator and region segmentor 92 may be used to add an additional capability to the falsing analysis 98.

Figure 4A:
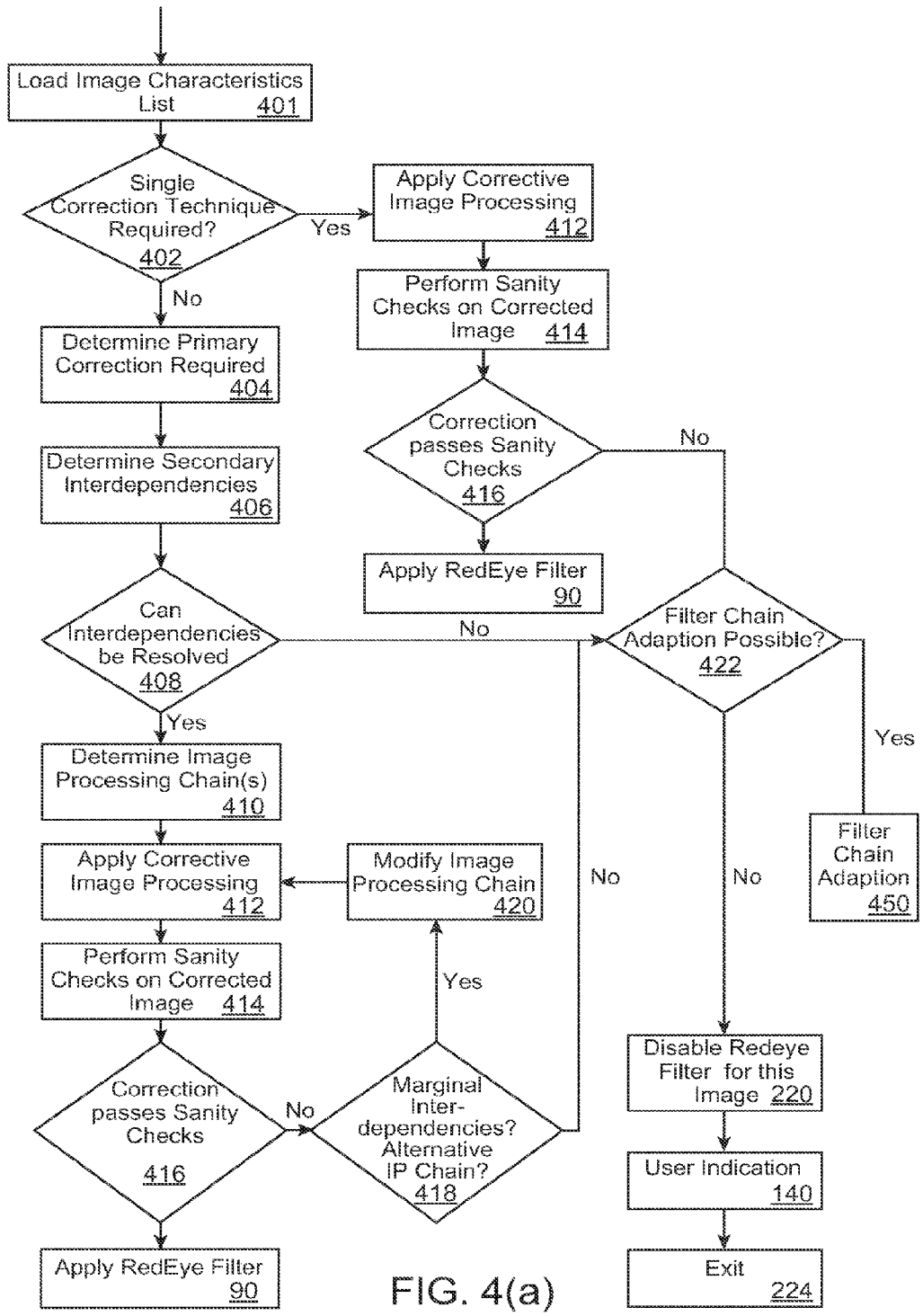
FIG. 4(a) illustrates the operation of portions of FIGS. 2(a), 2(b), 2(d) & 2(e) in more detail.
Figure 4B:
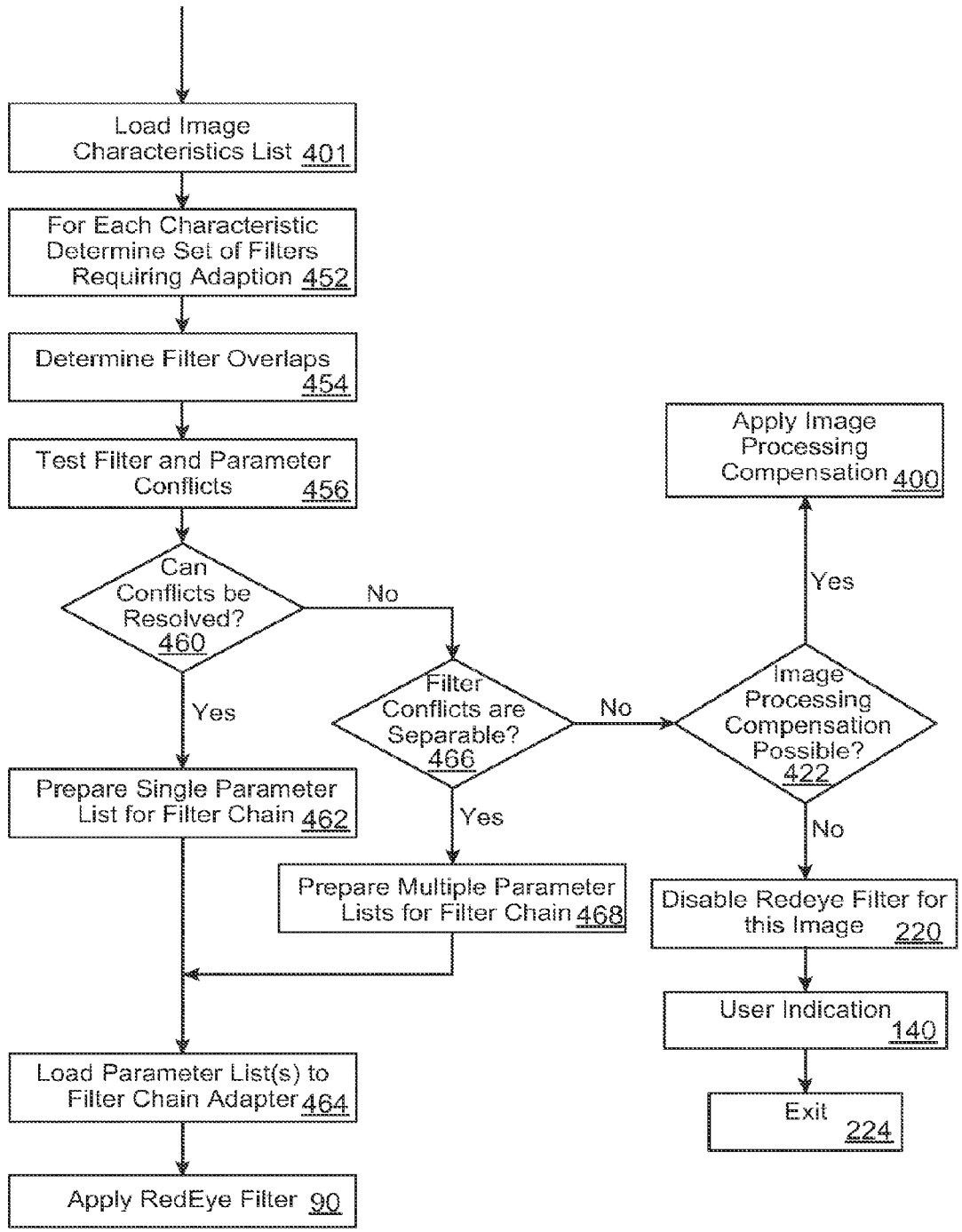
FIG. 4(b) illustrates an alternative implementation of FIG. 4(a)
Figure 4C:
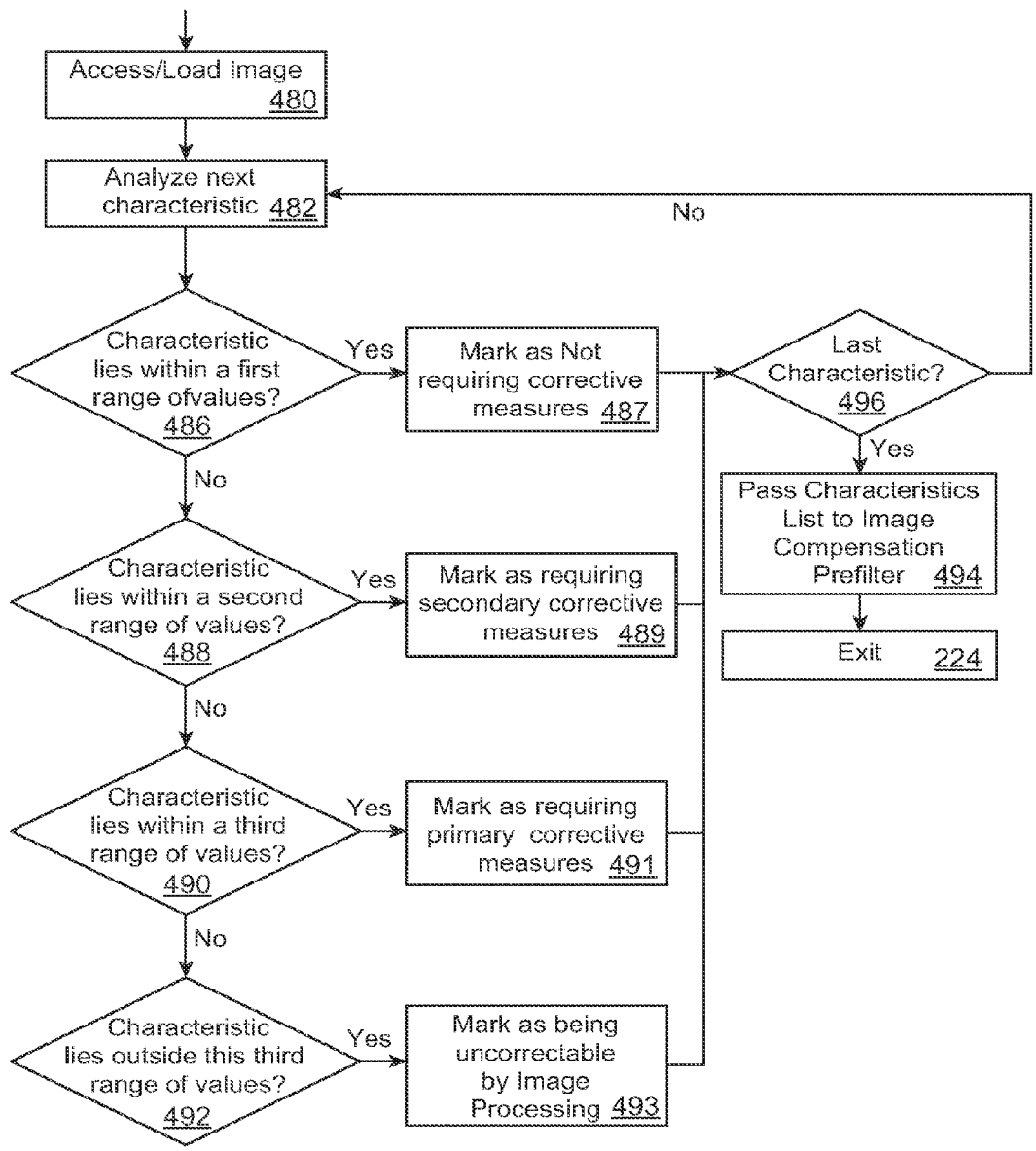
FIG. 4(c) is a flowchart illustrating the operation of a portion of the system of FIG. 1(b)

FIG. 4 shows in more detail the operation of the image analysis 130 and image compensation prefilters 135. In this example the operation of the compensation prefilter 135, and more particularly the operation of the image correction analyzer 135-2 has been separated into two functional modes: FIG. 4(*a*) illustrates the workflow for the determining and performing corrective image processing (so corresponding generally to steps 206, 208 of FIG. 2(*a*),(*b*),(*d*) and (*e*)) while FIG. 4(*b*) describes the determining and performing filter chain adaption including determining if a single chain, or a combination of multiple filter chains will compensate for the non-optimal image characteristics determined by the image analysis prefilter 130 (so corresponding generally to step 250,252 and 254 of FIGS. 2(*c*) and 2(*d*)). FIG. 4(*c*) illustrates an exemplary embodiment of the workflow of the image analysis prefilter 130.

In FIG. 4(*a*) the image correction analyzer 135-2 first loads an image characteristic list 401 obtained from the image analysis prefilter 130. This list will allow the correction analyzer to quickly determine if a simple image correction is required or if a number of image characteristics will require correction 402. In the case of a single characteristic the correction analyzer can immediately apply the relevant corrective image processing 412 followed by some tests of the corrected image 414 to ensure that image quality is at least not deteriorated by the applied corrective technique. If these tests are passed 416 then the image can be passed on to the redeye filter 90 for eye defect correction. Otherwise, if corrective image processing has failed the sanity tests 416 then an additional test may be made to determine if filter chain adaption is possible 422. In this case the algorithm will initiate the workflow described in FIG. 4(*b*) for determining the required filter chain adaptations 450. If corrective image processing has failed 416 and filter chain adaption is not possible 422 then the correction analyzer will disable the redeye filter for this image 220, and provide a user indication to that effect 140 after which it will pass control back to the main in-camera application 224. Note that in certain embodiments the user indication may be interactive and may provide an option to allow the normal redeye filter process to proceed on the uncorrected image, or alternatively offer additional user-selectable choices for additional image analysis and/or correction strategies.

Now returning to the determining step between single and multiple image characteristics requiring correction 402 we now describe the correction approach for multiple image characteristics. Typically an image which was non-optimally acquired will suffer from one major deficiency and a number of less significant deficiencies. We will refer to these as primary and secondary image deficiencies. The next step in the workflow process is to determine the primary image deficiency 404. After this has been successfully determined from the image characteristics list the next step is to determine interdependencies between this primary correction and secondary image characteristics. Typically there will be more than one approach to correcting the primary image characteristic and the correction analyzer must next determine the effects of these alternative correction techniques on the secondary image characteristics 406 before correction can be initiated. If any of the secondary characteristics are likely to deteriorate significantly and all alternative correction technique for the primary image characteristic are exhausted then the correction analyzer may determine that these interdependencies cannot be resolved 408. In the present embodiment an additional test is next made to determine if filter chain adaption is possible 422. In this case the algorithm will initiate the workflow described in FIG. 4(*b*) for determining the required filter chain adaptations 450. If corrective image processing has failed 416 and filter chain adaption is not possible 422 then the correction analyzer will disable the redeye filter for this image 220, and provide a user indication to that effect 140 after which it will pass control back to the main in-camera application 224.

Given that the secondary interdependencies can be resolved 408 the correction analyzer next proceeds to determine the image processing chain 410. In certain embodiments this step may incorporate the determining of additional corrective techniques which can further enhance the primary correction technique which has been determined. In such an embodiment the correction analyzer will, essentially, loop back through steps 404, 406, and 408 for each additional correction technique until it has optimized the image processing chain. It is further remarked that the determining of step 408 will require access to a relatively complex knowledgebase 135-4. In the present embodiment this is implemented as a series of look-up-tables (LUTs) which may be embedded in the non-volatile memory of a digital camera. The content of the knowledgebase is highly dependent on (i) the image characteristics determined by the image analysis prefilter and (ii) the correction techniques available to the compensation prefilter and (iii) the camera within which the invention operates. Thus it will be evident to those skilled in the art that the knowledgebase will differ significantly from one embodiment to another. It is also desirable that said knowledgebase can be easily updated by a camera manufacturer and, to some extent, modified by an end-user. Thus various embodiments would store, or allow updating of the knowledgebase from (i) a compact flash or other memory card; (ii) a USB link to a personal computer; (iii) a network connection for a networked/wireless camera and (iv) from a mobile phone network for a camera which incorporates the functionality of a mobile phone. In other alternative embodiments, where the camera is networked, the knowledgebase may reside on a remote server and may respond to requests from the camera for the resolving of a certain set of correction interdependencies.

An example of image characteristics determined by the image analysis prefilter is a person or type of person recognized by the analyzer 130-9. Once a person or type of person has been recognized using the face recognition analyzer, 130-9, it is necessary to determine whether a customized redeye filter set is available and if it has been loaded onto the camera. If this data is not available, or if a person could not be recognized from a detected face, a generic filter set will be applied to the detected face region. If a person is recognized, the redeye filter will be modified according to a customized profile loaded on the camera and stored in the database 135-3. In general, this profile is based on an analysis of previous images of the recognized person or type of person and is designed to optimize both the detection and correction of redeye defects for the individual or type of person.

In particular, certain types of flash eye defects may completely destroy the iris color of an eye. This cannot be restored by conventional image processing. However, if a simple model of a person's eye is available from the image correction knowledgebase 135-4 which incorporates the appropriate geometric, dimensional and color information is available then a much improved means of redeye correction can be provided.

Now once the corrective image processing chain has been determined it is applied to the image 412 and a number of sanity checks are applied 412 to ensure that the image quality is not degraded by the correction process 416. If these tests fail then it may be that the determined interdependencies were marginal or that an alternative image processing strategy is still available 418. If this is so then the image processing chain is modified 420 and corrective image processing is reapplied 412. This loop may continue until all alternative image processing chains have been exhausted. It is further remarked that the entire image processing chain may not be applied each time. For example, if the difference between image processing chains includes a single filter, then a temporary copy of the input image to that filter may be kept and the filter may be reapplied with different parameter settings. If, however, step 418 determines that all corrective measures have been tried, it will next move to step 422 which determines if filter chain adaption is possible. Now returning to step 416, if the corrective image processing is applied successfully then the image is passed on to the redeye filter 90.

FIG. 4(*b*) describes an alternative embodiment of the correction analyzer 135-2 which determines if filter chain adaption is possible and then modifies the redeye filter appropriately. Initially the image characteristics list is loaded 401 and for each characteristic a set of filters which require adaption is determined 452. This is achieved through referencing the external database 135-3 and the comments and discussion provided in the context of the image correction knowledgebase 135-4 apply equally here.

Now once the filter lists for each image characteristic have been determined the correction analyzer must determine which filters overlap a plurality of image characteristics 454 and, additionally determine if there are conflicts between the filter adaptations required for each of multiple image characteristics 456. If such conflicts exist the correction analyzer must next decide if they can be resolved 460. To provide a simple illustrative example we consider two image characteristics which both require an adaption of the threshold of the main redness filter in order to compensate for the measured non-optimality of each. If the first characteristic requires a lowering of the redness threshold by, say, 10% and the second characteristic requires a lowering of the same threshold by, say 15% then the correction analyzer must next determine from the knowledgebase the result of compensating for the first characteristic with a lowered threshold of 15% rather than the initially requested 10%. Such an adjustment will normal be an inclusive one and the correction analyzer may determine that the conflict can be resolved by adapting the threshold of the main redness filter to 15%. However it might also determine that the additional 5% reduction in said threshold will lead to an unacceptable increase in false positives during the redeye filtering process and that this particular conflict cannot be simply resolved.

If such filter conflicts cannot be simply resolved an alternative is to determine if they are separable 466. If they are separable that implies that two distinct redeye filter processes can be run with different filter chains and the results of the two detection processes can be merged prior to correcting the defects. In the case of the example provided above this implies that one detection process would be run to compensate for a first image characteristic with a threshold of 10% and a second detection process will be run for the second image characteristic with a threshold of 15%. The results of the two detection processes will then be combined in either an exclusive or an inclusive manner depending on a separability determination obtained from the subfilter database 135-3. In embodiments where a face recognition module 130-9 is employed a separate detection process may be determined and selectively applied to the image for each known person.

Returning to step 460, we see that if filter conflicts can be resolved, the correction analyzer will prepare a single filter chain parameter list 462 which will then be loaded 464 to the filter chain adapter 99 of the redeye filter 90 illustrated in FIG. 3. Alternatively, if filter conflicts cannot be resolved, but are determined to be separable 466 the correction analyzer prepares a number of parameter lists 468 for the filter chain adapter which are then loaded 464 as in the previous case. The redeye filter is then applied 90.

However, if filter conflicts cannot be resolved and are not separable the correction analyzer will then make a determination if image processing compensation might be possible 422. If so then the image processing compensation workflow of FIG. 4(*a*) may be additionally employed 400. If it is determined that image processing compensation is not possible then the correction analyzer will disable the redeye filter for this image 220, and provide a user indication to that effect 140 after which it will pass control back to the main in-camera application 224.

FIG. 4(*c*) describes the workflow of the image analysis prefilter 130 illustrated in FIG. 1(*b*). This performs an image processing analysis of at least one image characteristic according to at least one of a plurality of image processing techniques. Preferably, the output of this analysis should be a simple measure of goodness of the analyzed image characteristic. For the purposes of an exemplary discussion we suppose that said measure is a percentage of the optimum for said characteristic. Thus 100% represents perfect quality for the measured image characteristic; values above 95% represent negligible image distortions/imperfections in said characteristic; values above 85% represent noticeable, but easily correctable distortions/imperfections and values above 60% represent major distortions/imperfections which require major image processing to correct the image characteristic. Values below 60% imply that the image is too badly distorted to be correctable.

The first step in this workflow is to load or, if it is already loaded in memory, to access the image to be analyzed. The analysis prefilter next analyzes a first characteristic of said image 482 and determines a measure of goodness. Now if said characteristic is above a first threshold (95%) 486 then it is marked as not requiring corrective measures 487 in the characteristic list. If it is below said first threshold, but above a second threshold (85%) 488 then it is marked as requiring secondary corrective measures 489. If it is below said second threshold, but above a third threshold (60%) 490 then it is marked as requiring primary corrective measures 491 and if below said third threshold 492 it is marked as uncorrectable 493. Now it is remarked that for some embodiments of the present invention which combine corrective image processing with filter chain adaption there may be two distinct sets of thresholds, one relating to the correctability using image processing techniques and the second relating to the degree of compensation possible using filter chain adaption. We further remark that for image compensation through filter chain adaption that certain filters may advantageously scale their input parameters directly according to the measure of goodness of certain image characteristics. As an illustrative example consider the redness threshold of the main color filter which, over certain ranges of values, may be scaled directly according to a measure of excessive "redness" in the color balance of a non-optimally acquired image. Thus, the image characteristic list may additionally include the raw measure of goodness of each image characteristic. In an alternative embodiment only the raw measure of goodness will be exported from the image analysis prefilter 130 and the threshold based determining of FIG. 4(c) will be performed within the correction analyzer 135-2 in which case threshold values may be determined from the image correction knowledge-base 135-4.

Returning to 493 we note that images of such poor quality may require a second image acquisition process to be initiated and so it is implicit in 493 that for certain embodiments of the present invention it may be desirable that an alarm/interrupt indication is sent to the main camera application.

Now the main loop continues by determining if the currently analyzed characteristic is the last image characteristic to be analyzed 496. If not it returns to analyzing the next image characteristic 482. If it is the last characteristic it then passes the image characteristics list to the image compensation prefilter 494 and returns control to the main camera application 224. It should be remarked that in certain embodiments that a plurality of image characteristics may be grouped together and analyzed concurrently, rather than on a one-by-one basis. This may be preferable if several image characteristics have significant overlap in the image processing steps required to evaluate them. It may also be preferable where a hardware co-processor or DSP unit is available as part of the camera hardware and it is desired to batch run or parallelize the computing of image characteristics on such hardware subsystems.

A third principle embodiment has already been briefly described. This is the use of a global pixel-level transformation of the image within the redeye filter itself and relies on the corrective image processing, as determined by the correction analyzer 135-2, being implementable as a global pixel-level transformation of the image. Those skilled in the art will realize that such a requirement implies that certain of the image analyzer elements which comprise the image analysis prefilter 130 are not relevant to this embodiment. For example dust analysis, object/region analysis, noise analysis and certain forms of image blur cannot be corrected by such transformations. However many other image characteristics are susceptible to such transformations. Further, we remark that this alternative embodiment may be combined with the other two principle embodiments of the invention to compliment each other.

Figures 5A, 5B:
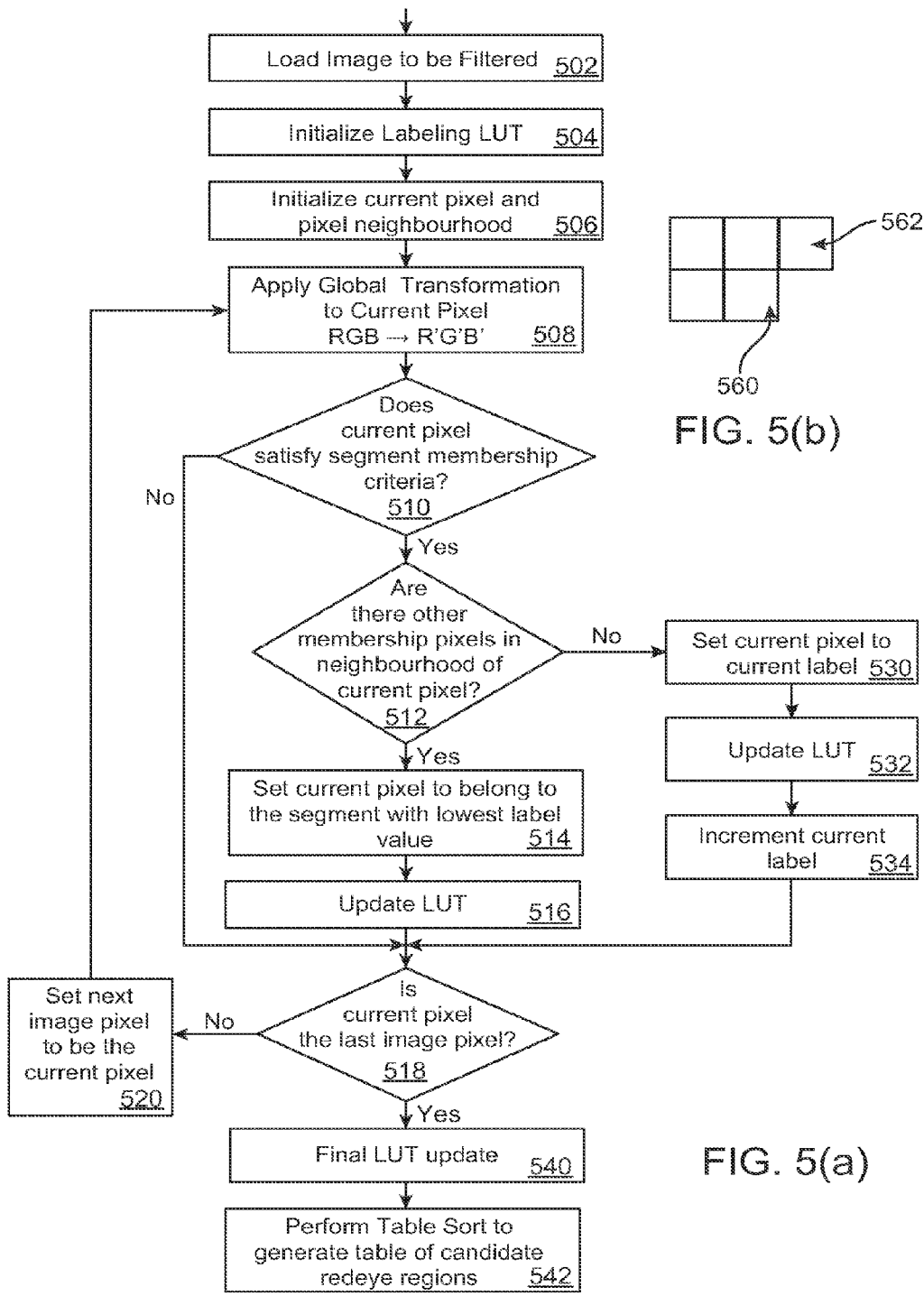
FIGS. 5(a) and 5(b) illustrate the operation of a red-eye filter chain according to an embodiment of the present invention.
Figure 6A:
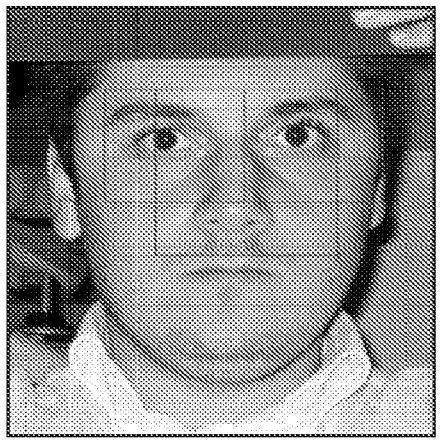
FIGS. 6A, 6B, 6C and 6D includes illustrative digital images having partial face regions within red and green boxes that each include eyes with red eye defects. Other regions outside the green and red boxes do not include any eyes and are not included within a subsample representation that is analyzed in certain embodiments in a process that includes modifying an area determined to be indicative of red eye phenomenon.
Figure 6B:
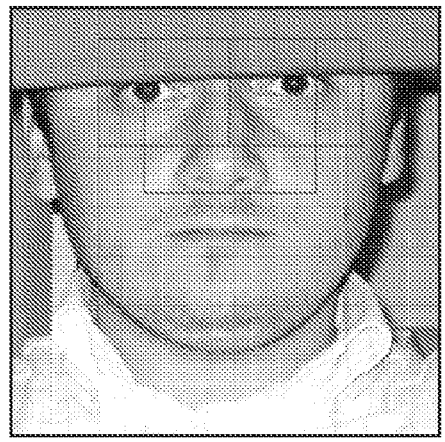
Figure 6C:
Figure 6D:
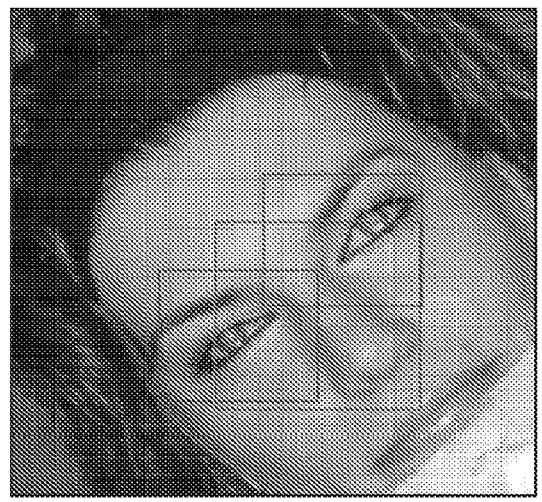

In FIG. 5(a) we illustrate an exemplary embodiment of the red pixel locating and red region segmenting workflow which occurs within the redeye filter as steps 92-1 and 92-2. This workflow has been modified to incorporate a global pixel-level transformation 92-0 of the image as an integral element of the color determining and region grouping steps of the redeye filter. It is implicit in this embodiment that the correction analyzer has determined that a global pixel level transformation can achieve the required image compensation. The image to be processed by the redeye filter is first loaded 502 and the labeling LUT for the region grouping process in initialized 504. Next the current pixel and pixel neighborhoods are initialized 506.

FIG. 5(b) shows a diagrammatic representation of a 4-pixel neighborhood 562, shaded light gray in the figure and containing the three upper pixels and the pixel to the left of the current pixel 560, shaded dark gray in the figure. This 4-pixel neighborhood is used in the labeling algorithm of this exemplary embodiment. A look-up table, LUT, is defined to hold correspondence labels.

Returning to step 506 we see that after initialization is completed the next step for the workflow of FIG. 5(a) is to begin a recursive iteration through all the pixels of an image in a raster-scan from top-left to bottom-right. The first operation on each pixel is to apply the global pixel transformation 508. It is assumed that the loaded image is an RGB bitmap and the global pixel transformation is of the form:

$$P(R,G,B) \rightarrow P(R',G',B'),$$

where the red, green and blue values of the current pixel, P(R,G,B) are mapped to a shifted set of color space values, P(R',G',B'). There are a number of advantages in performing this corrective transformation at the same time as the color determining and pixel grouping. In particular it is easier to optimize the computational performance of the algorithm which is important for in-camera implementations. Following step 508 the workflow next determines if the current pixel satisfies membership criteria for a candidate redeye region 510. Essentially this implies that the current pixel has color properties which are compatible with an eye defect; this does not necessarily imply that the pixel is red as a range of other colors can be associated with flash eye defects. If the current pixel satisfies membership criteria for a segment 510, i.e., if it is sufficiently "red", then the algorithm checks for other "red" pixels in the 4-pixel neighborhood 512. If there are no other "red" pixels, then the current pixel is assigned membership of the current label 530. The LUT is then updated 532 and the current label value is incremented 534. If there are other "red" pixels in the 4-pixel neighborhood then the current pixel is given membership in the segment with the lowest label value 514 and the LUT is updated accordingly 516. After the current pixel has been labeled as part of a "red" segment 512 or 530, or has been categorized as "non-red" during step 510, a test is then performed to determine if it is the last pixel in the image 518. If the current pixel is the last pixel in the image then a final update of the LUT is performed 540. Otherwise the next image pixel is obtained by incrementing the current pixel pointer 520 and returning to step 508 and is processed in the same manner. Once the final image pixel is processed and the final LUT completed 540, all of the pixels with segment membership are sorted into a labeled-segment table of potential red-eye segments 542.

With regard to the exemplary details of corrective image processing 135-1 which may be employed in certain embodiments, a broad range of techniques exist for automatic or semi-automatic image correction and enhancement. For ease of discussion we can group these into 6 main subcategories as follows:

(i) Contrast Normalization and Image Sharpening.
  (ii) Image Color Adjustment and Tone Reproduction Scaling.
  (iii) Exposure Adjustment and Digital Fill Flash
  (iv) Brightness Adjustment with Color Space Matching; Image Auto-Gamma determination with Image Enhancement.
  (v) In-Camera Image Enhancement
  (vi) Face Based Image Enhancement All categories may be global correction or local region based.

(i) Contrast Normalization and Image Sharpening:

U.S. Pat. No. 6,421,468 to Ratnakar et al. disclose sharpening an image by transforming the image representation into a frequency-domain representation and by selectively applying scaling factors to certain frequency domain characteristics of an image. The modified frequency domain representation is then back-transformed into the spatial domain and provides a sharpened version of the original image. U.S. Pat. No. 6,393,148 to Bhaskar discloses automatic contrast enhancement of an image by increasing the dynamic range of the tone levels within an image without causing distortion or shifts to the color map of said image.

(ii) Color Adjustment and Tone Scaling of a Digital Image:

US patent application 2002/0105662 to Patton et al. discloses modifying a portion of an image in accordance with colormetric parameters. More particularly it discloses the steps of (i) identifying a region representing skin tone in an image; (ii) displaying a plurality of renderings for said skin tone; (iii) allowing a user to select one of said renderings and (iv) modifying the skin tone regions in the images in accordance with the rendering of said skin tone selected by the user. U.S. Pat. No. 6,438,264 to Gallagher et al. discloses compensating image color when adjusting the contrast of a digital color image including the steps of (i) receiving a tone scale function; (ii) calculating a local slope of the tone scale function for each pixel of the digital image; (iii) calculating a color saturation signal from the digital color image and (iv) adjusting the color saturation signal for each pixel of the color image based on the local tone scale slope. The image enhancements of Gallagher et al. are applied to the entire image and are based on a global tone scale function. Thus this technique may be implemented as a global pixel-level color space transformation. U.S. Pat. No. 6,249,315 to Holm teaches how a spatially blurred and sub-sampled version of an original image can be used to obtain statistical characteristics of a scene or original image. This information is combined with the tone reproduction curves and other characteristics of an output device or media to provide an enhancement strategy for optimized output of a digital image. All of this processing can be performed automatically, although the Holm also allows for simple, intuitive manual adjustment by a user.

(iii) Digital Fill Flash and Post-Acquisition Exposure Adjustment

US patent application 2003/0052991 to Stavely et al. discloses simulating fill flash in digital photography. In Stavely a digital camera shoots a series of photographs of a scene at various focal distances. These pictures are subsequently analyzed to determine the distances to different objects in the scene. Then regions of these pictures have their brightness selectively adjusted based on the aforementioned distance calculations and are then combined to form a single, photographic image. US patent application 2001/0031142 to Whiteside is concerned with a scene recognition method and a system using brightness and ranging mapping. It uses autoranging and brightness measurements to adjust image exposure to ensure that both background and foreground objects are correctly illuminated in a digital image. Other references focus on the application of corrections and enhancement of the entire image, rather than on selected regions of an image and thus discuss the correction of image exposure and tone scale as opposed to fill flash. Example patents include U.S. Pat. No. 6,473,199 to Gilman et al. which describes a method for correcting for exposure in a digital image and includes providing a plurality of exposure and tone scale correcting nonlinear transforms and selecting the appropriate nonlinear transform from the plurality of nonlinear transforms and transforming the digital image to produce a new digital image which is corrected for exposure and tone scale. U.S. Pat. No. 5,991,456 to Rahman et al. describes a method of improving a digital image. The image is initially represented by digital data indexed to represent positions on a display. The digital data is indicative of an intensity value Ii (x,y) for each position (x,y) in each i-th spectral band. The intensity value for each position in each i-th spectral band is adjusted to generate an adjusted intensity value for each position in each i-th spectral band. Each surround function Fn (x,y) is uniquely scaled to improve an aspect of the digital image, e.g., dynamic range compression, color constancy, and lightness rendition. For color images, a novel color restoration step is added to give the image true-to-life color that closely matches human observation.

However, regional analysis and regional adjustment of image intensity or exposure levels may be advantageously applied in certain embodiments. U.S. Pat. No. 5,818,975 to Goodwin et al. teaches area selective exposure adjustment. Goodwin describes how a digital image can have the dynamic range of its scene brightness reduced to suit the available dynamic brightness range of an output device by separating the scene into two regions—one with a high brightness range and one with a low brightness range. A brightness transform is derived for both regions to reduce the brightness of the first region and to boost the brightness of the second region, recombining both regions to reform an enhanced version of the original image for the output device. This technique is analogous to an early implementation of digital fill flash. Another example is U.S. Pat. No. 5,724,456 to Boyack et al. which teaches brightness adjustment of images using digital scene analysis. Boyack partitions the image into blocks and larger groups of blocks, known as sectors. It then determines an average luminance block value. A difference is determined between the max and min block values for each sector. If this difference exceeds a pre-determined threshold the sector is marked active. A histogram of weighted counts of active sectors against average luminance sector values is plotted and the histogram is shifted to using a pre-determined criteria so that the average luminance sector values of interest will fall within a destination window corresponding to the tonal reproduction capability of a destination application or output device.

(iv) Brightness Adjustment; Color Space Matching; Auto-Gamma.

Another area of image enhancement relates to brightness adjustment and color matching between color spaces. For example U.S. Pat. No. 6,459,436 to Kumada et al. describes transforming image date from device dependent color spaces to device-independent Lab color spaces and back again. Image data is initially captured in a color space representation which is dependent on the input device. This is subsequently converted into a device independent color space. Gamut mapping (hue restoration) is performed in the device independent color space and the image data may then be mapped back to a second device-dependent color space. U.S. Pat. No. 6,268,939 to Klassen et al. is also concerned correcting luminance and chrominance data in digital color images. More specifically Klassen is concerned with optimizing the transformations between device dependent and device independent color spaces by applying subsampling of the luminance and chrominance data. Another patent in this category is U.S. Pat. No. 6,192,149 to Eschback et al. which discloses improving the quality of a printed image by automatically determining the image gamma and then adjusting the gamma of a printer to correspond to that of the image. Although Eschback is concerned with enhancing the printed quality of a digital image and not the digital image itself, if does teach a means for automatically determining the gamma of a digital image. This information could be used to directly adjust image gamma, or used as a basis for applying other enhancements to the original digital image. U.S. Pat. No. 6,101,271 to Yamashita et al. discloses implementing a gradation correction to an RGB image signal which allows image brightness to be adjusted without affecting the image hue and saturation.

(v) In-Camera Image Enhancement

U.S. Pat. No. 6,516,154 to Parulski et al. discloses suggesting improvements to a digital image after it has been captured by a camera. The user may crop, re-size or adjust color balance before saving a picture; alternatively the user may choose to re-take a picture using different settings on the camera. The suggestion of improvements is made by the camera user-interface. However Parulski does not teach the use of image analysis and corrective image processing to automatically initiate in-camera corrective actions upon an acquired digital image.

(vii) Face-Based Image Enhancement

In US patent application 20020172419, Lin et al., discloses automatically improving the appearance of faces in images based on automatically detecting such images in the digital image. Lin describes modification of lightness contrast and color levels of the image to produce better results.

Additional methods of face-based image enhancement are described in co-pending US publication US2006204110, and U.S. application Ser. Nos. 11/024,046 and PCT/US2006/021393, which are hereby incorporated by reference.

In one alternative embodiment the prefilter is a partial face filter. As described previously it is well known to determine facial regions and to employ this knowledge to narrow the search region for elements of an image such as red-eye. Often, however, an accurately determined face region will not be directly available and additional image processing will be required to delineate said face region. However, where an approximate or partial face region is available within an imaging device and where certain physical or geometric or spatial characteristics of said approximate or partial face region are known it is possible to adapt the red-eye filter chain correspondingly, achieving a faster or more accurate analysis of flash eye defects within that approximate or partial face region.

As illustrative examples we distinguish a number of generic forms of approximate or partial face region which may be available within a digital image acquisition device, and where knowledge of such a face-patch may be advantageously employed to adapt the red-eye filter chain.

Partial Face Regions

A portable processor-based device having an image acquisition component includes a lens and an image sensor for capturing digital images. The device further includes a processor being programmed by digital code embedded in one or more processor-readable media to perform a method for red-eye detection in an acquired digital image. The method may include acquiring a first image; analyzing one or more partial face regions within the first image, including determining one or more characteristics of the first image; identifying one or more corrective processes including red eye correction that can be beneficially applied to said first image according to said one or more characteristics; and applying said one or more corrective processes to said first image.

Red-eye defects may be detected in a second acquired image based on the analyzing and identifying with regard to the first image. The applying may include applying a chain of two or more red-eye filters to the first image. Prior to the detecting red eye defect in the second acquired image, it may be determined that the red-eye filter chain can be adapted for application to the second acquired image. Then, the chain of two or more red-eye filters is adapted accordingly. A third acquired image may be corrected based on analysis of the second acquired image. The first, second and third images may include different versions of a same image. One or more of the first and second images may include a sub-sampled copy of the third image.

In certain embodiments, a partial face region within the image is not among the one or more partial face regions identified within the image that are analyzed. The analysis may be performed in part on a full resolution partial face region and in part on a subsample resolution of at least one different partial face region. The first and second images may include versions of a same image, or different images of substantially a same scene. One or more of the images may include a sub-sampled copy of an acquired image.

The analyzing may include recognizing one or more faces or types of faces, or both, within the first image.

The red-eye filter may include a pixel locator and segmentor; a shape analyzer; a falsing analyzer; or a pixel modifier, or combinations thereof.

The one or more corrective processes may include a color space transformation.

A corresponding method is also provided, as are digital storage media having processor-readable code embedded therein for programming a processor to perform the method.

In certain embodiments face detection can be performed more quickly on a subsampled image than is possible on a final (full-sized and/or full-resolution) image. It is further advantageous in certain embodiments for the subsampled image to include one or more partial face regions, while excluding: one or more non-face regions, and/or one or more other partial face regions that do not include an eye or at least not any red eyes.

In one particularly advantageous embodiment, a prefilter includes a partial face filter. Now it is well known to determine facial regions and to employ this knowledge to narrow the search region for elements of an image such as red-eye. Often, however, an accurately determined face region will not be directly available and additional image processing will be required to delineate the face region. It can also be resource intensive to search for full faces in digital images. However, where an approximate or partial face region detector is available within an imaging device as part of the device hardware, or as an optimized firmware module, and where certain physical or geometric or spatial characteristics of an approximate or partial face region are known (for whatever reason, including being provided by an automatic or manual full face detector that can be followed by an eye region detector, or a partial face detector or direct eye region detector), it is possible to adapt red-eye filter parameters, or filter chain correspondingly, achieving a faster and/or more accurate analysis of flash eye defects within that approximate or partial face region.

As illustrative examples, a number of generic forms of approximate or partial face regions may be available within a digital image acquisition device. Knowledge of face-patches and/or partial face regions may be advantageously employed to adapt red-eye filter parameters or to add and/or remove filters from, or otherwise adapt a red-eye filter chain.

Among face-based regions are full face regions and partial face regions. Other regions include foreground and portrait regions and combinations of these regions. An advantageous red eye filter can utilize any of a wide variety of example regions among available face-based regions, foreground regions and portrait regions. Face-based regions may be determined using face detection, face tracking and/or face recognition techniques such as those described in any one or more of U.S. Pat. Nos. 7,466,866, 7,515,740, 7,460,695, 7,469,055, 7,403,643, 7,460,694, 7,315,630, 7,315,631, 7,551,754, 7,565,030, 7,551,755, 7,558,408, 7,555,148, 7,564,994, 7,362,368, 7,269,292, 7,471,846, 7,574,016, 7,440,593, and 7,317,815, and U.S. Ser. Nos. 12/026,484, 11/861,854, 12/362,399, and 12/354,707. Foreground regions may be determined using techniques such as those described in U.S. Pat. No. 7,336,821, and US20060285754, US20060093238, and US20070269108, and U.S. Ser. No. 11/573,713. Portrait region determinations may be made in accordance with US20070147820.

A full face region may include a region, typically rectangular, which contains a full face with all of the significant facial features at least including two eyes a nose and a mouth, and may require hair, chin, forehead, ears and/or another region or regions. Raw face regions may be extracted from detection processes on a main acquired image. Probably the best known face detection method is that attributed to Viola-Jones (see, e.g., U.S. Pat. Nos. 7,020,337, 7,031,499, 7,099, 510, and 7,197,186). A predicted face region may be a region determined from a face tracker acting on a preview image stream, where a face is very likely to be found in the main acquired image (MAI). A refined face region may include a detected face that is not frontal or where illumination is uneven. There may be erroneous results from a raw detection and it is often beneficial to further refine the location of the face using edge detection, color segmentation (skin) and/or other techniques.

Partial face regions are sub-regions of a face which are often available from image pre-processing within an acquisition device or printer. Examples include half-face, top face, and eye strip. A half-face may include a left or right half face region. A method for extracting such is described in U.S. application Ser. No. 61/084,942. A top face is a region limited to the face above the mouth and also perhaps above the nose, although the cut-off point may be determined or set in individual component processes. A top face region may include the hair region, but this is optional. A specific face classifier cascade can be trained to detect the eye-nose and surrounding face region, while avoiding the lips, chin, beard and other parts of the bottom part of the face. These bottom regions can be problematic and require additional analysis filters to be added to the chain, and so use of top face can be advantageous. An eye strip includes a horizontal strip of the face region which contains the eyes only, among the main facial features.

Foreground image regions may include portions of the image which are closer to the camera. Foreground analysis methods may be combined with a face detector and additional post processing to ensure, for example, that full hair and clothing are retained in a foreground region when desired.

There are a number of variants including raw foreground, portrait-foreground combined, face foreground-portrait combined and refined portrait. Raw foreground implies foreground regions without any face/portrait analysis. Portrait foreground combined uses both foreground/background analysis along with a portrait template. A portrait template may be used in such as way that a user can position a person being photographed within the template to optimize portrait image quality. In this process, face detection may be considered optional. In a face foreground-portrait combined process, face detection is combined with foreground/background analysis to provide a refined portrait region. This can include, for example, a full face and/or a triangular region of the image containing the top-portion of the subject's body. Refined portrait employs a combination of face and portrait template, and foreground/background, and can also include color segmentation (see, e.g., US20080175481) and/or top-head filling (see, e.g., US20070269108). This variant provides a very accurate head-full-hair-full body to be delineated in the image.

A knowledge that an image region is likely to contain a face and that the type of image regions is a member of one of the above categories, or refinements thereof, can be advantageously employed to adapt a red-eye filter chain applied to the image patch.

Note that where the term "red-eye" is used in this description, it is meant to include along with red-eye also generic flash-eye defects such as golden, eye, white eye and zombie eye. Thus elements may be added to the filter chain to enable detection of such non-red defects. Image processing techniques according to certain embodiments for such defects are described in US20070116379, US20080049970, US20090189998, and US20090123063, and US20080122599, and U.S. Pat. No. 7,336,821, which are hereby incorporated by reference.

In an exemplary embodiment an image is acquired within the device (or analyzed within a printer). Certain pre-processing information is available from the device, or metadata is obtained from a pre-processing subsystem such as a real-time face tracker, or foreground/background segmentation unit, or portrait analyzer, which distinguishes specific regions within the MAI. These regions fall into at least one of the categories described above. Based on a determination of the type of each region a modified red-eye algorithm is applied to those sub-regions of the MAI (or a subsampled version thereof).

In order to better explain the operation we will next give some examples of advantageous adaptations of a red-eye analysis chain:

Modifications for Full-Face Regions

Where the region is any of the full-face regions mentioned above, then various face confirmation filters can be dropped from the red-eye algorithm when applied to these regions. However it may still be desirable to retain local skin confirmation filters as items of red-jewelry or red patterns in a headband or scarf may still give false positive results.

In an alternative embodiment, a filter based on the general location within the approximate or partial region can be used to additionally eliminate skin filters. Such a filter checks that detected eye defects lie in the upper half of the region and certain size constraints can be applied. In addition detected defects are expected to be approximately symmetric and additional pairing analysis filters can be employed (see, e.g., US20080112599). The face and skin filters may typically be computationally intensive within a red-eye filter chain, and thus often desirable to eliminate, even where this elimination requires multiple additional filters to be added to the chain.

These techniques can be used more effectively on refined face regions, and less so on predicted face regions, where the filter determines relative as opposed to absolute positions. This is because predicted face regions are often somewhat larger than the face which can be located anywhere within the region due to movement. Similarly, the use of pairing filters can be employed in a relative, rather than in an absolute sense. Some use of skin/face confirmation may be desirable for regions of this category, although it can be less exhaustive than that employed where knowledge of the type of face is not known. Finally, the use of size constraints may be broadly similar, i.e., thresholds may be slightly more flexible to take account of the possibility of forwards/backwards face movement to that employed for refined face regions.

Modifications for Partial Face Regions

For (left/right) half-face regions the face filters and, optionally, local skin filters can be eliminated. A new filter which checks the location of the defect to be central can be added. Also, only one defect per region is expected so the pairing filters can be eliminated. If no candidate is found then (slower) non-red filters can be applied.

For top-face regions all face and skin filters can be eliminated because only the eye/nose region is provided; thus there is no risk of headbands, scarves, ear-rings or necklaces. In addition, all the lips filters can be eliminated. Some of the lips filters are quite fast (the ones that eliminate red lips) but some of them are quite slow (the ones that detect particular shades of brown lipstick that give problems) and thus there is a significant speed-up for top-face regions without a loss of overall accuracy.

For eye-strip regions most of the advantages of top-face regions also hold. Technically these are not "detected eye regions" as the face strip is typically extracted by analyzing the horizontal variance across a face region and then "cutting out" the high variance region which contains the two eyes. Eye-Strip also enables removal of the Iris confirmation filter which is another slow filter.

Modifications for Portrait/Foreground Regions

The face filter will still be typically used for raw foreground image patches, although it can be eliminated for the three other types of such region. Most of the skin filters may typically still be used, although it is possible to reduce the region to which they are applied in the case of the various portrait images where only the narrower top portion (c. 50%) of the image will contain the face.

The exact selection of red-eye filters employed is very dependent on the particular algorithmic techniques employed within an imaging device for foreground-background separation or portrait region extraction. Thus a device-specific calibration would be involved.

A modified regional analysis can be applied in the case of a refined portrait where is it known that the full hair region is included in the geometric region and thus the top c. 20% of the region can be excluded from searches (excludes red hairclips, combs, flowers, etc). Skin filters may optionally be eliminated for the mid-region and replaced with a geometric check which is faster.

Additional methods of face-based image analysis are described in U.S. Pat. Nos. 7,362,368, 7,317,815, 7,269,292, 7,315,630, 7,403,643, and 7,315,631, and U.S. patent application Ser. Nos. 10/608,810, 10/608,887, 11/941,956, 10/608,888, 11/773,815, 11/773,855, 10/608,811, 11/024, 046, 11/765,899, 11/765,967, 10/608,772, 11/688,236, 10/608,784, 11/773,868, 10/764,339, 11/027,001, 11/833, 224, 12/167,500, 11/766,674, 12/063,089, 11/765,212, 11/765,307, 11/464,083, 11/460,218, 11/761,647, 11/624, 683, 12/042,104, 12/112,586, 12/026,484, 11/861,854, 12/055,958, 61/024,508, and 61/023,855 and PCT/US2006/021393, which are incorporated by reference along with other references cited above and below herein, and may be combined into alternative embodiments.

The image processing analysis may be performed in hardware. The changing of the degree of the subsampling may be determined based on image metadata information.

After prefiltering the subsampled image and determining the size and location of one or more types of partial face regions a red-eye filter is applied to each such determined region. Said filter is modified according to the type of partial face region and may also be modified according to the size of said region, its absolute location within the image and its relative location to other partial face regions.

In certain embodiments the results of a global red-eye analysis may be combined with the results of localized analyses within each such partial face region.

Various refined red-eye filters are described in U.S. Ser. Nos. 11/123,971, 11/233,513, 10/976,336, as well as 11/462, 035, 12/042,335, 11/282,954, 11/282,955, 12/043,025, 11/936,085, 11/859,164, 11/861,257, 61/024,551, and U.S. Pat. Nos. 6,407,777, 7,042,505, 7,352,394, and 7,336,821, and techniques from these co-pending applications may be advantageously employed in certain embodiments.

Example Process

In an exemplary process, a redeye detection algorithm may be applied on an entire image, which may be a low resolution image such as a preview or postview image. A red eye list may be obtained of regions suspected as candidate red eye regions. An extended eye detector may be applied to the image from which an extended eyes list is generated. Using one or more geometric operations, such as applying rectangles or other polygons or elliptical shapes to the image, a list is generated from the extended eyes list.

Redeye detection accuracy improvement is achieved when the red eye candidate region list is combined with the extended eyes list or the list discussed above as being generated therefrom by applying one or more geometric operations. Each eye- or eye pair-rectangle may be verified by intersecting the redeye candidate list. If not, a new refined red eye detection may be applied inside the eye- or eye pair-rectangle, e.g., based on the presence of the eye- or eye pair-rectangle, some filters (skin, face, lips, . . . ) could be relaxed, removed, and/or customized.

In certain embodiments, one can verify detected red eyes which are not inside an eye- or eye pair-rectangle as NOT being false positives. This can be done by increasing the strength of the filtering chain by, e.g., adding or customizing certain special filters. In certain embodiments, one can verify cases when two or more red eyes are detected in a same eye rectangle, or three or more red eyes are detected inside an eye- or eye pair-rectangle. In this case, external filtering can be applied, based on marks already computed during a main filtering chain. In certain embodiments, one can correlate for a pair of eyes inside an eye pair-rectangle.

A golden eyes detector may also be applied inside an eye- or eye pair-rectangles list. Optionally, a difference between a red eye candidate region list and an extended eyes list can be utilized. One can enlarge one or more of the rectangles and apply eye defect detection inside them. Correction is generally then applied for one or multiple defect eyes (Red, Golden, Zombie, White, etc.) on a full resolution image of the same scene as the subsampled image. In one example, golden eye correction may be applied second, thereby overwriting any red correction.

Detector

Examples of images upon which an extended eye detector may be used are shown in the images FIGS. 6A-6D. The digital images shown in these figures include partial face regions within red and green boxes that each include eyes with red eye defects. Other regions outside the green and red boxes do not include any eyes and are not included within a subsample representation that is analyzed in certain embodiments in a process that includes modifying an area determined to be indicative of red eye phenomenon.

A flash-induced eye defect detector may be applied on an image downsampled to 320×240, for example. The green rectangles in FIGS. 6A-6D are examples of output of an extended eyes detector. The red rectangles in FIGS. 6A-6D are examples of eye rectangles and they may be computed directly from the green rectangles using only simple geometric operations (e.g., take the upper part, enlarge it a bit, and splash it in two parts).

An example process for defect eye detection and correction using extended eyes detector may be as follows. An original full image may be downsampled to 1024×768 resolution, for example. Red eye detection may be applied on the entire downsampled image to obtain a candidate red eye region list. An extended eyes detector is then applied, and also an eyes rectangles list is computed. A red eye detection accuracy improvement is achieved using the combination between the red eye candidate list and the extended eyes list.

The decision whether the filter should use a subsampled representation, and the rate of the downsampling, may be determined empirically by a-priori statistically comparing the success rate vs. mis-detection rate of a filter with the subsampling rate and technique of known images. It is further worth noting that the empirical determination will often be specific to a particular camera model. Thus, the decision to use the full sized image or the subsampled image data, for a particular pixel locating or false determining filter, may be empirically determined for each camera.

In another aspect, a pre-acquisition or precapture image may be effectively utilized in an embodiment of the invention. Another type of subsampled representation of the image may be one that differs temporally from the captured image, in addition or alternative to the spatial differentiation with other aforementioned algorithms such as spline and bi-cubic. The subsample representation of the image may be an image captured before the final image is captured, and preferably just before. A camera may provide a digital preview of the image, which may be a continuous subsample version of the image. Such pre-capture may be used by the camera and the camera user, for example, to establish correct exposure, focus and/or composition.

The precapture image process may involve an additional step of conversion from the sensor domain, also referred to as raw-ccd, to a known color space that the red eye filter is using for calculations. In the case that the preview or precapture image is being used, an additional step of alignment may be used in the case that the final image and the pre-capture differ, such as in camera or object movement.

The pre-acquisition image may be normally processed directly from an image sensor without loading it into camera memory. To facilitate this processing, a dedicated hardware subsystem is implemented to perform pre-acquisition image processing. Depending on the settings of this hardware subsystem, the pre-acquisition image processing may satisfy some predetermined criteria which then implements the loading of raw image data from the buffer of the imaging sensor into the main system memory together with report data, possibly stored as metadata, on the predetermined criteria. One example of such a test criterion is the existence of red areas within the pre-acquisition image prior to the activation of the camera flash module. Report data on such red areas can be passed to the redeye filter to eliminate such areas from the redeye detection process. Note that where the test criteria applied by the pre-acquisition image processing module are not met then it can loop to obtain a new pre-acquisition test image from the imaging sensor. This looping may continue until either the test criteria are satisfied or a system time-out occurs. The pre-acquisition image processing step tends to be significantly faster than the subsequent image processing chain of operations due to the taking of image data directly from the sensor buffers and the dedicated hardware subsystem used to process this data.

Once the test criteria are satisfied, the raw image data may be then properly loaded into main system memory to allow image processing operations to convert the raw sensor data into a final pixelated image. Typical steps may include converting Bayer or RGGB image data to YCC or RGB pixelated image data, calculation and adjustment of image white balance, calculation and adjustment of image color range, and calculation and adjustment of image luminance, potentially among others.

Following the application of this image processing chain, the final, full-size image may be available in system memory, and may then be copied to the image store for further processing by the redeye filter subsystem. A camera may incorporate dedicated hardware to do global luminance and/or color/grayscale histogram calculations on the raw and/or final image data. One or more windows within the image may be selected for doing "local" calculations, for example. Thus, valuable data may be obtained using a first pass" or pre-acquisition image before committing to a main image processing approach which generates a more final picture.

A subsampled image, in addition to the precapture and more finalized images, may be generated in parallel with the final image by a main image processing tool chain. Such processing may be preferably performed within the image capture module 60 of FIG. 1.

Additional prefiltering may be advantageously performed on this subsampled image to eliminate regions of the final image from the red-eye analysis or to refine the parameters of the red-eye filter or adapt a red-eye filter chain according to regional characteristics. The use of a subsampled image is also helpful for performing analysis in playback mode, i.e. when an image is processed after image capture and thus when "live" preview images are not available a subsample image may be generated and used as a substitute for said preview image to speed up image processing algorithms.

Detailed description of how a red-eye filter chain may be adapted in response to the conditions of image acquisition or the quality of an acquired image, which may be incorporated into alternative embodiments, are provided in U.S. patent application Ser. Nos. 11/123,971, 11/233,513, 10/976,336, as well as 11/462,035, 12/042,335, 11/282,954, 11/282,955, 12/043,025, 11/936,085, 11/859,164, 11/861,257, 61/024,551, and U.S. Pat. Nos. 6,407,777, 7,042,505, 7,352,394, and 7,336,821, which are hereby incorporated by reference.

An exemplary process may include the following operations. First, a raw image may be acquired or pre-captured. This raw image may be processed prior to storage. This processing may generate some report data based on some predetermined test criteria. If the criteria are not met, the pre-acquisition image processing operation may obtain a second, and perhaps one or more additional, pre-acquisition images from the imaging sensor buffer until such test criteria are satisfied.

Once the test criteria are satisfied, a full-sized raw image may be loaded into system memory and the full image processing chain may be applied to the image. A final image and a subsample image may then ultimately preferably be generated.

Partial Face Detection

Embodiments of the present invention include a method of using classifier chains to determine quickly and accurately if a window or sub-window of an image contains a right face, a left face, a full face, or does not contain a face. After acquiring a digital image, an integral image can be calculated based on the acquired digital image. One or more left-face (LF) classifiers can be applied to the integral image to determine the probability that the window contains a left face. One or more right-face (RF) classifiers can be applied to the integral image to determine the probability that the window contains a right face. If the probability of the window containing a right face and a left face are both greater than threshold values, then it can be determined that the window contains both a right face and a left face, i.e. a full face. If the probability of the window containing a right face is above a threshold value and the probability of the window containing a left face is below a threshold value, then it can be determined that the window contains a right face but no left face. If the probability of the window containing a right face is below a threshold value and the probability of the window containing a left face is above a threshold value, then it can be determined that the window contains a left face but no right face. If the probability of the window containing a right face and a left face are both below a threshold value, then it can be determined that the window does not contain a face.

Further embodiments of the present invention include applying a full-face classifier to a window of the integral image to verify the determination made based on the left-face classifiers and the right-face classifiers. For example, if the probability of the window containing a right face and a left face are both greater than threshold values, then applying a full-face classifier should show that it is highly probable that the window contains a full face because a full face includes a right face and a left face. If either the probability of the window containing a left face or a right face are below a threshold value, then a full-face classifier applied to the integral image should confirm that the window does not contain a full face. If the determination made when applying the right-face or left-face classifiers to the integral image contradicts the determination made when applying the full-face classifiers, then further, more computationally expensive analysis, can be performed to determine if the window contains a right face, left face, or full face.

Further embodiments of the present invention include using a right-face classifier to calculate a left-face classifier that is a mirror image of the right-face classifier, or using a left-face classifier to calculate a mirror right-face classifier.

Embodiments of the present invention also include a digital image acquisition system, having no photographic film, comprising means for carrying out one or more steps of the methods described in this application. Alternate embodiments of the present invention include one or more machine-readable storage media storing instructions which when executed by one or more computing devices cause the performance of one or more steps of the methods described in this application.

Digital Image Acquisition System

Figure 7:
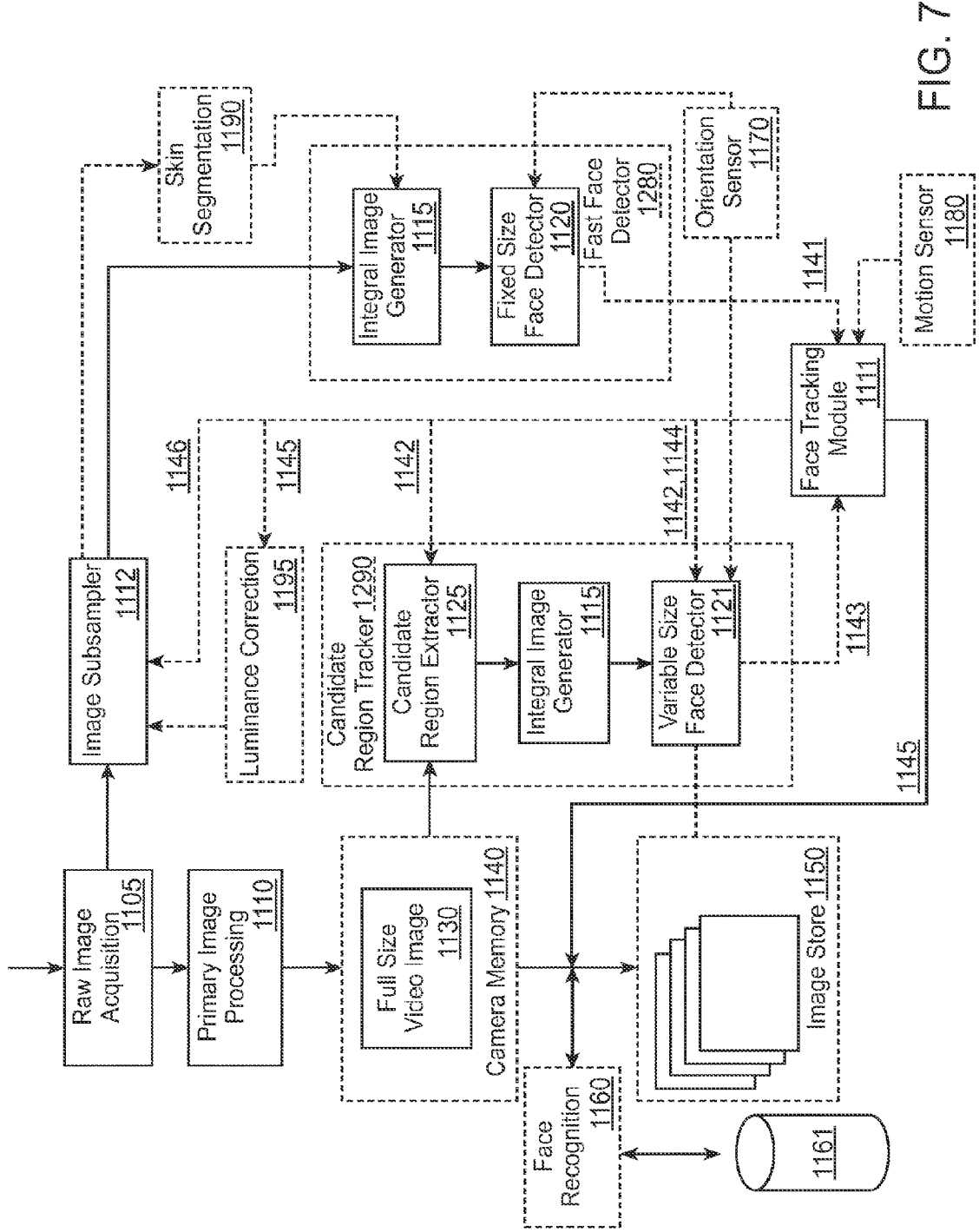
FIG. 7 shows the primary subsystems of a face tracking system in accordance with certain embodiments.

FIG. 7 shows the primary subsystems of a face tracking system in accordance with certain embodiments. The solid lines indicate the flow of image data; the dashed lines indicate control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera, or a combination thereof.

A digital image, i(x, y), is acquired in raw format from an image sensor 1105 such as a charged coupled device (CCD) sensor or complimentary metal oxide semiconductor (CMOS) sensor. An image subsampler 1112 generates a smaller copy of the main image. Most digital cameras already contain dedicated hardware subsystems to perform image subsampling, for example to provide preview images to a camera display. Typically, the subsampled image is provided in bitmap format (RGB or YCC). In the meantime, the normal image acquisition chain performs post-processing on the raw image 1110 which typically includes some luminance and color balancing. In certain digital imaging systems, the subsampling may occur after such post-processing, or after certain post-processing filters are applied, but before the entire post-processing filter chain is completed.

The subsampled image is next passed to an integral image generator 1115 which creates an integral image from the subsampled image. The integral image, ii(x,y), at location (x, y) contains the sum of the pixel values above and to the left of point (x, y) from image i(x,y).

This integral image is next passed to a fixed size face detector 1120. The face detector is applied to the full integral image, but as this is an integral image of a subsampled copy of the main image, the processing involved in the face detection is proportionately reduced. If the subsampled image is ¼ of the main image, e.g., has ¼ the number of pixels and/or ¼ the size, then the processing time involved is only about 25% of that for the full image.

This approach is particularly amenable to hardware embodiments where the subsampled image memory space can be scanned by a fixed size DMA window and digital logic to implement a Haar-feature classifier chain can be applied to this DMA window. Several sizes of classifiers may alternatively be used (in a software embodiment), or multiple fixed-size classifiers may be used (in a hardware embodiment). An advantage is that a smaller integral image is calculated.

After application of the fast face detector 1280, any newly detected candidate face regions 1141 are passed onto a face tracking module 1111, where any face regions confirmed from previous analysis 1145 may be merged with new candidate face regions prior to being provided 1142 to a face tracker 1290.

The face tracker 1290 provides a set of confirmed candidate regions 1143 back to the tracking module 1111. Additional image processing filters are preferably applied by the tracking module 1111 to confirm either that these confirmed regions 1143 are face regions or to maintain regions as candidates if they have not been confirmed as such by the face tracker 1290. A final set of face regions 1145 can be output by the module 1111 for use elsewhere in the camera or to be stored within or in association with an acquired image for later processing either within the camera or offline. Set 1145 can also be used in a next iteration of face tracking.

After the main image acquisition chain is completed, a full-size copy of the main image 1130 will normally reside in the system memory 1140 of the image acquisition system. This may be accessed by a candidate region extractor 1125 component of the face tracker 1290, which selects image patches based on candidate face region data 1142 obtained from the face tracking module 1111. These image patches for each candidate region are passed to an integral image generator 1115, which passes the resulting integral images to a variable sized detector 1121, as one possible example a Viola-Jones detector, which then applies a classifier chain, preferably at least a 32 classifier chain, to the integral image for each candidate region across a range of different scales.

The range of scales 1144 employed by the face detector 1121 is determined and supplied by the face tracking module 1111 and is based partly on statistical information relating to the history of the current candidate face regions 1142 and partly on external metadata determined from other sub-systems within the image acquisition system.

As an example of the former, if a candidate face region has remained consistently at a particular size for a certain number of acquired image frames, then the face detector 1121 is applied at this particular scale and/or perhaps at one scale higher (i.e. 1.25 times larger) and one scale lower (i.e. 1.25 times lower).

As an example of the latter, if the focus of the image acquisition system has moved to approximately infinity, then the smallest scalings will be applied in the face detector 1121.

Normally these scalings would not be employed, as they would be applied a greater number of times to the candidate face region in order to cover it completely. It is worthwhile noting that the candidate face region will have a minimum size beyond which it should not decrease—this is in order to allow for localized movement of the camera by a user between frames. In some image acquisition systems which contain motion sensors, such localized movements may be tracked. This information may be employed to further improve the selection of scales and the size of candidate regions.

The candidate region tracker 1290 provides a set of confirmed face regions 1143 based on full variable size face detection of the image patches to the face tracking module 1111. Clearly, some candidate regions will have been confirmed while others will have been rejected, and these can be explicitly returned by the tracker 1290 or can be calculated by the tracking module 1111 by analyzing the difference between the confirmed regions 1143 and the candidate regions 1142. In either case, the face tracking module 1111 can then apply alternative tests to candidate regions rejected by the tracker 1290 to determine whether these should be maintained as candidate regions 1142 for the next cycle of tracking or whether these should indeed be removed from tracking.

Once the set of confirmed candidate regions 1145 has been determined by the face tracking module 1111, the module 1111 communicates with the sub-sampler 1112 to determine when the next acquired image is to be sub-sampled, and so provided to the detector 1280, and also to provide the resolution 1146 at which the next acquired image is to be sub-sampled.

Where the detector 1280 does not run when the next image is acquired, the candidate regions 1142 provided to the extractor 1125 for the next acquired image will be the regions 1145 confirmed by the tracking module 1111 from the last acquired image. On the other hand, when the face detector 1280 provides a new set of candidate regions 1141 to the face tracking module 1111, these candidate regions are preferably merged with the previous set of confirmed regions 1145 to provide the set of candidate regions 1142 to the extractor 1125 for the next acquired image.

Zoom information may be obtained from camera firmware. Using software techniques which analyze images in camera memory 1140 or image store 1150, the degree of pan or tilt of the camera may be determined from one image to another.

In one embodiment, the acquisition device is provided with a motion sensor 1180, as illustrated at FIG. 7, to determine the degree and direction of pan from one image to another, and avoiding the processing involved in determining camera movement in software.

Such motion sensor for a digital camera may be based on an accelerometer, and may be optionally based on gyroscopic principals within the camera, primarily for the purposes of warning or compensating for hand shake during main image capture. U.S. Pat. No. 4,448,510, to Murakoshi, which is hereby incorporated by reference, discloses such a system for a conventional camera, and U.S. Pat. No. 6,747,690, to Molgaard, which is also incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometer may allow software control of the amplifier stage which allows the sensitivity to be adjusted.

The motion sensor 1180 could equally be implemented with MEMS sensors of the sort which will be incorporated in next generation consumer cameras and camera-phones.

In any case, when the camera is operable in face tracking mode, i.e., constant video acquisition as distinct from acquiring a main image, shake compensation would typically not be used because image quality is lower. This provides the opportunity to configure the motion sensor 1180 to sense large movements by setting the motion sensor amplifier module to low gain. The size and direction of movement detected by the sensor 1180 is preferably provided to the face tracker 1111. The approximate size of faces being tracked is already known, and this enables an estimate of the distance of each face from the camera. Accordingly, knowing the approximate size of the large movement from the sensor 1180 allows the approximate displacement of each candidate face region to be determined, even if they are at differing distances from the camera.

Thus, when a large movement is detected, the face tracker 1111 shifts the locations of candidate regions as a function of the direction and size of the movement. Alternatively, the size of the region over which the tracking algorithms are applied may also be enlarged (and the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 1180 is returned to normal, allowing the main image acquisition chain 1105,1110 for full-sized images to employ normal shake compensation algorithms based on information from the motion sensor 1180.

An alternative way of limiting the areas of an image to which the face detector 1120 is to be applied involves identifying areas of the image which include skin tones. U.S. Pat. No. 6,661,907, which is hereby incorporated by reference, discloses one such technique for detecting skin tones and subsequently only applying face detection in regions having a predominant skin color.

In one embodiment, skin segmentation 1190 is preferably applied to a sub-sampled version of the acquired image. If the resolution of the sub-sampled version is not sufficient, then a previous image stored in image store 1150 or a next sub-sampled image can be used as long as the two images are not too different in content from the current acquired image. Alternatively, skin segmentation 1190 can be applied to the full size video image 1130.

In any case, regions containing skin tones are identified by bounding rectangles. The bounding rectangles are provided to the integral image generator 1115, which produces integral image patches corresponding to the rectangles in a manner similar to that used by the tracker integral image generator 1115.

Not only does this approach reduce the processing overhead associated with producing the integral image and running face detection, but in the present embodiment, it also allows the face detector 1120 to apply more relaxed face detection to the bounding rectangles, as there is a higher chance that these skin-tone regions do in fact contain a face. So for a Viola-Jones detector 1120, a shorter classifier chain can be employed to more effectively provide similar quality results to running face detection over the whole image with longer VJ classifiers required to positively detect a face.

Further improvements to face detection are also contemplated in other embodiments. For example, based on the fact that face detection can be very dependent on illumination conditions, such that small variations in illumination can cause face detection to fail and cause somewhat unstable detection behavior, in another embodiment, confirmed face regions 1145 are used to identify regions of a subsequently acquired sub-sampled image on which luminance correction may be performed to bring regions of interest of the image to be analyzed to the desired parameters. One example of such correction is to improve the luminance contrast within the regions of the sub-sampled image defined by confirmed face regions 1145.

Contrast enhancement may be used to increase local contrast of an image, especially when the usable data of the image is represented by close contrast values. Through this adjustment, intensities of pixels of a region when represented on a histogram, which would otherwise be closely distributed, can be better distributed. This allows for areas of lower local contrast to gain a higher contrast without affecting global contrast. Histogram equalization accomplishes this by effectively spreading out the most frequent intensity values.

The method is useful in images with backgrounds and foregrounds that are both bright or both dark. In particular, the method can lead to better detail in photographs that are over-exposed or under-exposed.

Alternatively, this luminance correction can be included in the computation of an "adjusted" integral image in the generators 1115.

In another improvement, when face detection is being used, the camera application is set to dynamically modify the exposure from the computed default to a higher values (from frame to frame, slightly overexposing the scene) until the face detection provides a lock onto a face.

Further embodiments providing improved efficiency for the system described above are also contemplated. For example, face detection algorithms typically employ methods or use classifiers to detect faces in a picture at different orientations: 0, 90, 180 and 270 degrees. The camera may be equipped with an orientation sensor 1170, as illustrated at FIG. 7. This can include a hardware sensor for determining whether the camera is being held upright, inverted or tilted clockwise or counter-clockwise. Alternatively, the orientation sensor can comprise an image analysis module connected either to the image acquisition hardware 1105, 1110 or camera memory 1140 or image store 1150 for quickly determining whether images are being acquired in portrait or landscape mode and whether the camera is tilted clockwise or counter-clockwise.

Once this determination is made, the camera orientation can be fed to one or both of the face detectors 1120, 1121. The detectors may apply face detection according to the likely orientation of faces in an image acquired with the determined camera orientation. This feature can either significantly reduce the face detection processing overhead, for example, by avoiding the employment of classifiers which are unlikely to detect faces, or increase its accuracy by running classifiers more likely to detects faces in a given orientation more often.

Classifier Chains

FIGS. 14*a-c* show illustrations of a full human face, a face with the right side obstructed, and a face with the left side obstructed. FIG. 8*a* represents a full face 1200 with a left eye 1201, a right eye 1202, a front of the nose 1203, a space between the eyes 1204, a bridge of the nose 1205, lips 1207, a space between the nose and the lips 1206, and a left cheek 1208, and a right cheek 1209.

FIG. 8*b* represents a face similar to the face of FIG. 8*a* but with an obstruction 1210 blocking the right side of the face. In the context of a digital image acquired by a system such as that described in FIG. 7, the obstruction 1210 might be a person's hair, another face, or any other object obstructing the face. Throughout this disclosure, a face with an obstruction 1210 blocking a right portion of the face, as in FIG. 8*b*, will be referred to as a left face or a left-sided face. FIG. 8*c* represents a face similar to the face of FIG. 8*a* but with an obstruction 1220 blocking the left side of the face. Throughout this disclosure a face with an obstruction 1220 blocking a left portion of the face, as in FIG. 8*c*, will be referred to as a right face or a right-sided face.

FIGS. 9*a-f* show graphical representations of a chain of full-face classifiers, and graphical representations of those full-face classifiers applied to illustrations of full faces. Techniques of the certain embodiments include applying a first classifier of a chain of classifiers to a window of an image to determine if the window contains a first feature indicative of a full face. The determination may be binary and only produce a "pass" or "fail." Alternatively, the determination may produce a probability of the window containing a face, in which case "pass" or "fail" can be determined by whether the probability is above or below a threshold value. "Pass" or "fail" may also be determined by summing the results of multiple classifiers as opposed to being based on a single classifier in a chain.

If the window "passes" the classifier, then the feature of the classifier is detected in the window, and if the window "fails" the classifier, then the feature is not detected in the window. If the window does not contain the first feature, then the window can be identified as not containing a face, and no additional classifiers need to be applied to the window. If the window does contain the feature of the first classifier, then a second classifier can be applied to the window to determine if the window contains a second feature indicative of a face. If the window does not contain the second feature, then the image can be identified as not containing a face, and no additional classifiers need to be applied to the window. If the window does contain the second feature, then a third classifier can be applied to the window. This process can repeat itself until the window passes enough classifiers to indicate a high probability of the window containing a face, or until the window fails a classifier, indicating that the window does not contain a face. Typically, each subsequent classifier in a classifier chain detects different features, more features, or more accurate instances of features than did previously applied classifiers. By applying the simplest classifiers that require the least accuracy early in the chain, those windows that do not contain faces can be quickly identified and eliminated without requiring the computer processing needed to apply the more sophisticated and more accurate classifiers. The number and type of classifiers used can be determined by machine-training techniques known in the art.

Figure 9A:
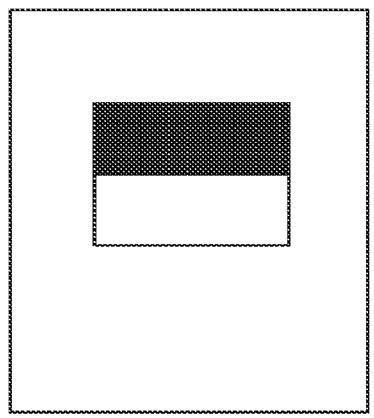
FIGS. 9a-g show graphical representations of full-face classifiers, and graphical representations of those full-face classifiers applied to illustrations of a full human face.
Figure 9B:
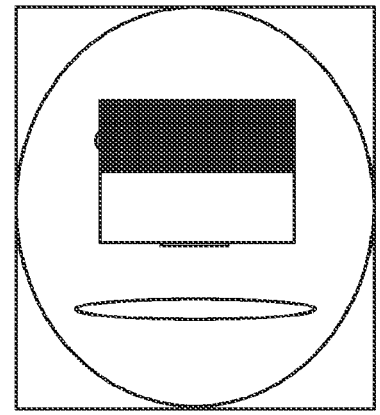

An example of a feature indicative of a face in a window is the area in a window corresponding to the eyes being darker than the area below the eyes. FIG. 9a is a graphical representation of a possible first classifier for detecting such a feature, and FIG. 9b shows a graphical representation of that first classifier applied to a window with a full face.

Figure 9C:
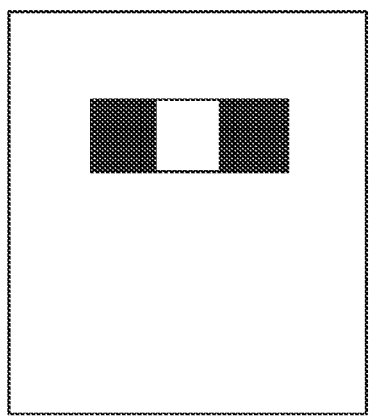
Figure 9D:
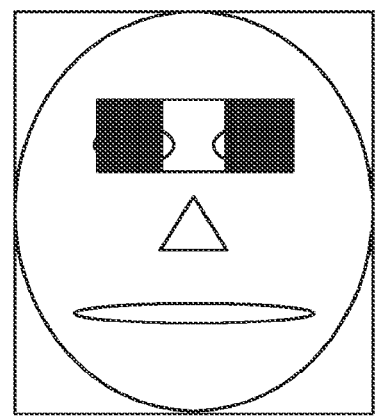
Figure 9E:
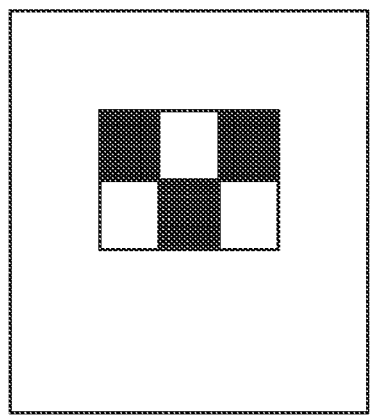
Figure 9F:
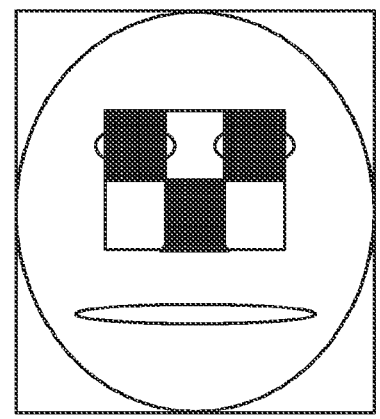

FIG. 9c is a graphical representation of a possible second classifier that might be applied to a window of an image if the window passes the first classifier shown in FIG. 9a. The classifier in FIG. 9c determines if the region corresponding to the eyes is darker than the region between the eyes, which is a second feature indicative of a face. FIG. 9d shows a graphical representation of the classifier in FIG. 9c applied to a window with a full face. FIG. 9e shows a graphical representation of a more complicated, more accurate classifier that can be applied to the window if the window passes the classifiers of FIGS. 9a and 9c. FIG. 9f shows the classifier of FIG. 9e applied to a window with a full face.

Figure 9G:
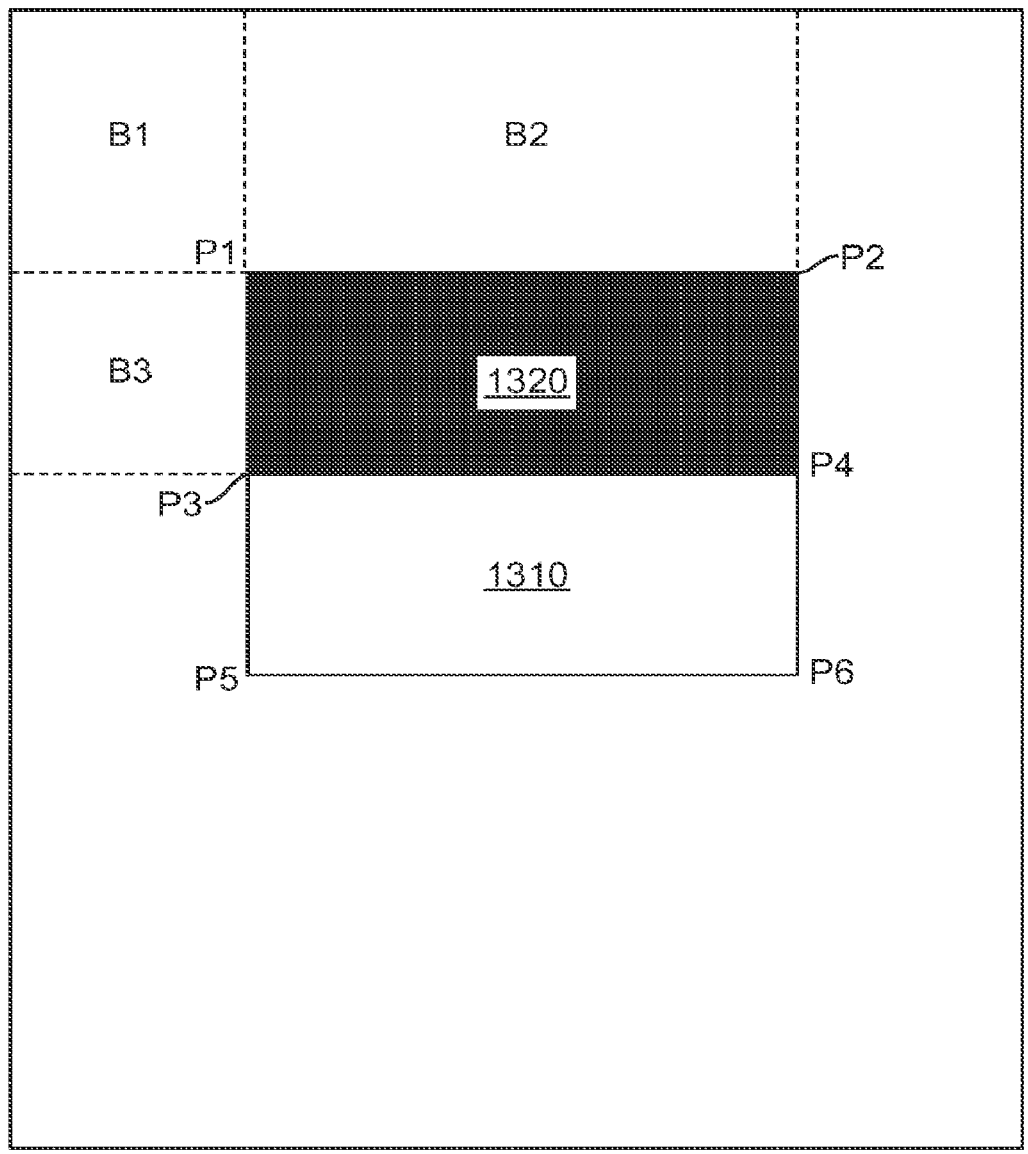

From the integral image, the sum of pixel values within a rectangular region of the image can be computed with four array references. For example, FIG. 9g is an enlarged graphical representation of the same classifier shown in FIG. 9a. The value of P1 represents the sum of pixel values above and to the left of point P1 (i.e. box B1). The value of P2 represents the sum of pixel values above and to the left of point P2 (i.e. boxes B1 and B2). The value of P3 represents the sum of pixels above and to the left of point P3 (i.e. boxes B1 and B3). The value of P4 represents the sum of pixels above and to the left of point P4 (i.e. boxes B1, B2, B3 and region 1320). Accordingly, the sum of pixel values within region 1320 can be calculated from the four reference points P1, P2, P3, and P4 by the equation: sum region 1320=P4+P1−(P2+P3). A sum of pixel values can similarly be calculated for region 310 from reference points P3, P4, P5, and P6.

Using a look-up table, a probability that the window contains a face can be determined based on the difference in luminance between region 1320 and region 1310. The determined probability can be used to determine whether the window passes or fails the classifier or chain of classifiers.

Figure 10A:
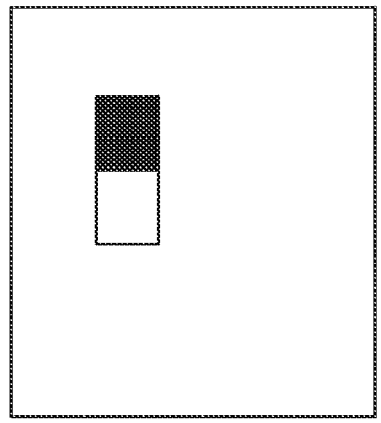
FIGS. 10a-f show graphical representations of left face classifiers, and graphical representations of those left-face classifiers applied to illustrations of a full human face.
Figure 10B:
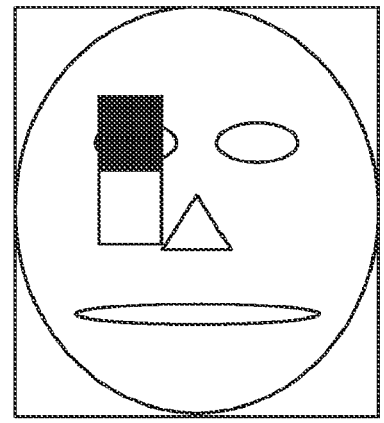
Figure 10C:
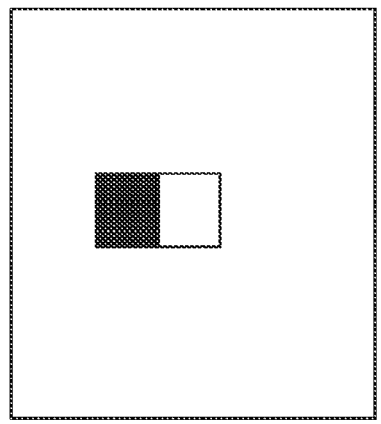
Figure 10D:
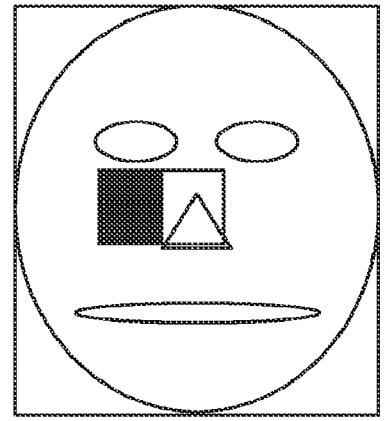
Figure 10E:
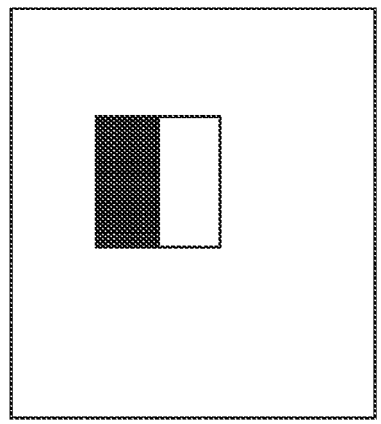
Figure 10F:
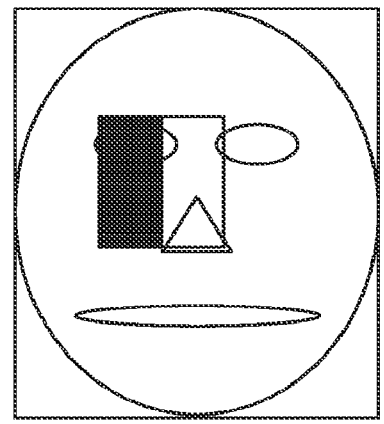

FIGS. 16a-f show graphical representations of a chain of left-face classifiers, and graphical representations of those left-face classifiers applied to illustrations of a full face. The left-face classifiers can be applied to a window in the same manner described relative to the classifiers of FIGS. 15a-f, but instead of detecting features indicative of a full face, the classifiers are detecting features indicative of a left face. For example, in an image containing a left face, the area of an image corresponding to a portion of an eye will be darker than the area of the image corresponding to below the eye. FIG. 10a shows a graphical representation of a classifier for detecting such a feature, and FIG. 10b shows a graphical representation of the classifier of FIG. 10a applied to a full face. FIGS. 10c and 10e show examples of classifiers for detecting the presence of additional features, and FIGS. 10d and 10f shows graphical representations of those classifiers applied to full faces.

Figure 11A:
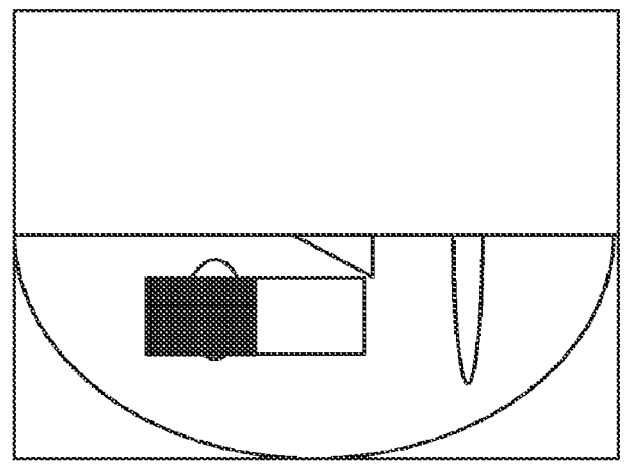
FIGS. 11a-c show a graphical representation of a left-face classifier applied to a left face, a full face, and a right face.
Figure 11B:
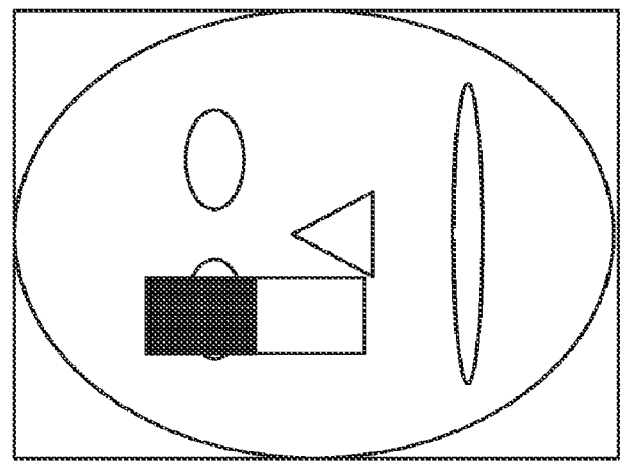
Figure 11C:
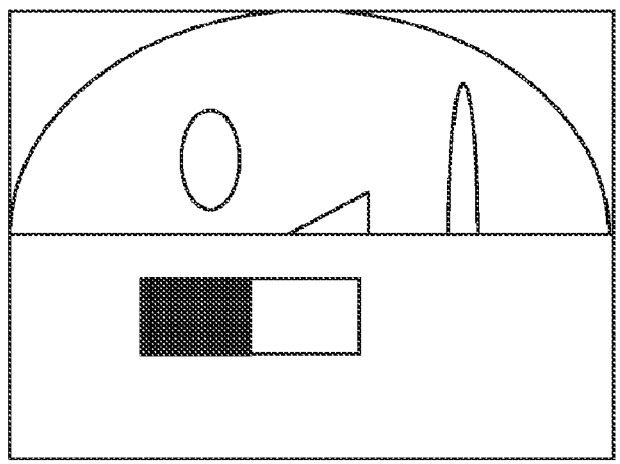

FIGS. 11a-c show a graphical representation of left-face classifiers applied to a window with a left face, a window with a full face, and a window with a right face. The left-face classifier detects in a window the presence of a darker region corresponding to an eye above a lighter region corresponding to a cheek. In FIG. 11a, the left-face classifier is applied to a window with a left face, in which case the window would pass the classifier indicating that the feature is present in the window. If the classifier is applied to a full face, as in FIG. 11b, the window will also pass because the feature is also present in the full face. If, however, the left-face classifier is applied to a right face, the window will fail because the feature is not present in the window. Thus, if a window passes a chain of left-face classifiers, it can be determined that the window contains either a left face or a full face. If the window fails a chain of left-face classifiers, then it can be determined that the window either contains a right face or contains no face.

The principles described in relation to FIGS. 10a-f and 11a-c can also be applied to a chain of right-face classifiers. If a window passes a chain of right-face classifiers, then the window contains either a right face or a full face. If the window fails a chain of right-face classifiers, then the window contains either a left face or contains no face.

Figure 12A:
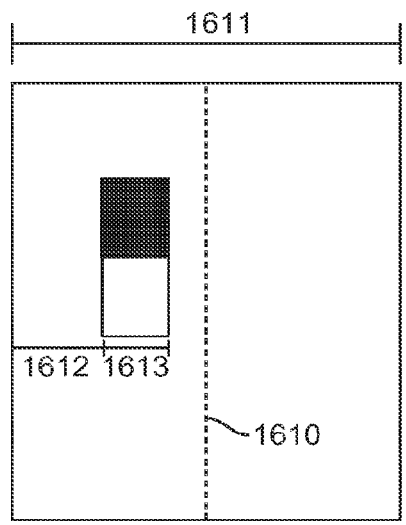
FIGS. 12a-d show graphical representations of left-face classifiers and corresponding right-face mirror classifiers.
Figure 12B:
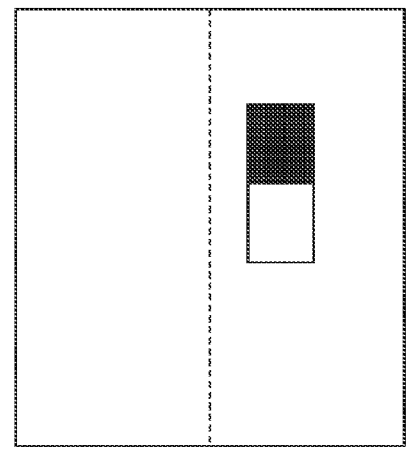
Figure 12C:
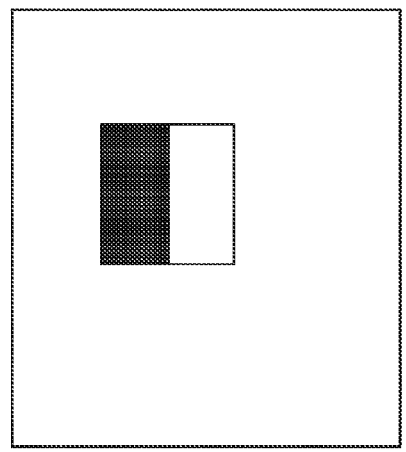
Figure 12D:
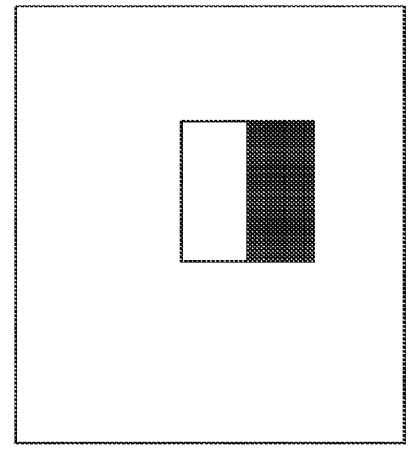

FIGS. 18a-d show graphical representations of left-face classifiers and right-face classifiers that are mirror classifiers of one another. A right-face mirror classifier detects the same feature as a left-face classifier, but detects that feature on the opposite side of a window which would correspond to the opposite side of the face. For example, the left-face classifier of FIG. 12a might detect a darker region on the left side of a window above a lighter region on the left side of a window, which would be indicative of a left eye and left cheek and thus indicative of a left face. The classifier of FIG. 12b is a mirror of the classifier of FIG. 12a. The classifier of FIG. 12b detects the presence of a darker region on the right side of a window above a lighter region on the right side of the window which would indicate a right eye above a right cheek and thus a right face. FIG. 12c shows another left-face classifier that is a mirror classifier of the right-face classifier illustrated by FIG. 12d. The classifiers in FIGS. 12b and 12d can be viewed as the classifiers of FIGS. 12a and 12c having been flipped across a vertical axis of symmetry 1610.

Data Structure of a Classifier

Below are example data structures for Haar and Census classifiers:

```
typedef struct CensusFeature
{
    INT32 threshold;
    UINT8 type;
    UINT8 x, y;
    const INT16* lut;
    BOOL bSymetric;
} CensusFeature;
typedef struct HaarFeature
{
    INT32 threshold;
    UINT8 type;
    UINT8 x, y, dx, dy, shift;
    const INT16* lut;
    BOOL bSymetric;
} HaarFeature;
```

In the structures, "threshold" represents the threshold level used to determine if a region passes or fails a classifier or chain of classifiers.

In the structures, "type" represents the type of feature being detected. For example, the feature shown in FIG. 9a might be referred to as Haar2 vertical, and the feature shown in FIG. 9c might be referred to as Haar3 horizontal. The type of feature being detected determines how the classifier is applied to a window. For example, a horizontal-type classifier indicates that a difference in luminance is being detected between a left region and a right region as in FIG. 9c, while a vertical-type classifier indicates a difference in luminance is being detected between a top region and a bottom region as in FIG. 9a.

In the structures, "x" and "y" represent the top, left coordinates of the feature in the base face size. For example, with reference to FIG. 9g, coordinates (x, y) would be the coordinates of point P1.

In the structures, "dx" and "dy" represent the dimension of the feature in the base face size. For example, with reference to FIG. 9g, dx would be the difference between the x-coordinate of point P2 and the x-coordinate of point P1, and dy would be the difference between the y-coordinate of point P5 and the y-coordinate of point P1.

In the structures, "lut" identifies the look up table containing the probabilities of a detected difference in luminance being indicative of a face.

In the structures, "bSymetric" represents a boolean value (true/false) used to specify whether the classifier has a mirror classifier.

If the value of bSymetric indicates that a mirror classifier exists, then the mirror classifier can be applied by determining a new value for the x-coordinate of the mirror classifier. The values of y, dx, dy, threshold, lut, and type will be the same for a classifier and that classifier's mirror classifier. The new value of x (referred to hereinafter as "x'") can be determined using known variables. For example, as shown in FIG. 12b, using the base face size 1611, the x-coordinate 1612, and dx 1613 from the features shown in FIG. 12a, x' can be calculated as x'=base face size−x−dx. The calculations used to determine other mirror classifiers may differ from the calculation shown for FIG. 12b, but the calculations will typically only involve addition and subtraction, which can be performed rapidly.

An aspect of an embodiment includes storing in memory, such as on a portable digital image acquisition device like the one shown in FIG. 7, a plurality of classifiers and using the techniques of an embodiment to determine mirror classifiers for the plurality of classifiers as opposed to storing both the classifiers and the mirror classifiers. The techniques of certain embodiments save on-board memory space and can be performed rapidly because the needed functions primarily comprise basic arithmetic.

Techniques of certain embodiments include a method for identifying a face in a window of an image, the method comprising: acquiring a digital image; computing an integral image based on the digital image; applying a first chain of one or more classifiers to the integral image to determine if the window contains a first portion of a face; applying a second chain of one or more classifiers to the integral image to determine if the window contains a second portion of a face; and determining, based at least in part on the presence or absence of the first portion of a face and the presence or absence of the second portion of a face, whether the window contains no face, a partial face, or a full face. In some embodiments, one or more classifiers of the second chain are mirror classifiers of one or more classifiers of the first chain. In some embodiments, the first chain of classifiers is to determine if a window contains a left face and the second chain of classifiers is to determine if the window contains a right face. In some embodiments, the method further comprises: applying a third chain of classifiers to verify the determining based at least in part on the presence or absence of the first portion of a face and the presence or absence of the second portion of a face. In some embodiments, the third set of classifiers is to determine if the window contains a full face.

Figure 13:
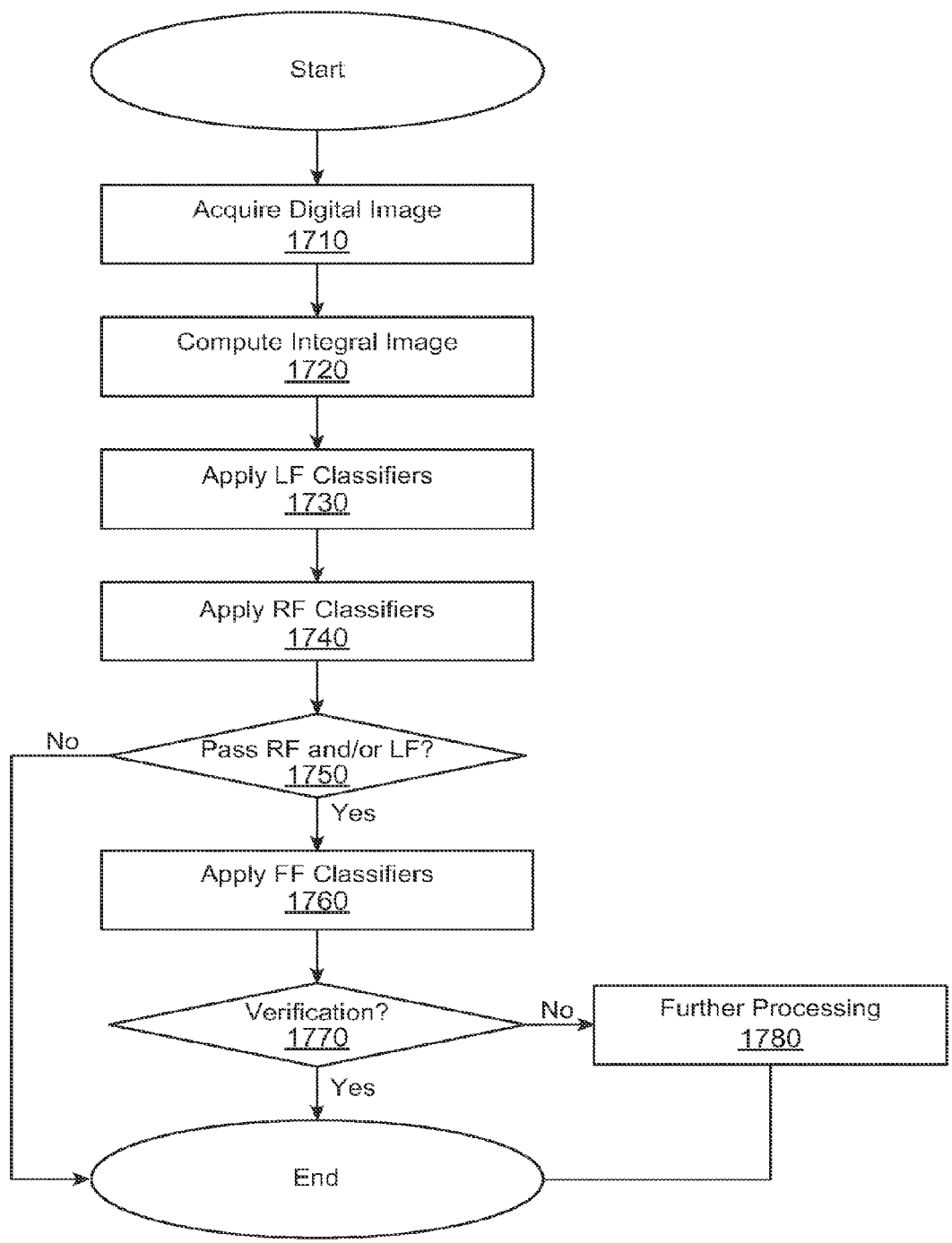
FIG. 13 shows a flow diagram of a method utilizing techniques of certain embodiments.

FIG. 13 is a flow diagram of a method embodying techniques of certain embodiments. The method includes acquiring a digital image (block 1710) and computing an integral image based on the acquired digital image (block 1720). Acquisition of the digital image and computation of the integral image can, for example, be performed by the digital image acquisition system as described in FIG. 7 or by a separate computing device such as a personal computer.

A chain of one or more left-face classifiers can be applied to a window of the integral image to determine if the window contains a left face (block 1730). Techniques of certain embodiments can include dividing the digital image into a plurality of different size windows and applying the one or more classifiers to all windows such that the entire image is analyzed to determine the presence of a left face in any window. In alternative embodiments, face-tracking techniques, such as those described in relation to the system of FIG. 7, can determine a subset of windows to apply the chain of classifiers such that the chain is only applied to windows that likely contain a face, thus improving the speed at which the method can be applied to an acquired digital image.

The method further comprises applying a chain of one or more right-face classifiers to the integral image to determine if a window contains a right face (block 1740). The right-face classifiers can be mirrors of the left-face classifiers as discussed in relation to FIGS. 18a-18d.

As described above in relation to FIGS. 15a-15g, the left-face classifiers and right-face classifiers can be applied as chains with each subsequent classifier in the chain providing more accuracy than previously used classifiers. Additionally, the right-face and left-face classifiers can be applied to the integral images either serially or in parallel. Further, when applying the classifier chains serially, the left-face classifiers can be applied prior to applying the right-face classifiers, or vice versa.

If, after applying both the left-face classifiers and the right-face classifiers, it is determined that the window contains neither a left face nor a right face, then the method can end (block 1750, "No" path). A determination that the window contains neither a right face nor a left face corresponds to the window not containing any face. If, after applying both the left-face classifiers and the right-face classifiers it is determined that the window contains a left face, a right face, or both (block 1750, "Yes" path), then a chain of full-face classifiers can be applied to the window (block 1760).

Applying the chain of full-face classifiers to the window can be used to verify the determinations made by applying the chains of left-face classifiers and right-face classifiers (block 1770). For example, if the chain of right-face classifiers indicates that the window contains a right face, and if the chain of left-face classifiers indicates that the window contains a left face, then applying a chain of full-face classifier should indicate that the window contains a full face. If either (a) the chain of right-face classifiers indicates the window does not contain a right face or (b) the chain of left-face classifiers indicates the window does not contain a left face, then applying a chain of full-face classifiers should indicate that the window does not contain a full face.

If applying the chain of full-face classifiers confirms the determinations made in blocks 1730 and 1740 (block 1770, "yes" path), then the method ends. If applying the chain of full-face classifiers contradicts the determinations made in blocks 1730 and 1740 (block 1770, "No" path), then further processing can occur to resolve the contradiction (block 1780). For example, additional, usually more computationally expensive, image analysis algorithms can be applied to the window to determine if the window contains a right face, left face, full face, or no face. Alternatively, probabilities or confidence levels of the right-face, left-face, and full-face chains can be compared to determine which one has the highest degree of confidence. After the further processing resolves the contradiction, the method can end.

Foreground/Background

Further embodiments include a method of distinguishing between foreground and background regions of a digital image of a scene. One or more foreground objects can be identified in a binary image map that distinguishes between foreground pixels and background pixels. From the one or more foreground objects, a primary foreground object can be identified, and based in part on the identified primary foreground object, a head region of the primary foreground object can be estimated. Within the head region, patterns of foreground pixels and background pixels that are indicative of a head crown region can be identified. Within the head crown region, pixels identified as background pixels that actually show portions of the primary foreground object can be converted to foreground pixels, thus improving the accuracy of the binary image map.

Digital Image Acquisition System

Figure 14:
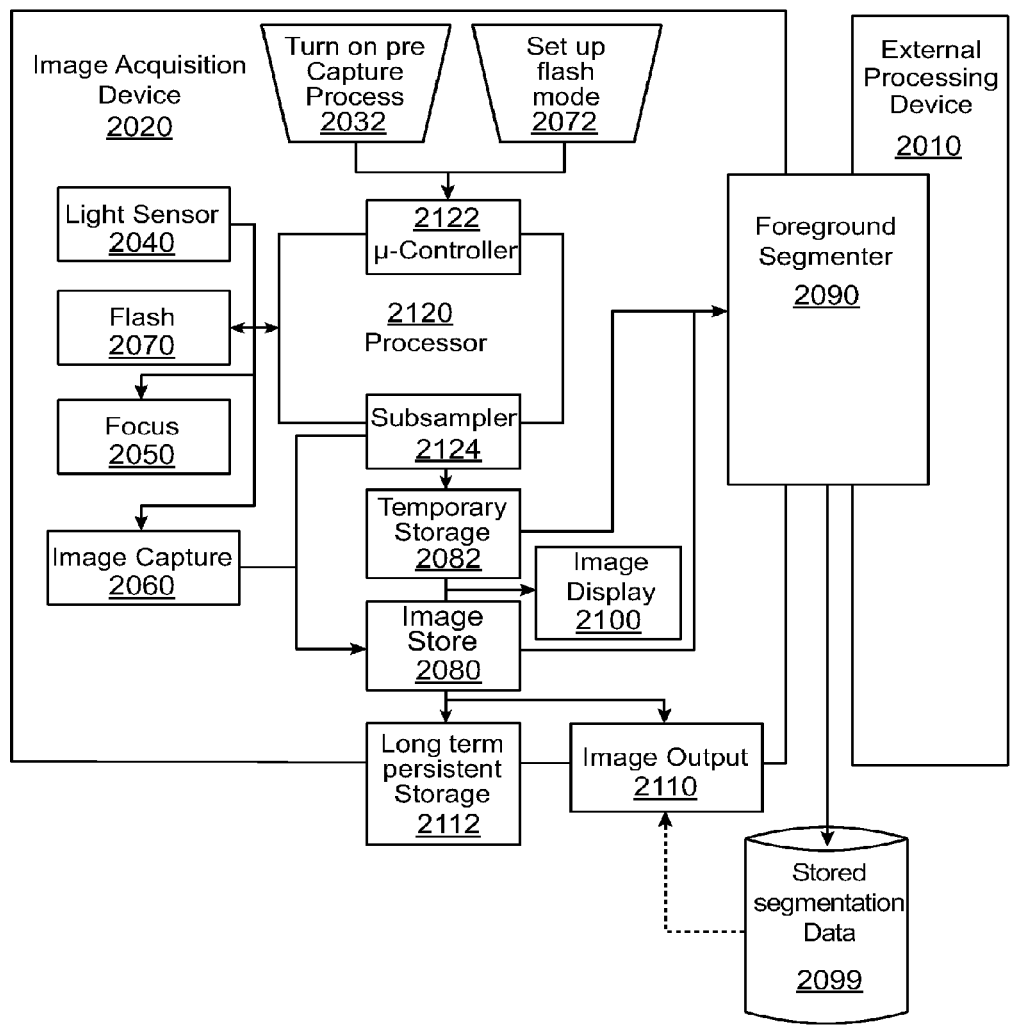
FIG. 14 shows a block diagram of a digital image acquisition device upon which certain embodiments may be implemented.

FIG. 14 shows a block diagram of a digital image acquisition device 2020 operating in accordance with a preferred embodiment. The digital image acquisition device 2020, which in the present embodiment might be a portable digital camera, includes a processor 2120. It can be appreciated that many of the processes implemented in the digital camera can be implemented in or controlled by software operating in a microprocessor, central processing unit, controller, digital signal processor and/or an application specific integrated circuit (ASIC), collectively depicted as block 2120 labeled "processor." Generically, user interface and control of peripheral components such as buttons and display is controlled by a micro-controller 2122.

The processor 2120, in response to a user input at 2122, such as half pressing a shutter button (pre-capture mode 2032), initiates and controls the digital photographic process. Ambient light exposure is determined using light sensor 2040 in order to automatically determine if a flash is to be used. The distance to the subject is determined using focusing means 2050 which also focuses the image on image capture component 2060. If a flash is to be used, processor 2120 causes the flash 2070 to generate a photographic flash in substantial coincidence with the recording of the image by image capture component 2060 upon full depression of the shutter button.

The image capture component 2060 digitally records the image in color. The image capture component 2060 is known to those familiar with the art and may include a CCD (charge coupled device) or CMOS to facilitate digital recording. The flash may be selectively generated either in response to the light sensor 2040 or a manual input 2072 from the user of the camera. The image I(x,y) recorded by image capture component 2060 is stored in image store component 2080 which may comprise computer memory such as dynamic random access memory or a non-volatile memory. The camera is equipped with a display 2100, such as an LCD, for preview and post-view of images.

In the case of preview images P(x,y), which are generated in the pre-capture mode 2032 with the shutter button half-pressed, the display 2100 can assist the user in composing the image, as well as being used to determine focusing and exposure. A temporary storage space 2082 is used to store one or a plurality of the preview images and can be part of the image store means 2080 or a separate component. The preview image is usually generated by the image capture component 2060. Parameters of the preview image may be recorded for later use when equating the ambient conditions with the final image. Alternatively, the parameters may be determined to match those of the consequently captured, full resolution image. For speed and memory efficiency reasons, preview images may be generated by subsampling a raw captured image using software 2124 which can be part of a general processor 2120 or dedicated hardware or combination thereof, before displaying or storing the preview image. The sub sampling may be for horizontal, vertical or a combination of the two. Depending on the settings of this hardware subsystem, the pre-acquisition image processing may satisfy some predetermined test criteria prior to storing a preview image. Such test criteria may be chronological—such as to constantly replace the previous saved preview image with a new captured preview image every 0.5 seconds during the pre-capture mode 2032, until the final full resolution image I(x,y) is captured by full depression of the shutter button. More sophisticated criteria may involve analysis of the preview image content, for example, testing the image for changes, or the detection of faces in the image before deciding whether the new preview image should replace a previously saved image. Other criteria may be based on image analysis such as the sharpness, detection of eyes or metadata analysis such as the exposure condition, whether a flash is going to happen, and/or the distance to the subjects.

If test criteria are not met, the camera continues by capturing the next preview image without saving the current one. The process continues until the final full resolution image I(x,y) is acquired and saved by fully depressing the shutter button.

Where multiple preview images can be saved, a new preview image will be placed on a chronological First In First Out (FIFO) stack, until the user takes the final picture. The reason for storing multiple preview images is that the last image, or any single image, may not be the best reference image for comparison with the final full resolution image. By storing multiple images, a better reference image can be achieved, and a closer alignment between the preview and the final captured image can be achieved in an alignment stage. Other reasons for capturing multiple images are that a single image may be blurred due to motion, the focus might not be set, and/or the exposure might not be set.

In an alternative embodiment, the multiple images may be a combination of preview images, which are images captured prior to the main full resolution image and postview images, which are images captured after said main image. In one embodiment, multiple preview images may assist in creating a single higher quality reference image, either by using a higher resolution or by taking different portions of different regions from the multiple images.

A segmentation filter 2090 analyzes the stored image I(x,y) for foreground and background characteristics before forwarding the image along with its foreground/background segmentation information 2099 for further processing or display. The filter 2090 can be integral to the camera 2020 or part of an external processing device 2010 such as a desktop computer, a hand held device, a cell phone handset or a server. In this embodiment, the segmentation filter 2090 receives the captured image I(x,y) from the full resolution image storage

2080. Segmentation filter 2090 also receives one or a plurality of preview images P(x,y) from the temporary storage 2082.

The image I(x,y) as captured, segmented and/or further processed may be either displayed on image display 2100, saved on a persistent storage 2112 which can be internal or a removable storage such as CF card, SD card, USB dongle, or the like, or downloaded to another device, such as a personal computer, server or printer via image output component 2110 which can be tethered or wireless. The segmentation data may also be stored 2099 either in the image header, as a separate file, or forwarded to another function which uses this information for image manipulation.

In embodiments where the segmentation filter 2090 is implemented in an external application in a separate device 2010, such as a desktop computer, the final captured image I(x,y) stored in block 2080 along with a representation of the preview image as temporarily stored in 2082, may be stored prior to modification on the storage device 2112, or transferred together via the image output component 2110 onto the external device 2010, later to be processed by the segmentation filter 2090. The preview image or multiple images, also referred to as sprite-images, may be pre-processed prior to storage, to improve compression rate, remove redundant data between images, align or color compress data.

Example Method

Figure 15:
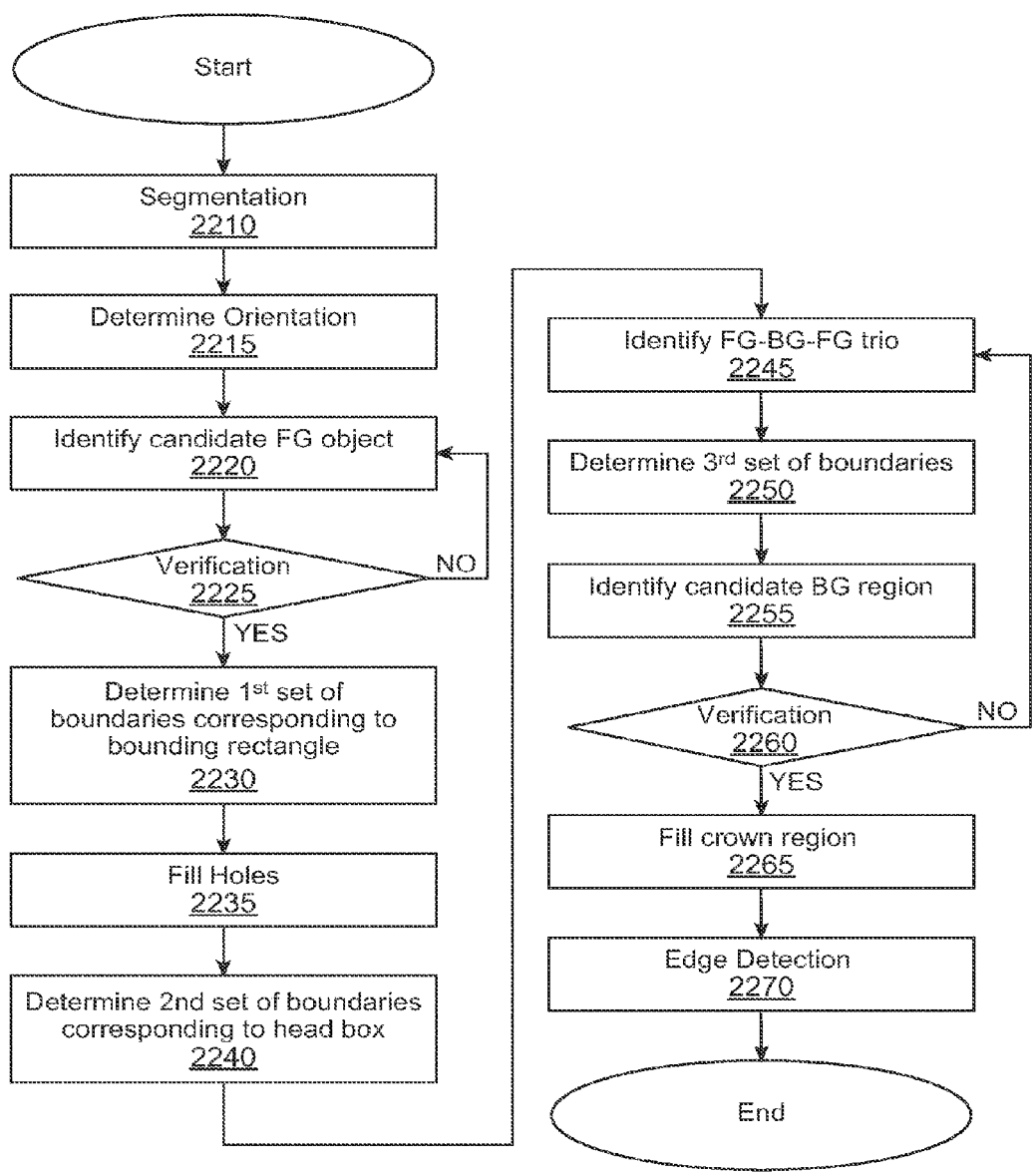
FIG. 15 shows a flow chart of a method embodying techniques of certain embodiments.

FIG. 15 is a flow chart showing a method according to certain embodiments. The segmentation filter 2090 of the image acquisition device 2020 (also referred to as a "camera" in parts of the disclosure) shown in FIG. 14 can use the foreground/background segmentation information 2099 of a stored image I(x,y) to produce a binary map with foreground (FG) pixels and background (BG) pixels (Block 2210). The binary map might, for example, assign a first value to background pixels and a second value to foreground pixels such that an image corresponding to the binary map shows the foreground image in black and the background in white. U.S. Patent Publication No. 2006/0039690, titled "Foreground/Background Segmentation In Digital Images With Differential Exposure Calculations," filed Aug. 30, 2005, is hereby incorporated by reference in its entirety. In one embodiment, the binary map is refined to improve the quality of the segmentation of a foreground object from the background of a digital image.

Depending on available features of the camera, a variable indicating the orientation of the stored image I(x,y) can be stored (Block 2215). The orientation of the stored image I(x,y) can identify whether the image is a portrait image or a landscape image. Thus, the orientation indicates which side of the image constitutes the top of the image, which side constitutes the right side of the image, and so on. As it can be assumed that the image was not captured while the camera was upside down, the orientation can be determined from three possible orientations (i.e., the camera was not rotated when the image was taken, the camera was rotated ninety degrees to the right, or the camera was rotated ninety degrees to the left). The variable can either indicate a certain orientation (OrCert) or an uncertain orientation (OrUncert) depending on how the orientation was determined. For example, if the user specifies the image orientation or if the image acquisition device contains motion sensing technology that can detect the rotation of the image acquisition device at the time of image capture, then an OrCert might be stored, indicating that the orientation is believed with a high degree of confidence to be accurate. Alternatively, if the orientation is determined from an analysis of an acquired image, such as by assuming that the side of the image with the highest average intensity is the top of the image, then an OrUncert might be stored, indicating that the orientation is based on estimates that cannot guarantee accuracy to the same degree. If a value for OrUncert is stored, additional information or additional algorithms such as face detection algorithms might be used in order to confirm the orientation.

After the orientation of the image has been determined, groups of foreground pixels on the binary image map can be labeled, and the group constituting the primary foreground object can be identified (block 2220). Each continuous region of foreground pixels can be given a unique label. The labeled regions can then be filtered to determine which continuous region constitutes the primary foreground object. The continuous region of foreground pixels with the largest pixel area can be identified as the primary foreground object, and continuous regions of foreground pixels that do not have the largest pixel area can be identified as not being the primary foreground object. These lesser regions are converted to background pixels.

In some embodiments, the continuous region of foreground pixels with the largest pixel area might not be automatically identified as the primary foreground object, but instead might be subjected to further analysis. For example, if the continuous region of foreground pixels with the largest pixel area does not touch the bottom of the image, as determined by the stored orientation, then the region might be discarded in favor of the second largest continuous region of foreground pixels (block 2225, no path). If the second largest region does touch the bottom of the image, then the second largest region can be confirmed as being the primary foreground object (block 2225, yes path). Additional regions can continue to be analyzed until one that touches the bottom of the image is identified. If no region touches the bottom of the image, then the technique stops.

Figure 16A:
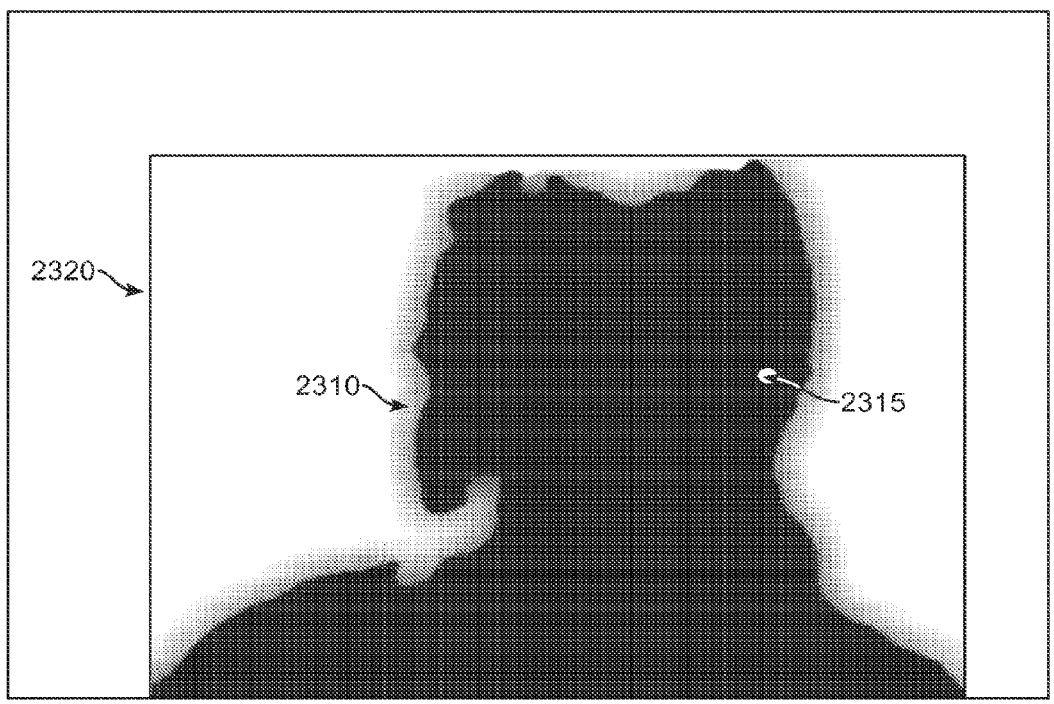
FIGS. 16a-c show examples of binary image maps at various stages of the method of FIG. 15.

After the labeling and filtering (blocks 2220 and 2225), the binary image map will contain only the primary foreground object. From the binary image map containing the primary foreground object, a first set of boundaries, corresponding to a bounding rectangle, can be determined (block 2230). The left boundary of the first set of boundaries can correspond to the left-most foreground pixel of the foreground object. The right boundary of the first set of boundaries can correspond to the right-most foreground pixel of the primary foreground object. The top boundary of the first set of boundaries can correspond to the top-most foreground pixel of the primary foreground object, and the bottom boundary can correspond to the bottom-most pixel of the primary foreground, which will typically be the bottom border of the image. FIG. 16*a* shows an example of a binary image map containing a single foreground object (2310) and a bounding rectangle (2320) corresponding to the first set of boundaries.

Figure 16B:
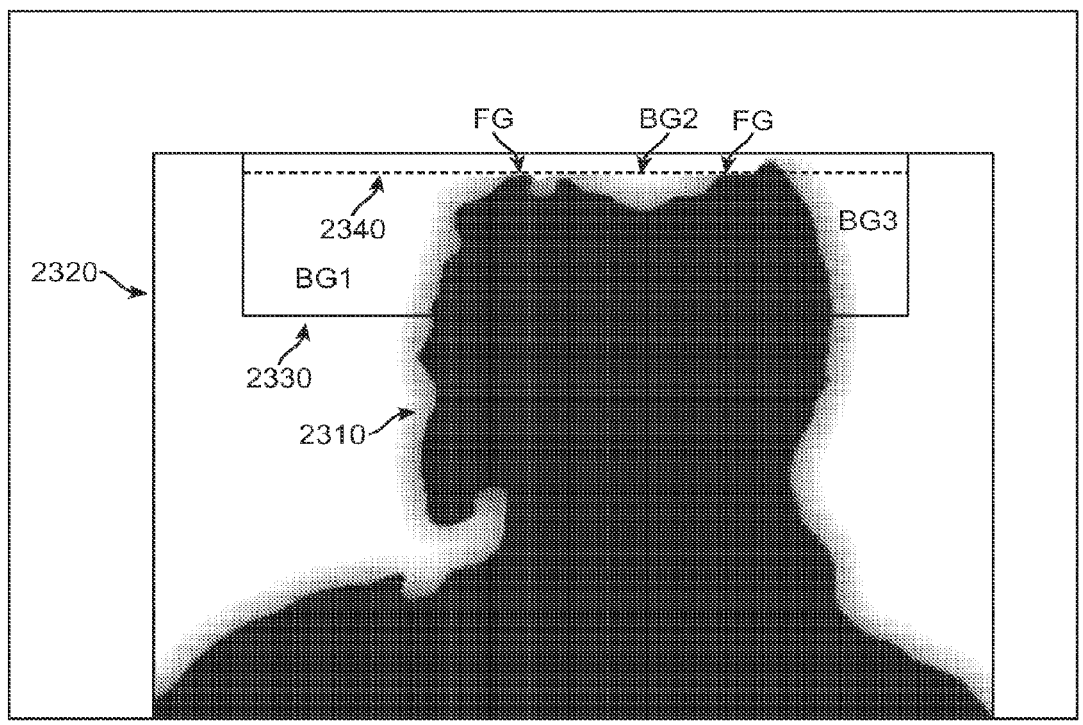

After the primary foreground object is identified (blocks 2220 and 2225) and a first set of boundaries is determined (block 2230), holes in the primary foreground object can be filled (block 2235). For example, a dark unreflective surface, such as from clothing or another object, might cause a pixel to be identified as a background pixel even though it represents the primary foreground object, and therefore should be identified on the binary image map as a foreground pixel. FIG. 16*a* shows an example of a hole 2315 in the primary foreground object. In FIG. 16*b*, the hole has been filled.

Holes can be identified by identifying regions of background pixels that meet one or more criteria. For example, any continuous region of background pixels that is entirely surrounded by foreground pixels and does not touch any of the first set of boundaries identified by the bounding rectangle 2320 of FIG. 16a can be identified as a hole. Groups of background pixels identified as holes can be changed to foreground pixels. In order to avoid incorrectly converting regions of background pixels that should not be converted, one embodiment only involves converting holes to foreground pixels if the hole constitutes less than a threshold amount of area, such as less than a certain percentage of the total image area, less than a certain percentage of the total area of foreground pixels, or less than a certain percentage of the total area of background pixels. The certain percentages are generally low, such as 1.5%, and can be chosen in order to prevent converting large background regions that might result from situations such as a person creating a hole by touching his head during image capture.

After the holes are filled, a second set of boundaries, corresponding to a head region box likely to define the head region of the foreground object, can be defined (block 2240). The second set of boundaries can be defined based on the orientation of the digital image as well as the first set of boundaries corresponding to the bounding rectangle. For example, the width of the head box might be defined to be three-fourths of the width of the bounding rectangle and aligned to the middle of the bounding rectangle, such that one-eighth of the bounding rectangle is to the left of the head box, and one-eighth of the bounding rectangle is to the right of the head region box. The head box might also be defined as being one-fourth the height of the bounding rectangle and aligned to the top of the bounding rectangle. Alternatively, the boundaries of the head box might be defined based on an estimated location for a face determined by one or more face detection algorithms. FIG. 16b shows an example of a binary image map with a head box 2330.

A recursive crown detection and filling module (RCDF module) can identify crowns within the head box 2330 by parsing each row within the head box 2330 to determine if it contains a FG-BG-FG trio (block 2245). A FG-BG-FG trio is a horizontal line or plurality of horizontal lines that has a first group of foreground pixels to the left of a group of background pixels and a second group of foreground pixels to the right of the group of background pixels. The RCDF module can analyze the top row of the head region box 2330 to determine if it contains a FG-BG-FG trio, and if it does not, then the RCDF can analyze the second row from the top to determine if it contains a FG-BG-FG trio. This process can be repeated until the first row from the top that contains a FG-BG-FG trio is identified. The first row from the top that contains a FG-BG-FG trio can be referred to as a trio line 2340. FIG. 16b shows an example of a binary map with a trio line 2340. If no trio line is found within the head region box 2330, then the algorithm can stop.

To avoid falsely identifying portions of the image as head crowns that are not head crowns, additional parameters can be used in identifying a trio line 2340. For example, the RCDF module might be configured to only find FG-BG-FG trios where the left and/or right groups of FG pixels are at least five pixels wide. Such a search criteria might prevent the RCDF module from identifying small details in the image, caused by stray hairs for example, as representing crowns. Additionally, the RCDF might be configured to only identify FG-BG-FG trios where the group of BG pixels is smaller than a certain width, such as 50 pixels. Such criteria can prevent the RCDF from identifying objects extraneous to the head, such as a raised hand, as representing the beginning of a head crown.

The trio line 2340 can be used to identify a third set of boundaries corresponding to a new box of interest (also called the crown box), and within the crown box, background regions can be identified (block 2250). The left, right, and bottom of the crown box can correspond to the same boundaries as the left, right, and bottom of the head region box 2330, but the top of crown box can be defined by the trio line 2340. Within the crown box, each unique background region can be assigned a unique label. In FIG. 16b, these labels are shown as BG1, BG2, and BG3. Based on an analysis, it can be determined which identified BG regions represent the crown region and which represent actual background (block 2255). For example, BG regions that touch the sides or the bottom of the crown box, such as BG1 and BG3, might be indentified as actual background regions, while a region or regions that do not touch the sides or bottom of the crown box, such as BG2, might be identified as the crown region.

In some embodiments, regions identified as possibly being part of the crown region, such as BG2 in FIG. 16b, can undergo additional tests to verify whether or not the region in fact represents an actual crown region (block 2260). For example, the average luminescence of the crown region can be compared to the average luminescence of a group of foreground pixels in the surrounding foreground image. The comparison can be made on a grey scale image obtained using a flash. The determination of whether a pixel is a foreground pixel or a background pixel is binary and based on whether the change in luminescence between a flash image and non-flash image is greater than a certain value. Therefore, it can be assumed that the difference in luminescence between a background pixel in the crown region and an adjacent foreground pixel will be relatively small when compared to a foreground pixel and an actual background pixel.

If the identified crown region passes the additional tests (block 2260, yes path), then the pixels comprising the crown region can be converted from background pixels to foreground pixels (block 2265). If the identified crown region does not pass the additional tests (block 2260, no path), then the identified crown region can be marked as already tested, and the pixels will not be converted from background to foreground pixels. In response to the identified crown region not passing the additional test (block 2260, no path), another trio line can be identified and the process can repeat (blocks 2245, 2250, 2255, and 2260).

Figure 16C:
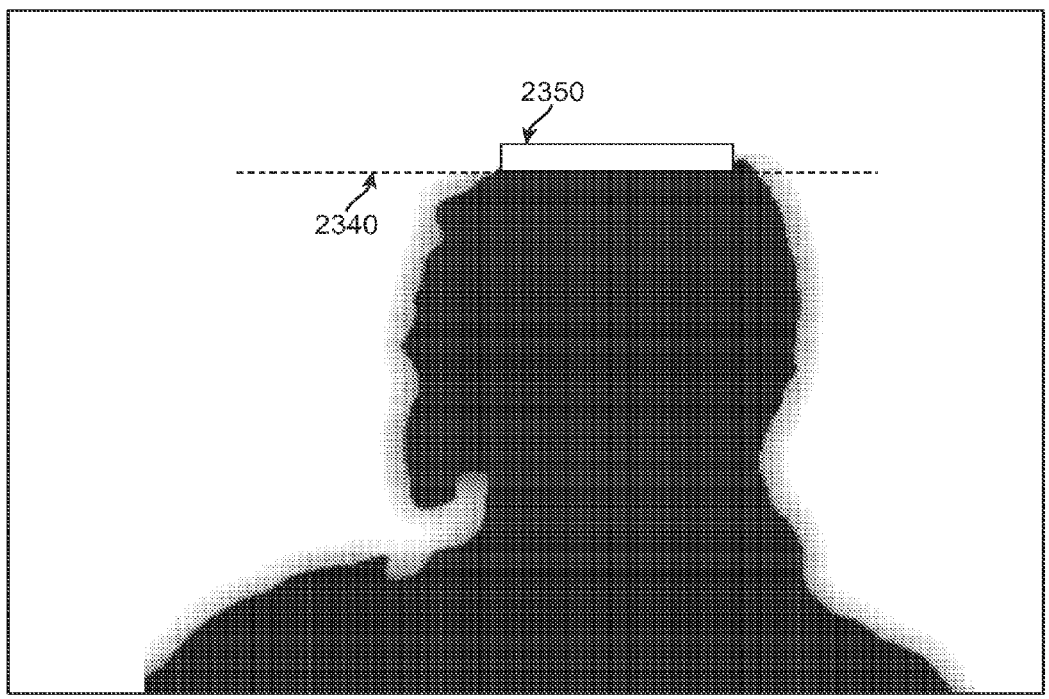

After filling an identified crown region that passes the additional tests (blocks 2260 and 2265), edge detection can be used to identify a top of the crown that might be above a filled in identified crown region (i.e. above a trio line) (block 2270). A region above the top of the crown can be identified as a region of interest 2350. FIG. 16c shows, the image of FIG. 16b with the crown region filled. FIG. 16c also shows a box corresponding to the region of interest 2350. The region of interest 2350 can be bounded on the top by a line that is a predetermined, maximum height above the trio line 2340 and can be bounded on the left and right by the width of the FG-BG-FG trio, such that the region of interest 2350 is bound on the left by the left-most FG pixel in the FG-BG-FG trio and bound on the right by the right-most FG pixel in the FG-BG-FG trio.

Within the region of interest 2350, a starting point can be defined. The starting point might, for example, provide one pixel above the trio line 2340 and equidistant from both the left and right sides of the region of interest 2350. Starting at the defined starting point, a region growing algorithm can be executed, and the growing can be stopped when the borders of region of interest are reached or when edges are determined. Any edge detecting algorithm known in the art, such as the Prewitt edge detection algorithm, can be used to determine edges of the head.

The edges determined by the edge detecting algorithm can be verified for accuracy. For example, if the detected edges exceed the region of interest 2350, then the edges can be identified as inaccurate, and if the detected edges are within the region of interest, then the edges can be identified as accurate. In response to determining that detected edges are accurate, the area bound by the detected edges may be added to the foreground map, and in response to determining that the detected edges are not accurate, the area bound by the detected edges is not added to the foreground map.

Techniques of certain embodiments can further include a warning module for detecting possibly incorrect filling. A detection of incorrect filling can be stored as metadata associated with a captured image and used to inform a user that crown filling has been performed. A message informing the user can be delivered to a user on the image acquisition device soon after the image is acquired or delivered to the user during post-acquisition processing that might occur, for example, on a personal computer. Alternatively, a camera might be programmed to present a user with an unaltered image instead of an imaged with crown filling if possibly incorrect filling has been detected.

Such a warning might be presented to a user every time filling is performed or only under certain circumstances. For example, the warning module might only present a warning to the user if the ratio of an object's perimeter to the object's area is greater than a certain value. A low perimeter to area ratio can be indicative of a lack of detail on that object, which might be attributable to incorrect filling.

Figure 17A:
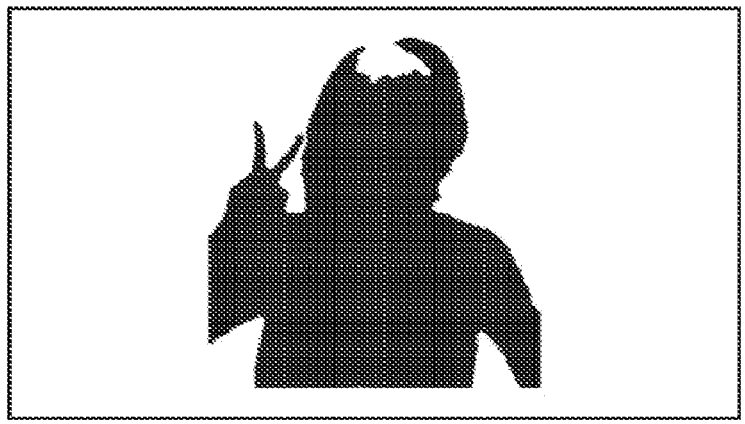
FIGS. 17a-c shows additional examples of binary image maps at various stages of the method of FIG. 15.
Figure 17B:
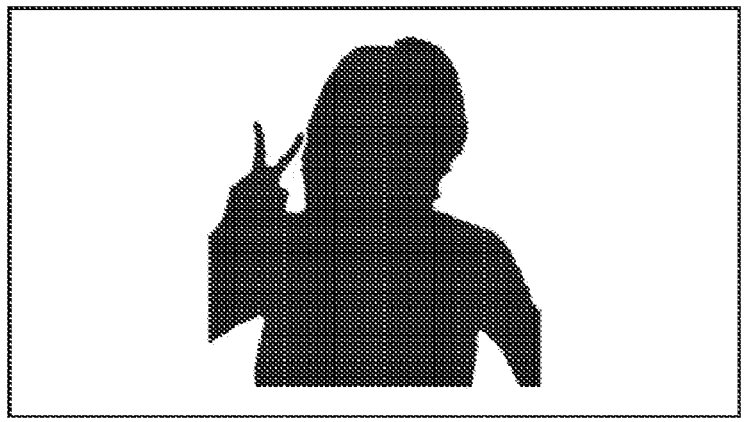
Figure 17C:
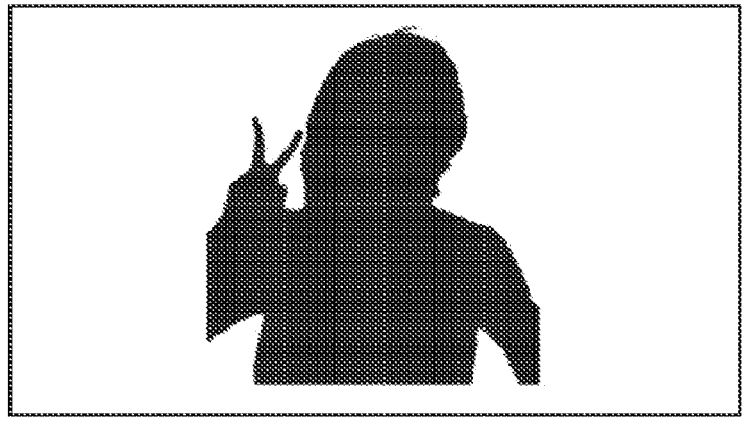

FIGS. 23a-c show graphical examples of a binary image map at various stages in the method of FIG. 15. FIG. 17a shows a single foreground object with a crown. FIG. 17a, might for example, be a representation of the binary image map after the hole filling described in block 2235 of FIG. 15. FIG. 17b shows the same image as FIG. 17a but with the crown filled. FIG. 17b might, for example, be a representation of the binary image map after the crown filling of block 2265 in FIG. 15. FIG. 17c shows the same image as FIG. 17b but with some additional background.

While aspects of certain embodiments have been explained using an image with a single foreground object with a single crown region, it should be apparent that the described techniques are extendable to include detecting and filling multiple crown regions within a single foreground object, or to detecting and filling one or more crown regions in more than one foreground object.

Further embodiments may include a method of distinguishing between foreground and background regions of a digital image of a scene, wherein the method comprises: (a) identifying in a binary image map comprising one or more foreground objects, a primary foreground object; (b) analyzing a head region of the primary foreground object to identify a trio line, wherein the trio line comprises a first group of one or more foreground pixels to the left of a group of background pixels and a second group of one or more foreground pixels to the right of the group of background pixels; (c) identifying, based at least in part on the trio line, a crown region of the binary image map; and (d) converting background pixels in the crown region of the binary image map to foreground pixels.

Certain embodiments may include a method of distinguishing between foreground and background regions of a digital image of a scene, wherein the method comprises: (a) storing a segmented image identifying foreground (FG) pixels and background (BG) pixels; (b) determining an orientation of the segmented image; (c) identifying in the image one or more groups of continuous foreground pixels; (d) identifying from the one or more groups of continuous foreground pixels, a candidate primary foreground object; (e) performing further analysis on the candidate primary foreground object to determine if the candidate primary foreground object is a primary foreground object; (f) determining based at least in part on the primary foreground object, a first set of boundaries, wherein the first set of boundaries comprises a left-most pixel of the primary foreground object, a right-most pixel of the primary foreground object, a top-most pixel of the primary foreground object, and a bottom-most pixel of the primary foreground object; (g) filling holes in the primary foreground object; (h) determining, based at least in part on the first set of boundaries, a second set of boundaries corresponding to a likely region of a head in the primary foreground object; (i) identifying within the second set of boundaries, a FG-BG-FG trio; (j) determining, at least based in part on the second set of boundaries and an identified FG-BG-FG trio, a third set of boundaries; (k) identifying in the third set of boundaries one or more groups of continuous background pixels; (l) identifying from the one or more groups of continuous background pixels, a candidate crown region; (m) performing further analysis on the candidate crown region to determine if the candidate crown region is an actual crown region; (n) converting background pixels within the crown region to foreground pixels; (o) and executing an edge detection algorithm, wherein a starting point for the edge detection algorithm is determined at least based in part on the FG-BG-FG trio.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference: U.S. Pat. Nos. 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 7,474,341 and 5,978,519;

U.S. published application nos. 20050041121, 20070110305, 20060204110, PCT/US2006/021393, 20050068452, 20060120599, 20060098890, 20060140455, 20060285754, 20080031498, 20070147820, 20070189748, 20080037840, 20070269108, 20070201724, 20020081003, 20030198384, 20060276698, 20040080631, 20080106615, 20060077261, 20040223063, 20050140801, 20080240555 and 20070071347; and U.S. patent application Ser. Nos. 10/764,339, 11/573,713, 11/462,035, 12/042,335, 12/063,089, 11/761,647, 11/753,098, 12/038,777, 12/043,025, 11/752,925, 11/767,412, 11/624,683, 60/829,127, 12/042,104, 11/856,721, 11/936,085, 12/142,773, 60/914,962, 12/038,147, 11/861,257, 12/026,484, 11/861,854, 61/024,551, 61/019,370, 61/023, 946, 61/024,508, 61/023,774, 61/023,855, 11/319,766, and 11/673,560, 12/187,763, 12/192,335, 12/119,614, 12/043, 025, 11/937,377 and 12/042,335.

What is claimed is:

1. A method for red-eye detection in an acquired digital image comprising:
    acquiring a first image with a portable processor-based device having a processor and an image acquisition component including a lens and an image sensor;
    using the processor;
    analyzing one or more partial face regions within the first image, including segmenting two or more regions of at least one eye and determining one or more characteristics of the first image;
    identifying one or more corrective processes including red eye defect correction and iris color correction that can be beneficially applied to said first image according to said one or more characteristics; and
    applying said one or more corrective processes to said first image to generate a corrected image, including said red eye defect correction and said iris color correction; and
    electronically storing, transmitting, further processing or editing, or displaying the corrected image, or combinations thereof.

2. The method of claim 1, further comprising detecting and correcting a non-red flash-induced eye defect in the eye region.

3. The method of claim 1, wherein said applying comprises applying a chain of two or more filters to said first image including an iris color correction filter and a red eye defect filter.

4. The method of claim 1, wherein said analyzing is performed in part on a full resolution partial face region and in part on a subsample resolution of at least one different partial face region.

5. The method of claim 1, wherein said first image comprises a sub-sampled copy of an acquired image.

6. The method of claim 1, wherein the analyzing comprises recognizing one or more faces or types of faces, or both, within the first image.

7. The method of claim 1, wherein the applying comprises applying an iris color correction filter, including:
    applying a pixel locator and segmentor;
    applying a shape analyzer;
    applying a falsing analyzer; or
    applying a pixel modifier, or combinations thereof.

8. The method of claim 1, wherein the one or more corrective processes comprises a color space transformation.

9. One or more non-transitory computer-readable media having digital code embedded therein for programming a processor to perform a method for iris color correction in an acquired digital image, comprising:
    a first code subset that is configured to program the processor to analyze one or more partial face regions within the first image, including a second code subset configured to segment two or more regions of at least one eye and determining one or more characteristics of the first image;
    a third code subset that is configured to identify one or more corrective processes including red eye defect correction and iris color correction that can be beneficially applied to said first image according to said one or more characteristics; and
    a fourth code subset that is configured to apply said one or more corrective processes to said first image to generate a corrected image, including said red eye defect correction and said iris color correction.

10. A portable processor-based device, comprising:
    an image acquisition component configured to capture digital images, including
        a lens,
        an image sensor, and
        a processor programmed by digital code embedded in one or more processor-readable media to perform iris-color correction in an acquired digital image,
    wherein the device is configured to acquire a first image using the image acquisition component including the lens and the image sensor; and
    wherein the processor is programmed to analyze one or more partial face regions within the first image, and to segment two or more regions of at least one eye and determining one or more characteristics of the first image; and
    wherein the processor is further programmed to identify one or more corrective processes including red eye defect correction and iris color correction that can be beneficially applied to said first image according to said one or more characteristics; and
    wherein the processor is further programmed to apply said one or more corrective processes to said first image to generate a corrected image, including said red eye defect correction and said iris color correction.

11. A method for red-eye detection in an acquired digital image comprising:
    acquiring a first image with a portable processor-based device having a processor and an image acquisition component including a lens and an image sensor;
    using the processor;
    analyzing one or more full face regions within the first image, including segmenting two or more regions of at least one eye and determining one or more characteristics of the first image;
    identifying one or more corrective processes including red eye defect correction and iris color correction that can be beneficially applied to said first image according to said one or more characteristics; and
    applying said one or more corrective processes to said first image to generate a corrected image, including said red eye defect correction and said iris color correction; and
    electronically storing, transmitting, further processing or editing, or displaying the corrected image, or combinations thereof.

12. A method for red-eye detection in an acquired digital image comprising:
    acquiring a first image with a portable processor-based device having a processor and an image acquisition component including a lens and an image sensor;
    using the processor;
    analyzing one or more full face regions and one or more partial face regions within the first image, including segmenting two or more regions of at least one eye and determining one or more characteristics of the first image;
    identifying one or more corrective processes including red eye defect correction and iris color correction that can be beneficially applied to said first image according to said one or more characteristics; and
    applying said one or more corrective processes to said first image to generate a corrected image, including said red eye defect correction and said iris color correction; and electronically storing, transmitting, further processing or editing, or displaying the corrected image, or combinations thereof.

13. One or more non-transitory computer-readable media having digital code embedded therein for programming a processor to perform a method for iris color correction in an acquired digital image, wherein the method comprises any of the methods recited at claims 1-8 comprising:
- a first code subset that is configured to program the processor to analyze one or more full face regions within the first image, including a second code subset configured to segment two or more regions of at least one eye and determining one or more characteristics of the first image;
- a third code subset that is configured to identify one or more corrective processes including red eye defect correction and iris color correction that can be beneficially applied to said first image according to said one or more characteristics; and
- a fourth code subset that is configured to apply said one or more corrective processes to said first image to generate a corrected image, including said red eye defect correction and said iris color correction.

14. One or more non-transitory computer-readable media having digital code embedded therein for programming a processor to perform a method for iris color correction in an acquired digital image, wherein the method comprises any of the methods recited at claims 1-8 comprising:
- a first code subset that is configured to program the processor to analyze one or more full face regions and one or more partial face regions within the first image, including a second code subset configured to segment two or more regions of at least one eye and determining one or more characteristics of the first image;
- a third code subset that is configured to identify one or more corrective processes including red eye defect correction and iris color correction that can be beneficially applied to said first image according to said one or more characteristics; and
- a fourth code subset that is configured to apply said one or more corrective processes to said first image to generate a corrected image, including said red eye defect correction and said iris color correction.

15. A portable processor-based device, comprising:
a lens, and
an image sensor for capturing digital images, and
a processor programmed to perform iris-color correction in an acquired digital image,
wherein the device is configured to acquire a first image using the image acquisition component including the lens and the image sensor; and
wherein the processor is programmed to analyze one or more full face regions within the first image, and to segment two or more regions of at least one eye and determining one or more characteristics of the first image; and
wherein the processor is further programmed to identify one or more corrective processes including red eye defect correction and iris color correction that can be beneficially applied to said first image according to said one or more characteristics; and
wherein the processor is further programmed to apply said one or more corrective processes to said first image to generate a corrected image, including said red eye defect correction and said iris color correction.

16. A portable processor-based device, comprising:
a lens, and
an image sensor for capturing digital images, and
a processor programmed to perform iris-color correction in an acquired digital image,
wherein the device is configured to acquire a first image using the image acquisition component including the lens and the image sensor; and
wherein the processor is programmed to analyze one or more full face regions and one or more partial face regions within the first image, and to segment two or more regions of at least one eye and determining one or more characteristics of the first image; and
wherein the processor is further programmed to identify one or more corrective processes including red eye defect correction and iris color correction that can be beneficially applied to said first image according to said one or more characteristics; and
wherein the processor is further programmed to apply said one or more corrective processes to said first image to generate a corrected image, including said red eye defect correction and said iris color correction.

* * * * *